(12) United States Patent
Eckert et al.

(10) Patent No.: US 7,323,991 B1
(45) Date of Patent: Jan. 29, 2008

(54) SYSTEM AND METHOD FOR LOCATING AND COMMUNICATING WITH PERSONNEL AND EQUIPMENT IN A FACILITY

(75) Inventors: David D. Eckert, Greenland, NH (US); Evan J. Bontemps, Newmarket, NH (US); Paul D. Carey, III, North Hampton, NH (US); Richard E. Goodwin, Portsmouth, NH (US); Keith E. Hatfield, Dover, NH (US); Joseph P. Lorenz, Manchester, NH (US); Keith A. Nevish, Barrington, NH (US); Edward J. Spang, Newbury, MA (US); Glen S. Westerberg, Portsmouth, NH (US)

(73) Assignee: Exavera Technologies Incorporated, Portsmouth, NH (US)

( * ) Notice: Subject to any disclaimer, the term of this patent is extended or adjusted under 35 U.S.C. 154(b) by 274 days.

(21) Appl. No.: 11/127,449

(22) Filed: May 12, 2005
(Under 37 CFR 1.47)

(51) Int. Cl.
   *G08B 13/14* (2006.01)
   *G08B 1/08* (2006.01)
   *G08B 5/22* (2006.01)

(52) U.S. Cl. ............................. 340/572.1; 340/539.13; 340/539.21; 340/539.23; 340/825.36; 340/825.49; 340/5.2; 340/5.7; 235/382; 235/384

(58) Field of Classification Search ............. 340/572.1, 340/572.2
   See application file for complete search history.

(56) References Cited

U.S. PATENT DOCUMENTS 6,570,487 B1 * 5/2003 Steeves ...................... 340/5.2

(Continued)

OTHER PUBLICATIONS

Lionel M. Ni et al. "LANDMARC: Indoor Location Sensing Using Active RFID" In Proc. 1st IEEE Int. Conference on Pervasive Computing and Communications (PerCom 2003) pp. 407-415 Mar. 2003.
Jacqueline Emigh "Defense Department Tests Hybrid Active/Passive RFID" In Proc. 1st IEEE Int. Conference on Pervasive Computing and Communications (PerCom 2003) pp. 407-415 Dec. 30, 2004.

(Continued)

*Primary Examiner*—Donnie L. Crosland
(74) *Attorney, Agent, or Firm*—William A. Loginov; Hinckley, Allen & Snyder LLP

(57) ABSTRACT

This invention provides a system and method for identifying, locating, authorizing by proximity and communicating with equipment and personnel in a facility that generally employs a series of limited range transceivers for location determination and a distributed wireless data network for data transfer. The system employs unique RF transceiver tags on personnel and equipment that are each uniquely identified and registered with a facility control application that oversees activities in the facility. The tags are tracked by RF communication based upon their proximity to one or more fixed-base networked access points and relays (which transfer location data by RF back to access points) within four range zones. Location data on all tags is uploaded periodically to a location server that interfaces with the facility control server. Tag data is monitored by the facility control server to track, authorize and deauthorize certain data transfers, movements and activities in accordance with rules established for each tag (or type of tag) within the facility control server's application. Wireless networking (WiFi, for example), in combination with the RF-derived location information, allows the facility control server to correlate and transmit data to staff in conjunction with location and proximity. WiFi can transmit authorizations, deauthorizations and general data based upon triggers established by proximity and location. Likewise, data can be transmitted over WiFi from readers etc. from personnel and equipment located and identified by the system.

24 Claims, 39 Drawing Sheets

U.S. PATENT DOCUMENTS 6,690,673 B1 * 2/2004 Jarvis .......................... 370/401
6,873,260 B2 * 3/2005 Lancos et al. ........... 340/573.1
7,123,126 B2 * 10/2006 Tanaka et al. ............... 340/5.2
2004/0229560 A1 * 11/2004 Maloney .................... 455/3.01

OTHER PUBLICATIONS

Jeffrey Hightower et al. "Design and Calibration of the SpotON Ad-Hoc Location Sensing System" University of Washington, Computer Science and Engineering, Intel Research Aug. 2001.

* cited by examiner

| READING DEVICE'S TAG ID | TAG ID | SIGNAL STRENGTH | DEVICE TYPE (DEVICE'S TAG ID) (e.g., RELAY ID) | AGING BIT |
|---|---|---|---|---|
| ⋮ | 1234 | 0X3F | 1 | 0 |
| | 1365 | 0X2A | 3 | 1 |
| | ⋮ | ⋮ | ⋮ | ⋮ |

FIG. 6

| RELAY TABLE |  |
|---|---|
| RELAY ID 1 | *1802* |
| RELAY ID 2 | *1804* |
| ⋮ | |
| RELAY ID N | *1806* |

| TAG ID 2002 | TAG TYPE 2004 | TAG SIGNAL STRENGTH 2006 |

| TAG ID TABLE | | | |
|---|---|---|---|
| READER ID (32-BIT) | TAG ID (32-BIT) | SSI (1-BYTE) | TIME STAMP (TIME STRING) |
| RELAY 1 | TAG A | 1 | 11:35 |
| RELAY 1 | TAG B | 3 | 11:35 |
| RELAY 2 | TAG A | 1 | 11:36 |
| ⋮ | ⋮ | ⋮ | ⋮ |

MAP LOCATION TABLE 2700

| AREA NAME | BOUNDARY COORDINATES | CENTER | | Z | SUBDIVISIONS | LEVEL | PARENT AREA |
|---|---|---|---|---|---|---|---|
| | | X | Y | | | | |
| FIRST FLOOR MAIN | (0,0),(0,Y1),(X3,Y1),(X5,0) | X11 | Y6 | Z1 | YES | 1 | — |
| ROOM A | (0,0),(0,Y1),(X1,Y1),(X1,0) | X9 | Y6 | Z1 | NO | 1 | FIRST FLOOR MAIN |
| ROOM B | (X1,Y2),(X1,Y1),(X2,Y1),(X2,Y2) | X10 | Y7 | Z1 | NO | 1 | FIRST FLOOR MAIN |
| ... | ... | ... | ... | ... | ... | ... | ... |

2702 — AREA NAME
2704 — FIRST FLOOR MAIN
2706 — ROOM A
2708 — ROOM B
2710 — BOUNDARY COORDINATES
2712 — CENTER
2714 — Z
2716 — SUBDIVISIONS
2718 — LEVEL
2720 — PARENT AREA

| MAP LOCATION CONTAINS TABLE ||
| LOCATION | LOCATION CONTAINS |
| --- | --- |
| FIRST FLOOR MAIN | • ROOM A<br>• ROOM B<br>• ROOM C<br>• ROOM D<br>• ROOM E<br>• HALL A |
| FIRST FLOOR WING | • HALL B<br>• THEATER |
| "PEDIATRIC WARD" | • ROOM A<br>• ROOM B<br>• ROOM C |
| ⋮ | ⋮ |

FIG. 28

ACCESS POINT MONITORS TABLE — 3100

| ACCESS POINT | TAG ID FOR RELAY |
|---|---|
| AP 1 | (RID 1) |
| AP 1 | (RID 2) |
| AP 1 | (RID 5) |
| AP 2 | (RID 3) |
| AP 2 | (RID 4) |
| ⋮ | ⋮ |

3110 → ACCESS POINT; 3120 → TAG ID FOR RELAY

FIG. 31

TAG DATABASE TABLE — 3200

| TAG ID | TAG TYPE |
|---|---|
| TAG A | CLIENT BRACELET |
| TAG B | STAFF |
| TAG C | EQUIPMENT |
| TAG D | SUPPLIES |
| TAG E | ACCESS POINT |
| TAG F | RELAY |
| ⋮ | ⋮ |

3210 → TAG ID; 3220 → TAG TYPE

FIG. 32

TAG DATA TABLE 3300

| READER ID 3310 | TAG ID 3320 | SIGNAL STRENGTH 3330 | TIME STAMP 3340 |
|---|---|---|---|
| (RID 1) | TAG 1 | 52 | 2:05:30 |
| (RID 2) | TAG 2 | 33 | 2:05:31 |
| (RID 3) | TAG 1 | 58 | 2:05:32 |
| (RID 4) | TAG 1 | 46 | 2:04:23 |
| (RID 4) | TAG 2 | 27 | 2:01:46 |
| ⋮ | ⋮ | ⋮ | ⋮ |

| TAG DATA TABLE | | | |
|---|---|---|---|
| READER TAG ID | TAG ID | SIGNAL STRENGTH | TIMESTAMP |
| ⋮ | ⋮ | ⋮ | ⋮ |
| AP1 | T1 | 57 | :003 |
| R1 | T1 | 55 | :003 |
| R2 | T1 | 60 | :004 |
| R3 | T1 | 45 | :004 |
| ~~R1~~ | ~~T2~~ | ~~25~~ | ~~:004~~ |
| R5 | T2 | 62 | :004 |
| ~~R3~~ | ~~T2~~ | ~~22~~ | ~~:003~~ |
| | | | |

3520 → (row R1/T2)
3522 → (row R3/T2)

FIG. 35

| TAG ID | LEVEL | X | Y | Z | LOCATION | TIME STAMP |
|---|---|---|---|---|---|---|
| T1 | 1 | XT1 | YT1 | Z1 | ROOM A | :004 |
| T2 | 1 | XT2 | YT2 | Z1 | ROOM B | :004 |
| ... | | | | | ... | ... |

FIG. 37

SYSTEM AND METHOD FOR LOCATING AND COMMUNICATING WITH PERSONNEL AND EQUIPMENT IN A FACILITY

BACKGROUND OF THE INVENTION

1. Field of the Invention

This invention relates to facility control, management and communication systems.

2. Background Information

The use of radio frequency (RF) transceivers to establish the location of persons and things is becoming increasingly popular for use in facilities and other areas of interest. One popular approach involves the use of Global Positioning System (GPS) receivers appended to each person and item of interest. The receivers derive a global latitude and longitude position from a series of U.S. government satellites and, when needed, transmit this position to one or more base units with appropriate software to interpret the identity and location of the transmitter. The identity of the transmitter may be uniquely encoded with the position report so that a particular person or item can be correlated with a locational fix. This approach is problematic where reception of satellite signals is attenuated (e.g. indoors or in an area of heavy RF interference). Likewise, this approach requires that expensive and complicated GPS units be attached to each subject for which location-determination is desired.

An alternate approach involves the use of an RF device that transmits to one or more localized, or ground-based (non-satellite) stations. The stations are placed at known locations within a facility, typically so as to avoid excess interference from walls, RF interference and the like. Such implementations generally employ triangulation between a plurality of stations to establish a fairly precise locational fix on the subject. Again, this type of implementation is problematic where interference sources may move about the facility (for example diagnostic equipment in a hospital) or where a number of walls or fixed interference sources may serve to block one or more stations from full reception. Typically, a triangulation-based system is plagued with RF "holes" or RF "distortions" that can only be filled with additional base station units. These units may significantly add to the cost and obtrusiveness of such implementations.

Even where a location-determination system exhibits adequate coverage, it may lack many of the additional functions desired by facilities, such as hospitals. These functions may include determination of encounters between persons and equipment, the ability to access data on proximate individuals and equipment, the logging of medicines administered or supplies used by swiping them with a RFID reader (very close proximity) that is permitted by the proximate positioning of two authorized individuals. Moreover, voice and data communication (RF, WiFi, LAN, VOIP, etc.) in a single system package may be adapted.

More particularly, most currently available location-determination technologies attempt to establish the longest possible range of communication between base units and asset/personnel transponders. In this way, the number of expensive base units may be reduced and they may be used to track a greater number of transponders at a given time. However, this approach often carries the disadvantage of treating the facility's three-dimensional space as a single, large, undifferentiated area within which to locate items and persons. In such a large area, quite precise triangulation and timing of signals from transponders is needed. This, in turn, dictates the use of complex installation and transmission/reception techniques for antenna alignment, particularly in a facility with many walls and/or interference sources. Accuracy remains problematic for such systems due to the inevitable presence of significant RF reflections and wave attenuation as signals attempt to traverse disparate materials in the facility.

SUMMARY OF THE INVENTION

This invention overcomes the disadvantages of prior art systems and provides additional desirable features by providing a system and method for identifying, locating, authorizing by proximity and communicating with equipment and personnel in a facility that generally employs a series of limited range transceivers for location determination and a distributed wireless data network for data transfer. Such data transfer (retrieval of records, authorization/deauthorization) may be triggered to occur based upon a location and/or proximity-driven transaction. Each component has a particular range of operation, with an intended functionality associated with that range. This "range segmentation" assures that any transaction-triggered event is properly registered by the system. This registration is desirable in ensuring that the system performs predictably in a variety of scenarios. Based upon the range segmentation approach, a high-risk functionality (for example, administration of a dangerous medication) is forced into a short-range trigger point, whereas a low-risk functionality, such as generalized location determination of assets can be accomplished at a much-longer range. In general, the provision of authorization and deauthorization can be based upon the presence of two or more tags clustered within a predetermined locus (i.e. "clustering" of tags to drive a trigger).

The system employs RF transceiver tags on personnel and equipment that are each uniquely identified and registered with a facility control application, which oversees activities in the facility. The tags are tracked by RF communication based upon their proximity to one or more fixed-base networked access points and relays. The relays each transfer location data by RF back to access points. Location data on all tags is frequently uploaded to a location server that interfaces with the facility control server. In this manner, the proximity of tags to system components (at known locations) throughout the facility is quickly, frequently and continuously updated. This updated data is monitored by the facility control server to track, authorize and deauthorize data transfer and certain movements and activities in accordance with rules established for each tag (or type of tag) within the facility control server's application. The presence of universal wireless networking in combination with the RF-derived location information allows the facility control server to correlate and transmit data to staff in response to proximity of the staff to particular locations in the facility and also in response to other tags (and the underlying personnel, equipment, etc).

There are at least four ranges of communication operating with the RF capability in accordance with an illustrative embodiment of the system. Each range is established for a particular redundant purpose: (1) There is a very close range (inches), which is established for purposeful acts of enregistering a transaction, since a longer range capability would run the risk of unintended transactions being entered to the system. For example, in a longer-range approach, a nurse with a medicine tray passes a patient in the hallway and the system determines in error that the nurse has administered a medicine dose to the patient; (2) there is a close range (0 to 8 feet), which is derived by comparison of signal strength derived for a given tag among multiple relays that communicate each active tag's relative proximity (to the reporting relay) over long range back to the access point. This limited range (rather than a longer range) permits the assurances of verifying the identity of the tag-holder, and with such verification allows automatic release (or automatic prevention of the release) of system data to the IP address of a PDA, or other (typically portable) device held by the tag holder; (3) there is a medium range (5 to 15 feet), which is employed to generally locate people and items/equipment when they need to be found upon inquiry (for example, to find an unused IV pump or a particular staff member). In this manner, the system can be queried for a person/item, and it will report back the locations of these devices both by communication of active tags with relays and also by communication of active tags with a relay functionality provided on each of the access points. This medium range occurs over an RF relay-listening/tag-transmitting (contention) channel, termed F1. Additionally, a mapping program can visually plot some or all of the persons or assets in the system; and (4) there is a long range (5 to 100 feet), which consists of two long-range functions: The first long-range function is an RF relay-transmitting function occurring over a dedicated channel, termed F2, which is used to transmit data on tags and status back to the access point upon request and for the access point to provide data and requests to a relay, once an initial link is established from listen mode. The second long-range function is a wireless networking (WiFi or WLAN) data-transmission function that links access points and various wireless data-handling devices (e.g. PDAs, laptops, readers, etc.) and carries data packets between these distributed, mobile devices (via the access points and LAN/WAN) and the location server and facility control server.

By employing a multiplicity of relays and relay functionalities (in access points and mobile units, for example), the system and method of this invention better ensures redundant identification of a given tag. That is, unlike triangulation systems with fewer, high-powered (costly) transceivers, a numerous array of more-closely spaced and simpler relays is deployed in the facility and a given tag is typically heard by a number of proximate relays (two or more in a given facility locus) at once. This provides the desired, increased redundancy in assuring the actual location of a given tag.

In one example of the system implementation, the RF transceivers on relays and access points locate and confirm the close proximity of authorized service staff to clients. Then, automatically and safely, the system would give input to authorize and activate a wide range of wireless LAN applications, which would retain their authorization until the close proximity condition ceases to exist. For example, a nurse holding a PDA with a RFID (or bar code, etc.) reader attached, could perform a 6-inch scan of a medicine container in the presence of a patient. The read medicine data is transmitted back through an access point to the hospital's facility control application. The facility control application determines (via RF location) that the patient and the nurse are in close proximity. It uses the internal data that it retains on the patient, the nurse and the medication to authorize the nurse to act on that patient's behalf (because the nurse is assigned to that patient), and applicable hospital records on medicine usage by the patient and prescribed dosage are retrieved by the control application. Then, a dosage window appears on the PDA screen because that nurse is authorized to administer medicine to this patient. The nurse then confirms the administered dosage in the PDA window, and the hospital system automatically enters the time, dosage, nurses' ID and patient ID as a transaction to the medical records and the billing.

Overall, this invention creates a family of radio frequency transceivers, that when used in conjunction with proprietary and third party equipment and the novel communication techniques of this system and method, allows new functionality of (1) locating individuals who are identified by the specific RF identity devices they are wearing; (2) authorizing interactions between identified individuals and providing access to client information (from central systems and Internet) when the individuals are in trigger point proximities and meet the conditions of access instructed by the central information system; (3) determining the use status and location of RF-identity-labeled equipment; (4) enabling access and use of equipment, supplies, samples, etc. that are labeled with RF-identity devices; (5) supporting the communication task to update records in approximate or near-real-time for use by all authorized staff in a facility; and (6) a variety of other functionalities that, essentially serve to change the manner in which work is performed, software is written and actions are triggered in a facility environment. In other words, work and activities can be reengineered in view of this system and method.

BRIEF DESCRIPTION OF THE DRAWINGS

The invention description below refers to the accompanying drawings, of which:

FIG. 6 is a schematic diagram of a Tag ID table stored in the relay of FIG. 4 and built in accordance with the procedure of FIG. 5;

FIG. 18 is a diagram of an exemplary Relay ID table employed by the procedure of FIG. 17;

FIG. 20 is a diagram of the fields for a Tag ID entry in the local Tag ID database of FIG. 19;

FIG. 24 is a diagram of a Tag ID table that is stored and updated with Tag ID data from each of the relays/access points in the system;

FIG. 27 is a diagram of a Map Location Table for storing coordinate data with respect to the floor plan of FIG. 26;

FIG. 28 is a diagram of a Map Location Contains Table for storing associations between areas listed in the Map Location Table of FIG. 27;

FIG. 31 is a diagram of an Access Point Monitors Table for storing associations between access points and the relays monitored thereby for use with the location server of this system and method;

FIG. 32 is a is a diagram of a master Tag Database Table for storing every known Tag ID in the system for use by the location server of this system and method;

FIG. 33 is a diagram of a Tag Data Table containing a continually updating list of all located tags in the system for use by the location server of this system and method;

FIG. 35 is a diagram of a Tag Data Table according to FIG. 33 containing exemplary entries for the tags shown in FIG. 35;

FIG. 37 is a diagram of a Tag Location Table constructed using the tag location-determination procedure of FIG. 36.

DETAILED DESCRIPTION OF AN ILLUSTRATIVE EMBODIMENT

System Overview

In general, a novel system for identifying, locating, authorizing and communicating with personnel and equipment according to this invention is based around a series of distributed communication devices that employ radio frequency (RF) transceivers operating on a commercially available band, such as (but not limited to) that established under well-known IEEE Standard 802.11 (a, b, g, etc.) and other available bands (e.g. 900 MHz, 2.4 GHz, etc.). Other forms of wireless communication may be employed in accordance with the teachings of this invention as a substitute for RF communication of a supplement to RF communication, including (but not limited to) optical transceivers employing, for example, infra-red (IR).

As will become more clear below, this system is used to track and identify objects within a given facility that each possess a unique "tag." The system relies, in part, upon the use of tracking components having limited transmission ranges such that objects being tracked by this system tend to communicate mostly within a predetermined localized geographic area. In this manner, objects outside of the accepted range of communication of a given set of tracking components are ignored, while those within the desired range of a given set of tracking components are further localized by resolving their positions relative to a plurality of the tracking components, each tracking component having a known position within the overall facility.

Figure 1:
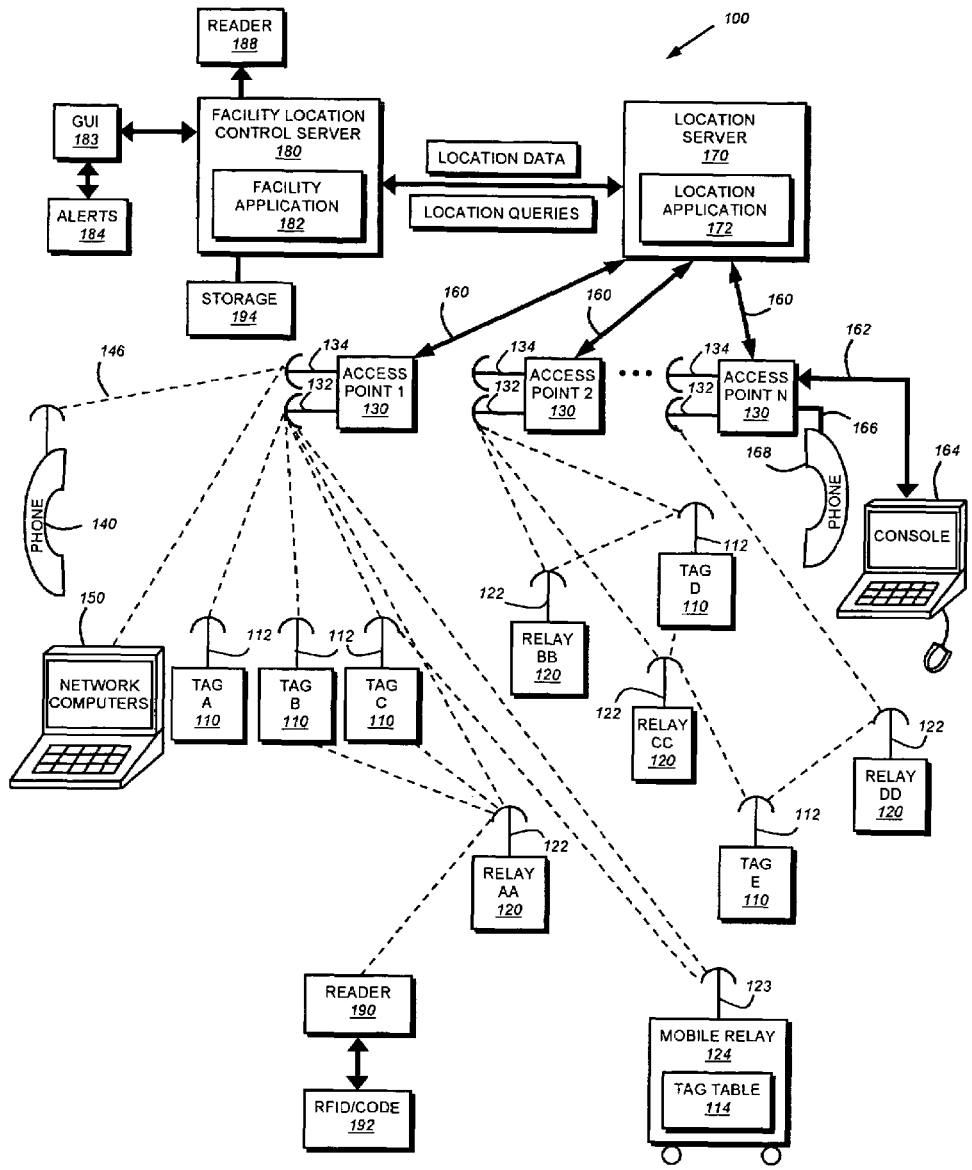
FIG. 1 is a simplified schematic diagram of an exemplary system for identifying, locating, authorizing and communicating with personnel and equipment according to an embodiment of this invention.

With reference now to FIG. 1, a generalized diagram 100 of the system for identifying, locating, authorizing and communicating with personnel and equipment is shown. In describing this overview, reference will be made to various functional components employed to implement the system. These components and their operation will be described in further detail below.

Each item for which tracking (locating, identifying, authorizing, etc.) is desired is provided with a transceiver that is herein termed a "tag" 110. Each tag is provided with an appropriate antenna 112 that enables RF communication. As will be described further below, tags may include an internal processor and memory. They are programmable within limits to contain certain information about identification, etc. Tags 110 are generally adapted to move about a facility especially where attached to a movable item or a person. They are typically powered by a battery, photocell or other transportable supply. Alternatively they may be powered by a fixed source, such as an AC adapter, where they are applied to a fixed asset. Likewise, tags 110 may under certain circumstances be unpowered, and receive necessary power from a fixed RF transmitter or other electromagnetic field-generating device. Tags 110 may be constructed from inexpensive circuit components for disposability. In particular, they can be packaged on ID cards, bracelets, boxes, and the like.

Distributed throughout the facility is a group of relays 120. Each of the relays 120 also contains an antenna 122 for two-way communication. As will be described further below, relays 120 are similar in internal function to tags, but may transmit and receive on multiple frequencies so that one frequency is dedicated for communication with tags and another for communication with the below-described access points. Relays 120 are adapted to receive power from a fixed source, such as an AC adapter or large, long-life battery pack. As will also be described further below, relays 120 are deployed at various fixed locations throughout a facility and are used to localize the position of tags 110.

One specialized type of relay will be described in further detail below. Generally, mobile relays 124 incorporate the medium-range listening functionality of fixed relays (120), but are mounted on moving platforms and receive signals from tags 110 as they come into range of the mobile relay 124. These relays are in contact with one or more access points (130). They may include a table 114 that stores data related to tags as they are encountered during a travel circuit (e.g. a robotically mounted tag). When the mobile relay is in range of an access point, it transfers data on identified tags to the access point. This type of relay is useful for tracking and identifying inventory where precise location is not a primary concern—rather the basic presence or absence of the tag within the space patrolled by the mobile relay is of greater concern. More-precise locational data on tags can be obtained where the mobile relay incorporates an encoder or location-tracking unit that appends this location data to tag identifiers (Tag IDs below) as the tags are entered into the table 114.

As noted above, a plurality of access points 130 are also deployed about the facility. Access points 130 transmit and receive at longer ranges than relays or tags and are powered by fixed power supplies. Access points may contain one set of specialized antennas 132 for receiving RF communication from tags and relays and another set of antennas 134 for communicating with a variety of wireless network devices (known popularly as "WiFi" or "WLAN") such as wireless internet protocol (IP)-based telephones 140 and computing devices (for example, laptop computers, personal digital assistants (PDAs) and the like) 150. A wired network connection 162 may be provided to each access point 160 to enable direct connection via a local area network (LAN) protocol to one or more localized computers 164 and/or telephones employing (for example) a Voice-over-IP (VoIP) communication protocol. Telephones (140) can be connected by wireless link 146, or telephones (168) can be connected by a wired link 166. Access points also feature wired network links 160 that enable communication over a facility LAN, wide area network (WAN) and/or public Internet to a host computer, which is known as the location server 170.

In summary, the location server employs a location application 172 that gathers location data and identifiers from the various access points, tags and relays, in a manner described further below, and determines the relative location of each identified component in the system on an ongoing basis. The location server may include a predefined floor plan map that allows components to be accurately associated with identifiable locations in the facility (such as facility wings, rooms, work areas, hallways and the like). The location server may perform rudimentary access control and alerting of problems where unauthorized behavior is observed by specific components. Overall however, most location data is provided to the facility location control server 180.

The facility control server 180 contains specific applications 182 that make meaningful decisions on how to interpret and use the raw location data provided by the location server. For example, the server 180 may assign certain authorizations to particular types of tags. These authorizations only allow such tags to appear within specific areas of the facility. If the tags are identified as being located in another, unauthorized area, then the server may note this on a graphical user interface (GUI) 183, and may activate certain alerts 184, such as alarms or page messages to managing personnel. The server 180 may also use location data to automatically call up records on the wearers of tags when such persons are in proximity to appropriate personnel or equipment. Likewise, the server may issue alerts when persons not authorized to be together are in close proximity. The GUI affords management the ability to change authorizations applicable to a given tag at will as circumstances change. A wired or wireless reader interconnected with the facility management server allows newly activated tags to be scanned as they are issued to personnel, equipment and others. These new tags, which can be obtained from commercial vendors, can be registered with the system and associated by an administrator at the time of entry with a specific staff member, person of interest and/or equipment piece.

In addition, the system may allow personnel to input required information from certain tags through appropriate, very-close-range readers 190. For example, in a hospital facility, a dangerous drug that is in proximity to a given patient may prompt the nurse to scan embedded RF identification (RFID) code 192 with the reader 190 before administration of the drug to the patient is authorized. Transactions of this type, and others, can be logged by the server in a storage system 194 for future review. The reader can be any type of acceptable device for retrieving unique identifiers from items. While an RFID reader is contemplated in one embodiment, in alternate embodiments, for example, an optical bar code or character-recognition scanner can be used. Likewise a magnetic strip reader can be employed. The term reader, in this context, should be taken broadly to include any type of identification-retrieval device that acts at a very close range. In addition, it is expressly contemplated that this reader 190 can be integrated with a handheld data processing device such as a PDA, laptop computer, or the like.

Figure 2:
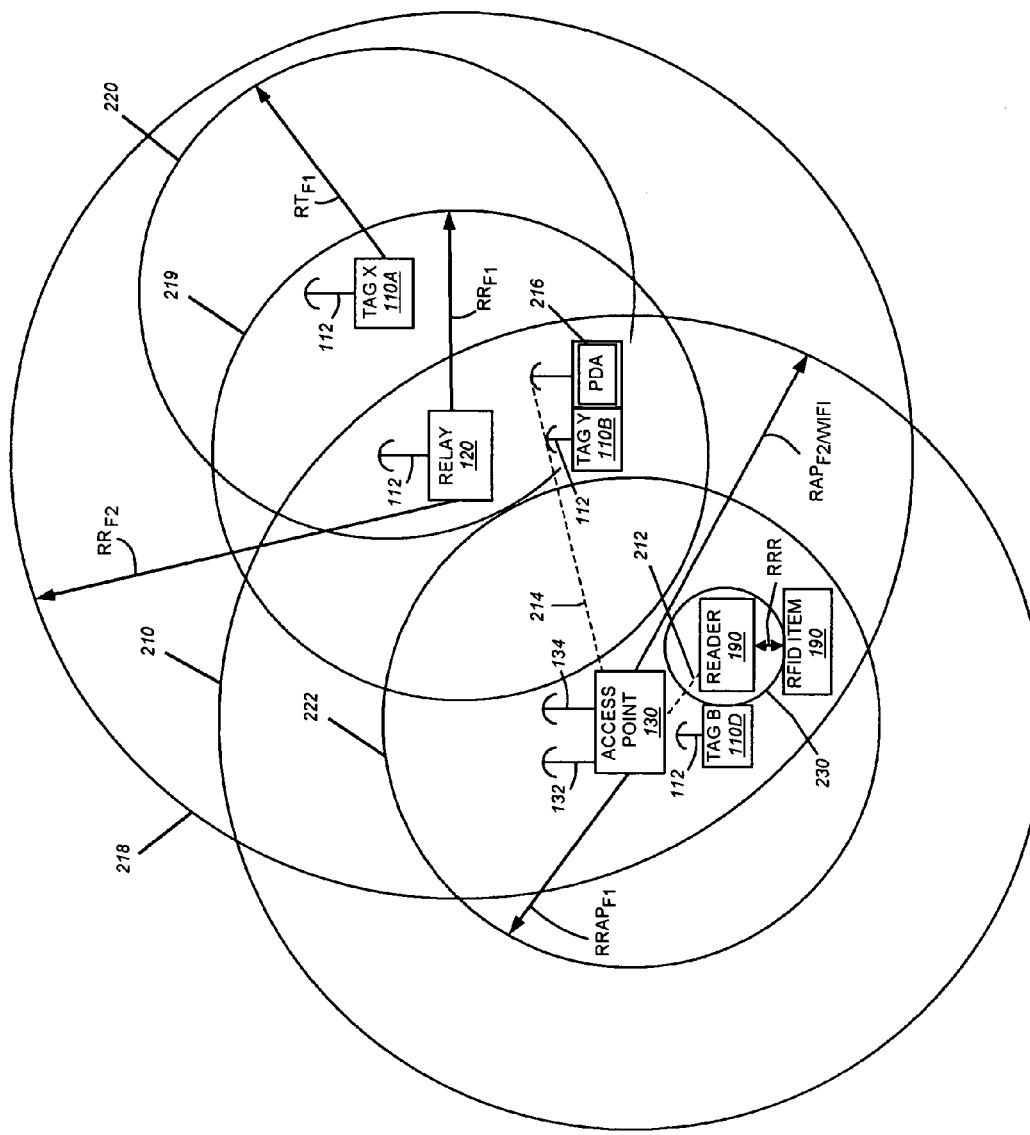
FIG. 2 is a schematic diagram of exemplary range limitations for various components of the system of FIG. 1.

Referring now to FIG. 2, the generalized scheme for limited RF-transmission/reception range of system components is shown. The illustrative embodiment of the system employs "range segmentation" in which each type or class of system component is provided with a particular, limited range of RF transmission/reception. In this manner, components do not project their footprint beyond predetermined boundaries and, thus, excessive cross talk and data collision between far-flung systems components is minimized. This limitation of (indoor) range effectively speeds the location process by reducing the number of location data points associated with any given tag and, thus, the complexity of location calculations. Instead, inexpensive relays can be deployed liberally throughout the facility and report only on more-localized tags within their more-limited range envelope. As such, location calculations can be based more upon a pure proximity (to one or more relays) determination than on a complex, and mathematically intensive, triangulation approach used where fewer long-range components are employed.

It is contemplated that the combination RF-capable and WiFi-enabled access points are the least numerous distributed devices, perhaps occurring in pairs in large rooms, and no more than one access point (or less) serving each smaller room. Relays may occur in larger numbers, generally lining the walls of rooms and halls at a fairly regular spacing and located centrally (on counters, fixed equipment with power, etc.) where appropriate. For example approximately three to four relays may be deployed in each moderately sized room. Tags are, of course, the most numerous devices in the system and may be virtually unlimited in number, correlated directly to the number of persons and items to be identified.

It should be clear, thus, that deploying few relatively costly access points, a larger quantity of modestly priced relays and an indefinite number of simple, relatively inexpensive tags produces the most cost-effective solution for facility tracking and management. In other words, coverage per square foot in a typical facility is better optimized by the illustrative embodiment than by a traditional approach employing a number of high-powered location-determining base stations with very long-range and applying a typical calculation-intensive triangulation processes.

The range of particular system components may be limited or segmented in a number of ways. For example, each system component includes an RF microcontroller, and associated control mechanisms (software/firmware/hardware, described below) that can apply particular limitations to the component's transmission power level. Batteries and transformers may also provide a physical limitation to transmission power. Based upon the well-known Inverse-Square Law, range decreases by the by the square as power decreases. Furthermore, each system component can be provided with a predetermined antenna design (employing well-known antenna-design techniques) that produces a desired reception and transmission profile. In addition, receiving components can include signal strength filtering components of known construction that electronically or digitally attenuate signals below a particular signal strength range. It is assumed that such filtered, low-strength signals are generally outside of the desired reception range of the system component.

In accordance with the illustrative range-segmentation scheme, each access point 130 exhibits the longest range in RF communication (over dedicated channel F2, described below) and WiFi data transmission ("Range-Access-Point" or $RAP_{F2/WIFI}$). In this embodiment, the range $RAP_{F2/WIFI}$ is from approximately 5 feet to 100 feet, as circumscribed by a sphere 210 (shown in the planar illustration herein as a circle). This range ($RAP_{F2/WIFI}$) depends in part upon the nature of the obstructions between the access point 130 and the target of transmission/reception. Within the sphere 210, the access point can carry out two-way network communication (dashed lines 212 and 214, respectively) with data-handling devices, such as the reader 190 or PDA 216. For simplicity, both WiFi and RF ranges are shown as the single sphere 210. In practice these ranges may vary to some extent, and are basically spherical.

The RF two-way transmission over dedicated channel F2 is adapted to reach a relay 120. This two way transmission is handled within the access point using relay functionality. Likewise, the relay 120 can carry out channel-F2 (long-range) RF communication with the access point 130 over a range ("Range-Relay" or $RR_{F2}$) defined by the sphere 218. The range $RR_{F2}$ is approximately equal to the range $RAP_{F2/WIFI}$. The relay 120 also defines a shorter (medium) range listening-mode range that occurs on a contention channel F1. This range ("Range-Relay" or $RR_{F1}$) is the range at which the relay 120 may receive chirp signals from a tag (such as Tag 110A). Note that an access point may transmit a more-powerful channel-F1 signal over a longer range (that will be received by a relay that is otherwise out of F1 transmission range) to gain a given relay's attention when needed. The relay's F1 range ($RR_{F1}$) corresponds to the sphere 219. For a tag to be heard by the relay 120, it must typically reside within the sphere 219. In this case, tag 110A, with its own channel-F1 range ("Range-Tag" or $RT_{F1}$), is in range of the relay 120 (se tag range sphere 220). In general, $RR_{F1}$ and $RT_{F1}$ are approximately equal.

The access point 130 also operates within the second, shorter (medium) range of communication when listening for tags (for example tag 110D) over its integral access point RF "relay" functionality. The access point's relay functionality, thus, listens on channel F1 over a range ("Range-Relay-Access-Point" or $RRAP_{F1}$) defined by the sphere 222 which is between approximately 3-15 feet. In this case, $RRAP_{F1}$ and $RR_{F1}$ are approximately the same in listen mode. As noted above, the access point may exhibit the longer range when transmitting over channel F1. The various modes of communication used by system components are described in greater detail below. In practice, a plurality of relays and/or access points communicate with a given tag within a facility, allowing the position of the particular tag to be localized as described further below.

As also shown, the reader 190 is within the WiFi range sphere 210 and relay range sphere 222 of the access point 130. This reader has its own, very-close-range operational transmission/reception range perimeter 230 defined by a predetermined radius or range ("Range-RFID-Reader" or RRR) of as little as 0-10 inches. This is the range (RRR) at which the reading of a passive RFID tag or identifier 232 is possible. Note that the reader 190 need not be capable of receiving in a spherical or circular bubble, but may be directional (e.g. an optical reader).

As further shown in FIG. 2, the reader 190 is provided in conjunction with a tag 110D. This tag can be that of the staff member who carries the reader. Alternatively, the reader (or associated PDA, laptop, etc.) can have its own unique tag. In such an example, the tag on the reader may be correlated for proximity with the staff member's tag, and if the PDA and staff member become sufficiently separated from each other the system can alert the staff about a loss or theft of the PDA.

Interestingly, the PDA 216 is located within the access point's WiFi perimeter 210 for direct transmission (dashed line 214) to the access point 130, but its associated tag 110B is heard directly by the relay 120, as it is within this relay's channel-F1 listening perimeter (sphere 219), but not within the access point's listening perimeter 222. Any reports on the presence of the tag 110B are transmitted to the access point via channel F2 as described in great detail below.

Note that intermediate radii or ranges (between $RAP_{F2/WIFI}$, $RR_{F1}$, $RT_{F1}$ and RRR) may also be established for passive tags (not shown) that operate based upon an external RF energy source. Such passive or semi-passive tags may have a transmission range of approximately 1-5 feet.

Because each component in the system has a relative maximum range of operation, the location of tags can be "bracketed" to specific ranges in the overall floor plan of a facility. That is, the tag will only transmit to specific, proximate components at a given time. By resolving the signal strength of a given tag at each component, a good approximation of location for the tag can be derived.

Figure 3:
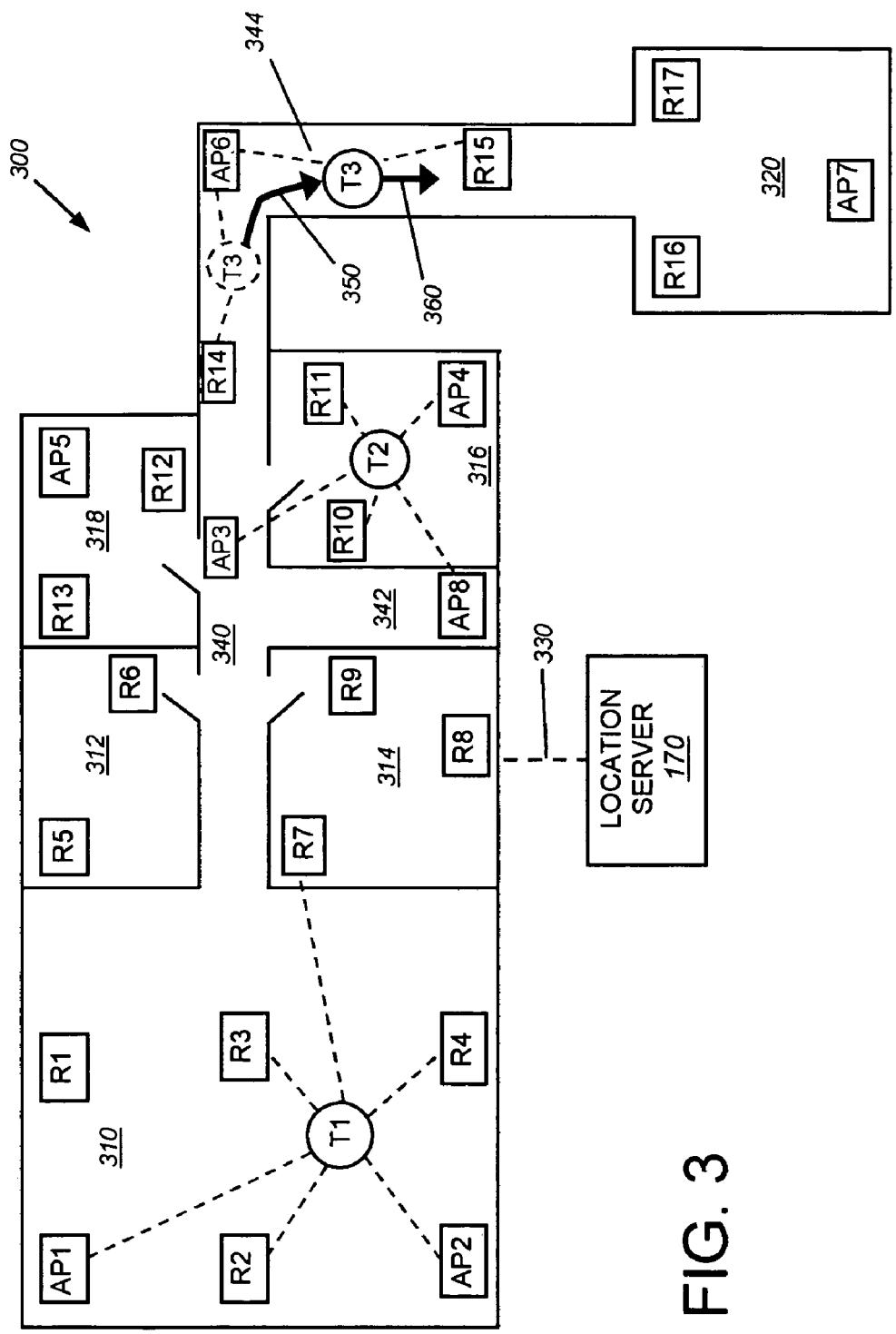
FIG. 3 is a schematic diagram of an exemplary floor plan in which the system of FIG. 1 is implemented.

Further to this end, FIG. 3 details an exemplary floor plan 300 of a facility with three tags T1, T2 and T3 present therein. Each tag is located at a position within the overall floor plan 300. In the exemplary floor plan there are six rooms 310, 312, 314, 316, 318 and 320. Each room has one or more respective access points AP1-AP8 in proximity thereto. All access points interconnect to the location server 170 (described above) via appropriate network links (330). The access points communicate with associated relays R1-R17 that are placed at appropriate locations around each of the rooms 310-320 and within adjoining hallways 340, 342 and 344. Likewise access points AP3, AP5 and AP6 are located in respective hallways 340, 342 and 344 to optimize coverage in this example. The precise placement of access points and relays is established based upon the RF profile of a given facility and can be determined by mathematical and/or experimental approaches.

As shown, the tag T1 is presently recognized by access points AP1 and AP2 and proximate relays R2-R4. Relay R7 in adjoining room 314 may also recognize the tag T1. Given the pattern of recognition and associated signal strength presented to each relay and/or access point, the server (as described below) is able to ascertain the approximate location of T1 within the room 310.

Similarly, tag T2 is located within room 316. It is recognized by access points AP4 (within the room 316) as well as hallway-based access points AP3 and AP5. Because the signal strength at relays R10 and R11 in room 316 is also relatively strong, the tag T2 can be localized to the room 316 and not the adjoining hallways.

Tag T3 is shown as moving (arrows 350 and 360) down hallway 344 toward room 320 over a predetermined time period. The system monitors the location of T3 over time. In the first time, T3 (shown in phantom) is adjacent to access point AP6 and in range of relay R14. Thus the approximate location in the hallway 344 is determined for this (first) time. After movement down the hall, the tag T3 transmits to the access point AP6, and is now in range of a further relay R15. T3 is either outside the range of relay R14, or is very weakly received by this relay. Thus, the location of T3, at the far end of the hallway, is now derived for the second time.

Having described the basic components of the system and their functions, a description of the specific structure and function of various system components now follows, beginning with relays, which are among the most numerous location-determining devices used by the system.

Relays

Figure 4:
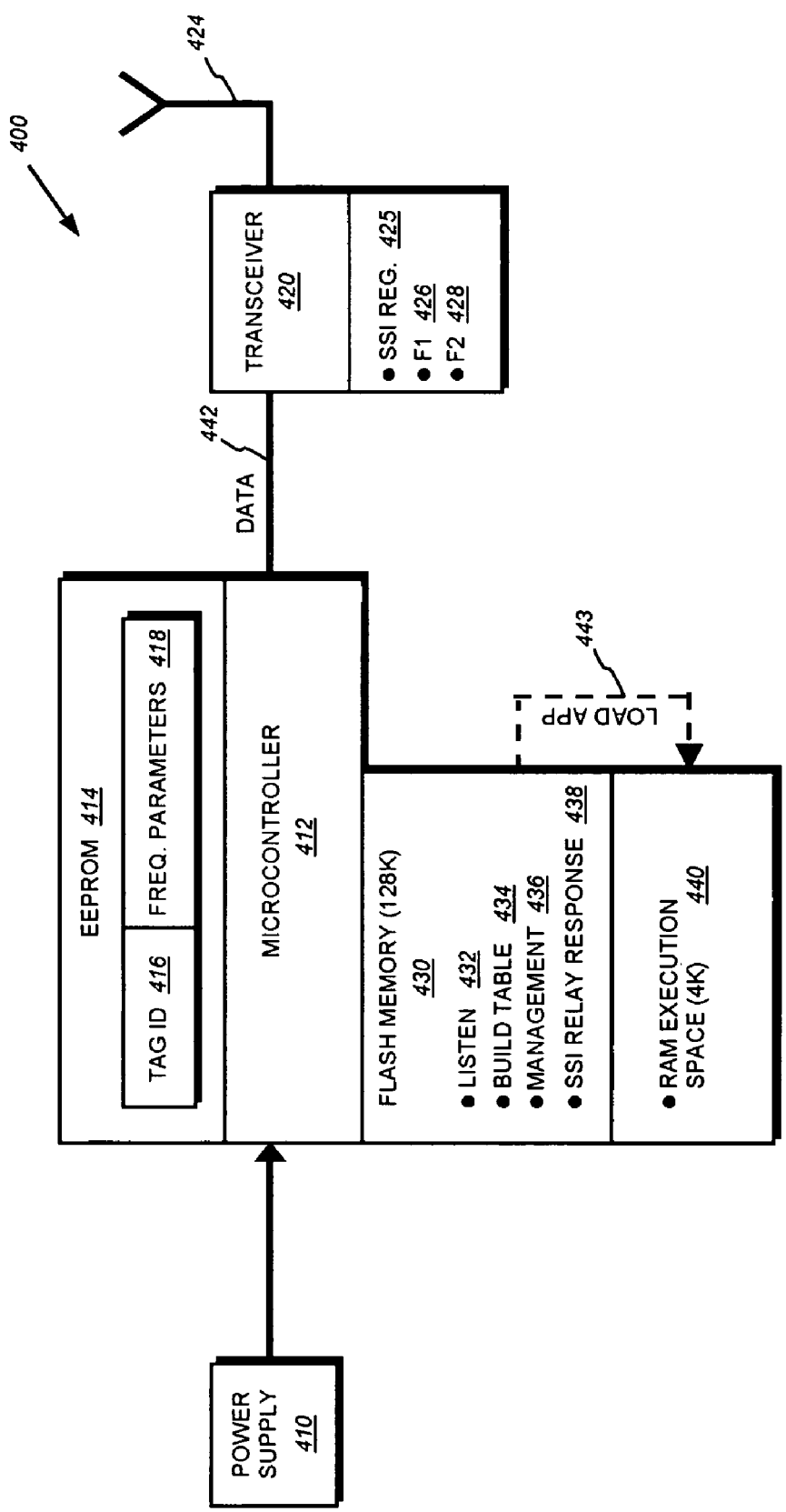
FIG. 4 is a simplified block diagram of a relay for use in the system of FIG. 1.

FIG. 4 details a block diagram of the internal structure of an active relay 400 according to an embodiment of this invention. As noted above, relays are located strategically throughout a facility and form the primary matrix of tracking components. The relay 400 is powered by an appropriate power supply 410 that can derive current from an AC source or large battery. The relay contains a microcontroller or microprocessor 412 that performs predetermined functions as described below. In this example, the microcontroller is an ATmega128L chip available from Atmel Corporation of San Jose, Calif. Note, it is expressly contemplated that any acceptable microprocessor, microcontroller, state machine or other circuit capable of carrying out the general functions described herein can be employed as the "RF microcontroller" as termed herein.

The RF microcontroller 412 communicates with an Erasable Programmable Read-Only Memory (EEPROM) 414 that stores a unique, standard-length (32-bits in this example) numerical identifier (Tag ID 416) for the relay and data relating to the frequency parameters 418 at which the relay 400 transmits and receives. In this embodiment at least two frequencies F1 and F2 are specified. Briefly, F1 is a contention channel upon which tags transmit and are received by the relay, and F2 is a dedicated channel used between the relays and the access points for management functions and data transfer. Note that, in this embodiment, the values for Tag ID, F1 and F2 are stored in the EEPROM at manufacturing time, when the relay is initially configured. Appropriate wired and wireless interfaces can be provided on the relay (serial port, USB, etc) to allow reconfiguration and update to application code where appropriate, such as where there is a frequency conflict that is discovered during system installation in a facility.

The RF microcontroller 412 also communicates via a conventional Data Bus 442 (operating under a variety of standards such as the well-known Serial Peripheral Interface (SPI) bus standard) with a commercially available transceiver chip 420 that may be a standard RF211-type chip in this embodiment operating at 915 MHz. In one example, the chip is an Atmel Corporation AT86RF211 transceiver capable of up to 64K bits per second half-duplex transmission up to a 100-foot range indoors. This chip can operate at 433 MHz, 868 MHz or 915 MHz. Again any acceptable transceiver circuit can be employed as the "RF transceiver" circuit or chip as termed herein. The transceiver chip 420 includes an antenna element 424 that allows communication over the two (or more) frequencies or channels F1 and F2 with tags and access points. The transceiver 420 includes a register that stores the current received signal strength (a Signal Strength Indicator (SSI) register 425). A signal strength measurement function is inherent in the commercially available RF transceiver chip and delivers a numerical SSI value for the received signal (the received Tag ID signal) within a predetermined range of strength values. Likewise registers 426 and 428 that respectively store frequencies F1 and F2 are included on the transceiver chip 420. These registers load their values from the above-described EEPROM 414 via the Data Bus 442 at relay power-up.

Note as used throughout this Description, the term "RF" shall generally refer to transmission of data between relays, tags and access points using transceiver chips that function generally like the above-described RF211 chip. It is expressly contemplated that the term "RF" as used in this context shall be taken broadly to include a number of frequencies, bandwidths and types of electromagnetic (or light) energy, all of which have the capability of conveying information over a distance without cables, conduits or wires. Thus, this Description shall not be limited to any frequency range or type of electromagnetic energy type insofar as transmission of information between system components (tags, relays, access points, other components such as readers) is concerned. There is also provided a so-called "WiFi" or "WLAN" capability within, for example, access points that employ their own type of radio communication at appropriate frequencies. The WiFi component of this invention may be implemented according to conventional techniques using conventional wireless networking equipment.

With reference further to FIG. 4, the microcontroller 412 also interfaces with a FLASH memory 430 that stores the necessary applications employed by the relay 400 in executing its functions. Briefly, these functions include (1) a "listen" function 432 that monitors for transmissions; (2) a "build table" function 434 that builds and maintains a list of Tag IDs received from proximate tags; (3) a "management" function 436 that allows communication with the access point via F2; and (4) a "signal strength indication (SSI) response" 438 that reports the relative signal strength of the received Tag ID based upon values stored in the transceiver chip's SSI register 425. There is also provided a random access memory (RAM) 440 for storing code and data that is used in executing various microcontroller functions. Applications from the Flash 430 and data manipulated by the microcontroller are loaded into the RAM as required as represented by the dashed line 443.

Figure 5:
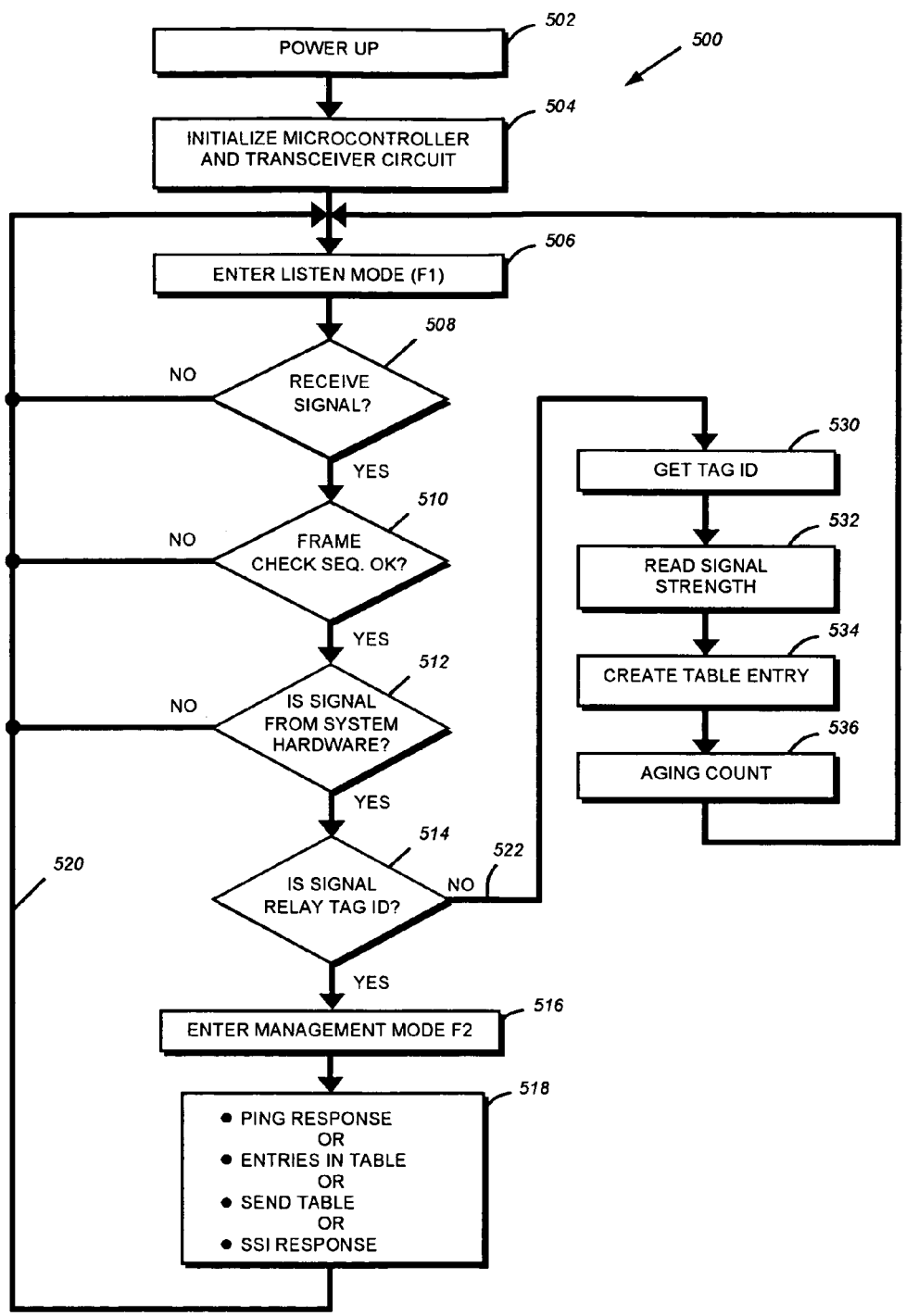
FIG. 5 is a flow diagram of an operational procedure for the relay of FIG. 4.

FIG. 5 describes generally the procedure 500 by which the relay 400 operates. It is assumed that relay operation initiates at power up as shown in step 502. After power up, the microcontroller and the transceiver chips are initialized and appropriate registers are loaded from memory in step 504. The relay then enters listen mode in step 506, in which it awaits receipt of a signal on frequency F1 (the contention band herein). According to decision step 508, the procedure continually cycles in listen mode until an appropriate signal presents itself. The procedure then determines (decision step 510) whether the signal comports with the parameters of a predetermined frame check sequence (FCS). This is a set of data embedded within the signal that confirm it is a correct and proper signal. If the signal fails the FCS, then the procedure simply cycles back to await the next received signal. A signal may fail the FCS for a variety of reasons. Interference may corrupt part of a received signal packet. The signal packet may be incomplete if the transmitting device moves out range during transmission. Similarly, the packet may be corrupted by overlap with one or more other tags that are transmitting at approximately the same time. As discussed below with reference to Tags, the tags chirp their Tag ID at random intervals to aid in preventing excessive overlap.

If the FCS in decision step 510 is passed, then the procedure 500 determines (decision step 512) whether the signal packet contains the necessary identifiers attributed to a piece of system hardware (in other words, the signal is from a component that is part of the installed system and not from a "foreign" system). If the signal is not from a piece of system hardware, then the procedure again cycles back to listen for a new signal. Otherwise, (if the signal in fact originates from system hardware), the procedure then determines (decision step 514) whether the signal contains the relay's unique Tag ID (416, stored in EEPROM 414 in FIG. 4).

If the signal contains the relay's Tag ID (sometimes termed a "relay ID"), then it is assumed to be a management request, which causes the relay to enter management mode and switch to communication on F2 (step 516). F2 is a dedicated channel used for management and other point-to-point communication. Note that additional channels may be employed where appropriate. These multiple frequencies/channels may be used to delineate between different device types, with each type assigned to a particular channel. Typically, a Tag ID would be issued by an adjacent access point that has knowledge of the existence of the relay and requires information from the relay. The signal having the Tag ID contains a message payload that includes an appropriate management request. The specified management request causes at least one of a plurality of management responses by the relay to occur and be transmitted back to the access point or other requesting device via F2 (step 518).

For brevity, step 518 represents the various responses provided by the relay for particular management requests. For example a device may issue a ping request that causes the relay to send back an appropriate packet, such as its Tag ID. This would be used to ensure the relay was online and functioning properly. In addition, the requesting device may wish to know how many entries are in the relay's table. If so, the relay transmits the current number of entries over F2. Likewise, the requesting device may want a listing of the table with all appropriate entries (Tag IDs and SSI information). This would be used as part of the location tracking cycle as described in detail below. Also, the requesting device may wish to know the current signal strength of the device's transmission on F1. This would be responded to by determining the current signal strength of the requesting signal (via inherent functions of the transceiver chip) and returning that determined strength value in a response message. Other management requests and responses are expressly contemplated and can be implemented as desired. When a management response is completed (step 518), the procedure 500 returns to F1 (branch 520) and reenters listen mode (step 506).

Where the F1 signal passes the FCS and is from a system device, but does not include the relay's tag ID it is assumed to be a signal from a tag or other device requiring location. In this case, the decision step 514 branches along branch 522 as shown in the flow diagram of FIG. 5 to a set of listen-mode steps. The signal is parsed to resolve the sending device's Tag ID in step 530. Then, in step 532, the signal strength of the received F1 signal is determined via the transceiver's inherent SSI functions. Based upon these two values (Tag ID and SSI), an entry in the Tag ID table of the relay is created (step 534). This table is stored in RAM and takes the form as shown in FIG. 6.

With reference now to FIG. 6, an exemplary relay Tag ID table 600 is shown that is built according to the relay's operational procedure 500 in FIG. 5 and particularly with reference to listen mode steps 530, 532 and 534. The table 600 includes one or more entries 630 having the reading device's (e.g. the relay's) own Tag ID so that access points and other components (e.g. the location server) can associate each entry in the table with the device (and, hence, the location) that received it. The table further 600 consists of a listing of received and identified Tag IDs 610, their relative measured signal strengths (SSIs) 620 and an associated device type 630 for the device that transmitted the Tag ID. The device type 630 can be a general identifier embedded in the overall Tag ID that is resolved by the microcontroller via table look-up or similar techniques. For example, the device type may be an equipment tag, bracelet, or the like. This information may assist in determining how a particular Tag ID data is to be handled by the access points and server.

In addition, the relay's Tag ID table 600 includes an aging bit (or bits) associated with each Tag ID entry. In one example, the aging bit increments after a given time (2-3 seconds for example). Each time the Tag is heard by the relay, the aging bit decrements by one (back to a minimum value of zero (0)). If the particular Tag ID is not heard within a given number of time cycles, the aging bit increments (to a value of one (1) for example), thereby causing the entry to be deleted from the table 600 by the table-building application. The deletion of aged entries prevents the table from growing excessively large. If the deleted Tag ID is subsequently received again by the relay, then the entry for this Tag ID is reestablished in the table 600 and the aging bit is reset to zero (0). With reference to the procedure 500 of FIG. 5, an exemplary aging count 536 occurs after each received F1 signal. This aging count is appended to all entries in the table, and after a given entry passes a predetermined count value, it is deleted by the table building application of the relay's microcontroller. In one example, tags and other devices "chirp" with their Tag ID signal every two seconds. This provides an aging count approximately every two seconds. In an alternate implementation a counter in the relay simply increments the aging column periodically and receipt of a Tag ID returns that ID's entry to zero.

Figure 7:
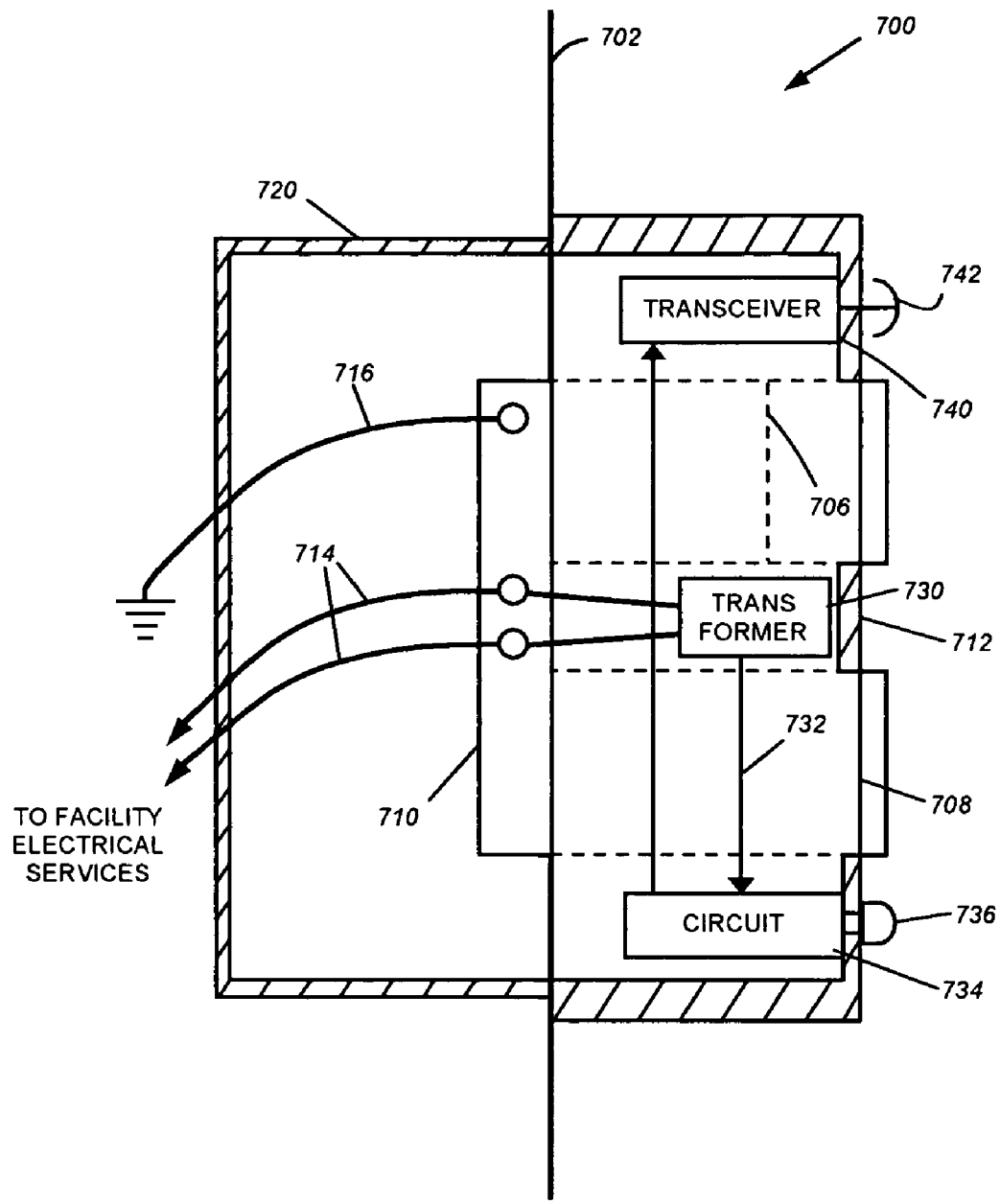
FIG. 7 is a schematic partially exposed side view of a wall-outlet mounted package for housing and powering the relay of FIG. 4 in accordance with an embodiment of this invention.

Having described the basic structure and function of a relay in accordance with an embodiment of this invention, an exemplary package for housing and powering one type of relay is shown in FIG. 7. In particular, the relay is housed within a modified AC current wall outlet plate 700 as shown schematically. This plate 700 extends outwardly from the wall surface 702 to provide needed clearance for various relay circuitry. A pair of conventional sockets 706 and 708 are provided in conventional over-under fashion (typically a two-gang or four-gang socket arrangement). These sockets tie into a terminal base 710. The sockets may be sized to fit flushly (or slightly proud of) the front face 712 of the plate 700. The terminal base is tied to a pair of conventional 120 or 240 VAC leads 714 and to ground 716 found within a conventional, recessed outlet box 720 mounted on a facility wall, or another structural panel. The leads 714 are connected to the sockets 706 and 708 in a conventional manner. The leads are also connected to a transformer circuit 730 that reduces the voltage and rectifies the current to that needed to power the relay's microcontroller and related circuitry 734. This circuitry is embedded at one or more appropriate locations in the plate 700. One or more indicator lights 736 may interconnect to the circuitry and provide an externally visible indicator of status and power where appropriate. The circuitry 734 is tied to the transceiver 740. The transceiver 740 interconnects to an antenna 742 that can be exposed as shown or embedded with RF-transmissive materials (plastic) within the body of the plate 700. This package provides a low profile, powered and aesthetically neutral implementation of relays at locations that are inherently predictably spaced within a facility (by virtue of building code-based outlet-placement standards).

In some embodiments, a backup battery can also be provided in connection with the transformer to provide emergency power in the event of an AC current interruption. Note, in an alternate embodiment the plate can be a plug-in module that mounts directly over the existing two or four-gang socket arrangement. The plug-in version of the plate can include appropriate pass-through connections for standard sockets (similar to those shown for the "hard-wired" version above). Clearly relays can be provided in a variety of alternate package arrangements to suit both the functional and aesthetic requirements of the facility. For example, relays that particularly mount upon equipment or even moving items, such as wheelchairs and carts can also be provided where appropriate.

To this end, mobile relays (124 in FIG. 1) may be provided in the system. A mobile relay can be adapted to listen for Tag IDs as they come into range of the relay as it travels about the facility. Such a relay can be attached to a dedicated robot or track-mounted shuttle (similar to a model train, for example) or it can be mounted on a piece of equipment like a forklift. In fact, given an appropriate weight and size, a mobile relay can be appended to a person. This type of relay is powered by a rechargeable battery, dynamo or other suitable power source that allows for mobility. The tag IDs are stored (with ID number, SSI, etc, as desired) in the relay's specialized table 114. The entries from the table are read into an adjacent access point at the appropriate time, either at the direction of the relay 124 itself in response to a request for a readout of the table 114 by the access point. The mobile relay can provide basic presence/absence data for tags in its range of travel or can provide roving location data where the present position of the relay is known (for example, via an onboard encoder or global positioning system device). If current relay location is known, that location can be appended to the Tag ID information in the table 114 each time a Tag ID is heard and entered. One advantage to mobile relays is their ability to confirm the presence of certain tagged assets that are essentially outside the range of fixed relays and/or access points within a facility due to distance, RF interference, and the like. In this instance, the moving relay acts as an extension of the normal range of the fixed-position system components. To this end, it may include a channel-F1 listening range that is greater than fixed relays. Again, such a mobile relay can be quite useful for tracking inventory and relatively fixed assets for which presence within the facility, rather than precise location, is a primary concern (though locational precision can be attained using a mobile relay through a variety of techniques).

Tags

Figure 8:
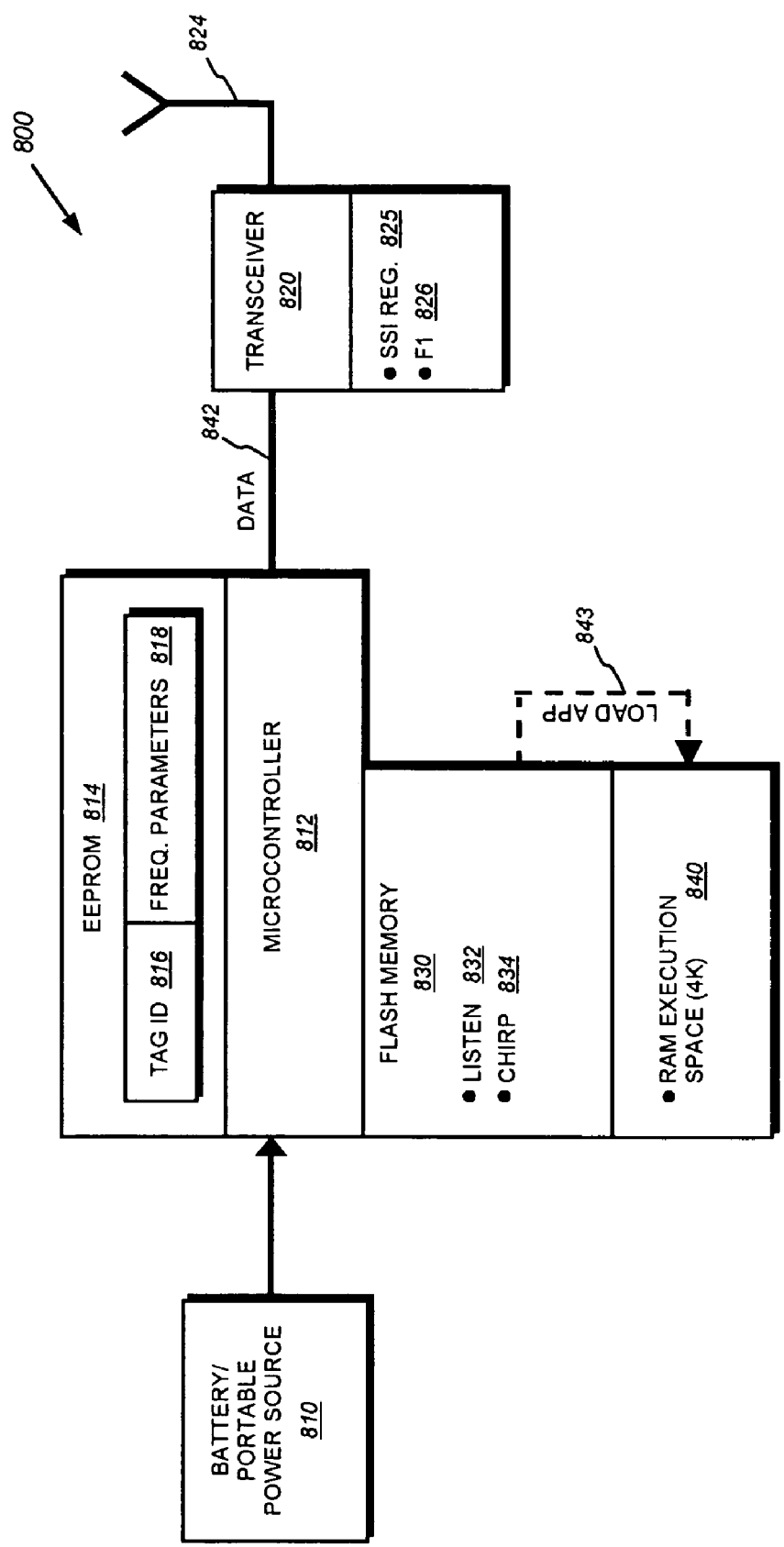
FIG. 8 is a block diagram of a tag for use in the system of FIG. 1.

FIG. 8 shows a block diagram of the internal structure of a typical tag 800 according to an embodiment of this invention. The generalized circuit arrangement is somewhat similar to the relay 400 of FIG. 4. It is contemplated that tags may be constructed to mount within lightweight, durable, weather-resistant packages that may be worn on a wrist (as a bracelet), coat pocket or another bodily location. They may be constructed using inexpensive mass-production techniques with an expectation of disposability at some point in their use cycle. They are the most numerous components within the overall system and may often move into and out of the system at any time and may appear at any location within the system at any time.

As shown in FIG. 8, the tag 800 includes a power source 810 that can be a small long-life battery or another type of power source, such as a photovoltaic cell, electromagnetic inductor (and storage capacitor), dynamo or micro fuel cell. A combination of such sources can also be provided. The power source powers the components of the tag which include a microcontroller 812 or other processor that may be of a type generally described above. The microprocessor communicates with an Electronically Erasable Programmable Read-Only Memory (EEPROM) 814 that stores a unique, standard-length (32-bits in this example) numerical identifier (Tag ID 816) for the tag 800 and data relating to the frequency parameters 818 at which the tag 800 transmits and receives. In this embodiment a single frequency, the above-described contention channel F1 is specified. It is not contemplated that the direct/management channel will be needed for a tag, as it does not build individual tables in this embodiment. In alternate embodiments tags may be provided with additional functions (beyond those to be described below). Such functions may benefit from the establishment of two or more frequencies over which the tag would operate. As described generally above for relays, in this embodiment, the values for Tag ID and F1 and F2 are stored in the EEPROM at manufacturing time, when the tag is initially configured. Appropriate wired and wireless interfaces can be provided on the tag (serial port, USB, etc) to allow reconfiguration and update to application code where appropriate, such as where there is a frequency conflict that is discovered during system installation in a facility.

The microcontroller 812 also communicates via a conventional Data Bus 842 with a commercially available transceiver chip 820 that may be a standard RF211-type chip in this embodiment operating at 915 MHz. This transceiver chip 820 includes an antenna element 824 that allows communication over F1 with relays and access points that are in range of the tag 800. The transceiver 820 includes a register that stores the current received signal strength (a Signal Strength Indicator (SSI) register 825). A signal strength measurement function is inherent in the commercially available RF211 chip of the illustrative embodiment, and delivers a numerical SSI value for the received signal (the received Tag ID signal) within a predetermined range of strength values. Likewise a register 826 that stores frequency F1 is appended to the transceiver chip 820. These registers 824, 826 load their values from the above-described EEPROM 814 via the Data Bus 842 at tag power-up.

The microcontroller 812 also interfaces with a FLASH memory 830 that stores the necessary applications employed by the tag 800 in executing its functions. Briefly, these functions include (1) a "listen" function 832 that monitors for transmissions to the tag; (2) a "chirp" function 834 that sends a predetermined periodic signal containing the tag's Tag ID and other needed information (for example, FCS and system related data). The chirp function is the basic location signal that, as described in detail below, allows each tag to be located by the system. Within the tag 800, there is also provided a random access memory (RAM) 840 for storing code and data that is used in executing various microcontroller functions. Applications from the Flash 830 and data manipulated by the microcontroller are loaded into the RAM as required as represented by the dashed line 843.

Figure 9:
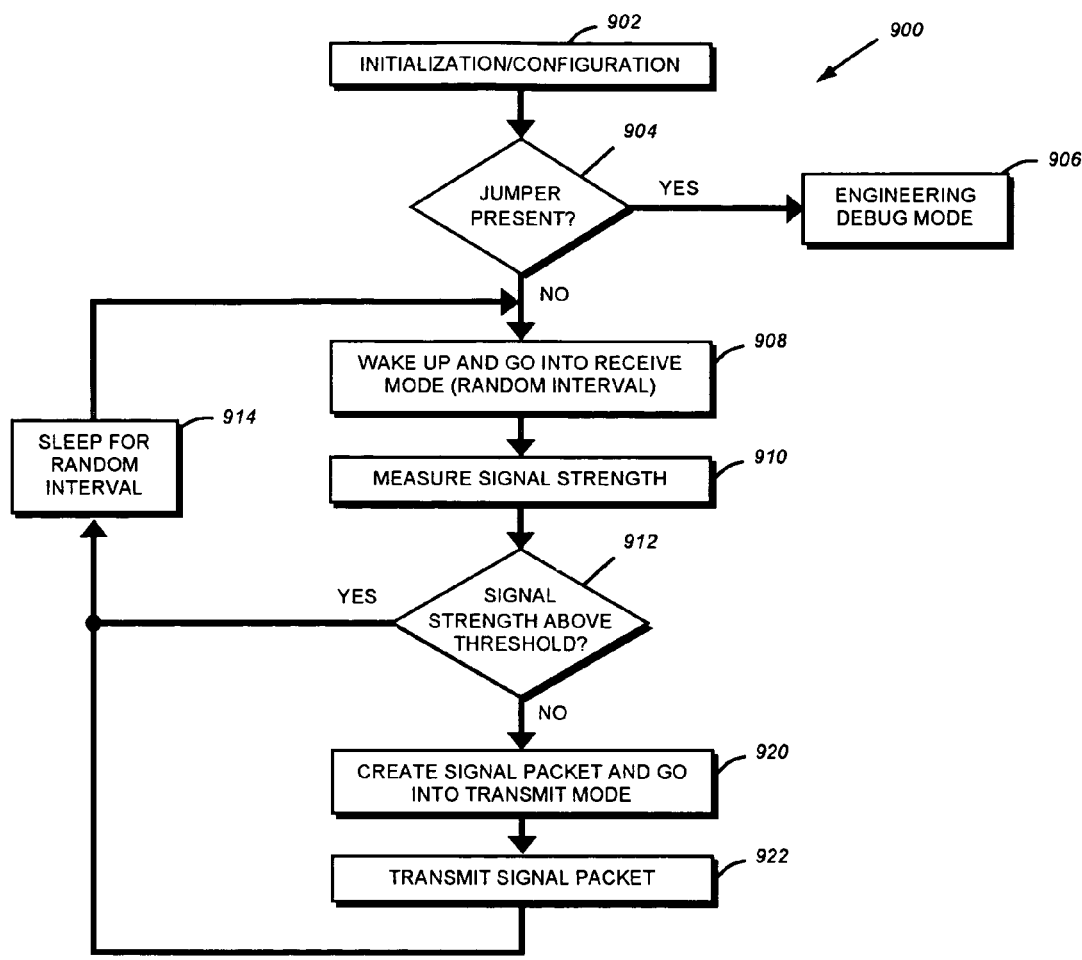
FIG. 9 is a flow diagram of an operational procedure for the chirp mode of the tag of FIG. 8.

FIG. 9 describes generally the procedure 900 by which the tag 800 operates in "chirp" mode. First, the tag experiences an initialization and configuration operation (step 902). This can be in conjunction with the pressing of a reset button or a power-up event. The microcontroller looks for the connection of a jumper or other external structure (decision step 904). If the jumper is connected, then the microcontroller enters an engineering debug mode (step 906), thereby allowing program instructions and/or other data to be entered into the Flash or EEPROM (typically using a command line interface or similar function).

If the jumper is not present, then the chirp procedure 900 branches (via decision step 904) to a wake-up step (step 908). The wake up step occurs at a random or pseudorandom interval within an overall range of time intervals (e.g. 1-3 seconds). In this manner, the chirp occurs at a time that is less likely to overlap the chirp times of other local tags. This prevents too many chirps from overloading channel F1 at once, and thereby corrupting the received packet at a given relay or access point (leading to failure of the FCS as described above). Upon wake up, the tag sets itself to briefly receive over F1 to, in essence, "sniff" the band for competing signals/collisions (the tag thereby enters "receive mode"). The tag checks for competing signals by checking the F1 signal strength using the transceiver's inherent SSI functions (step 910). If the F1 channel registers a signal strength (SSI) above a predetermined threshold level (i.e. noise), it is assumed to be busy with another local transmission from a tag (or other device). Thus, the decision step 912 puts the tag back to sleep for a random interval (step 914) and then reenters the wake up step 908 thereafter. When the measured SSI is finally below the predetermined threshold level, the channel F1 is assumed to be clear to transmit by the tag and the decision step 912 branches to step 920. At this time the microcontroller creates the appropriate signal packet to be transmitted by the tag, including the tag's unique 32-bit Tag ID and other system information (described below). The tag thereby enters "transmit mode." The signal packet is transmitted immediately following or concurrent with creation (step 922). Thereafter, the procedure renters sleep mode (step 914) for a random interval until wake up step 908) again occurs and the next chirp is eventually transmitted.

Figure 10:
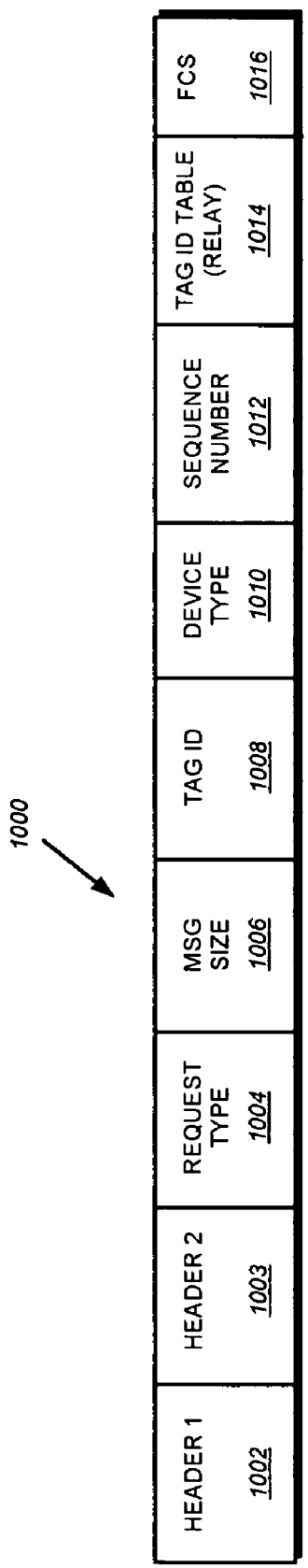
FIG. 10 is a block diagram of a generalized message packet format for use by tags, relays, access points and other transmitting/receiving devices and components of the system of FIG. 1.

Having described the chirp procedure 900 in FIG. 9, reference is now made briefly to FIG. 10, which shows an exemplary signal message packet structure 1000 for use by both F1 and F2-channel communication in accordance with an embodiment of this invention. This message structure is used by Tags, relays, access points and any other device transmitting messages over F1 and F2. It should be clear that a variety of message formats can be employed. In general, one goal of a message packet is to convey needed information, such as device identification and the device's requested task (if any). Another goal is to ensure that the packet is accurately understood by the receiving device and that corrupted or invalid packets are easily identified and appropriately dealt with.

The packet 1000 includes a two-byte header 1002, 1003 that uniquely identifies the packet as system hardware. Where appropriate, there is a field for request type 1004. This field lists a code for a type of request (for example, ping request, SSI request, table entry request, table request) for which a response is desired. These requests are general to all units within listening range, and thus, typically do not include the address of the receiving device. All devices that are capable of responding will respond in like message packet form to a given request.

The packet 1000 further includes a message size field 1006 that give the number of bits/bytes in the overall packet. The packet 1000 also carries the 32-bit Tag ID 1008 unique to the particular transmitting device (tag, relay, access point, etc.). In addition the packet includes a field 1010 disclosing the transmitting device's "device type." A number of discrete identifiers are assigned to types of transmitting devices. For example one or more types may be used for relays and for access points. Further a number of specific device types may be employed for different types of tags. A particular type may be assigned to bracelets, another type to staff badges and further types assigned to equipment tags and/or movable assets (carts, etc.). Device type data may be used to decide how to handle the packet when it is received. Some device types may have greater priority than others or cause particular alarms to be sounded locally.

The packet also includes a sequence number field 1012 that is used in the case of multiple message packets for a given request or response. This ensures the messages are placed in the proper order upon receipt by the receiving device. Where appropriate (e.g. table response) the packet 1000 can include a Tag ID table field 1014 that is filled with the data of a relay's Tag ID table (see FIG. 6 above). This message is generally used only by relays and the associated Tag ID-table-building functions of access points, since tags do not build/transmit tables in this embodiment. Finally, the packet includes a frame check sequence (FCS) field with a code that ensures the packet is complete and that is interpreted by the receiving device to indicate receipt of a complete, uncorrupted packet. The FCS can include checksum or similar information unique to the packet's structure.

Figure 11:
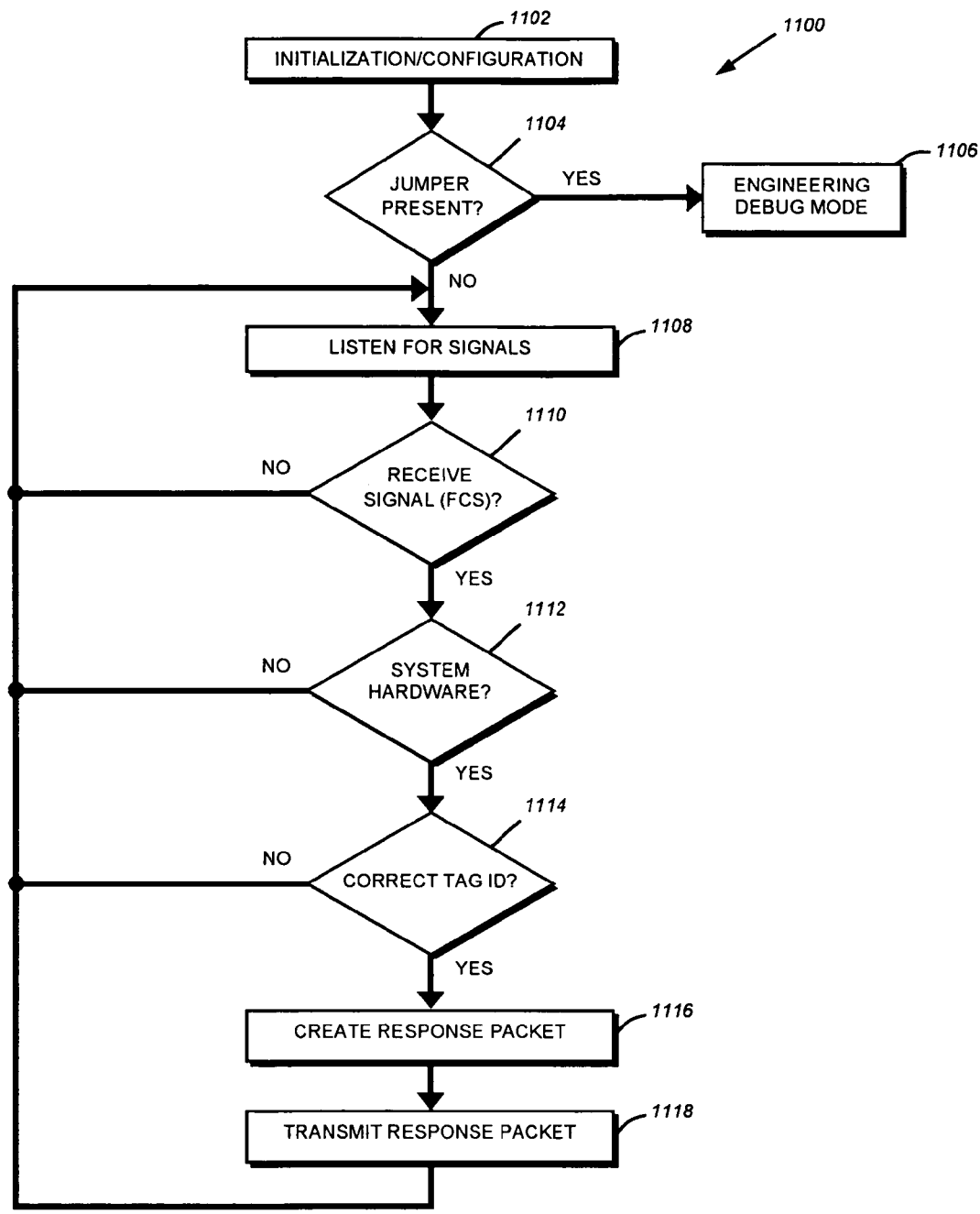
FIG. 11 is a flow diagram of an operational procedure for the listen mode of the tag of FIG. 8.

Since the tag 800 (FIG. 8) has applications for both a chirp mode (834) and listen mode (832), the procedure 1100 applicable to the listen mode is now described with reference to FIG. 11. The listen mode is an optional configuration in which, instead of chirping at a give (random) interval, the tag specifically listens for a stimulus from the relay/access point to provide a responsive message. This procedure may be useful for introducing new, formerly unidentified tags to the system. In this alternate procedure 1100, first the tag experiences the initialization and configuration operation (step 1102) as described generally above. The microcontroller 812 looks for the connection of a jumper or other external structure (decision step 1104). If the jumper is connected, then the microcontroller enters the engineering debug mode (step 1106), thereby allowing program instructions and/or other data to be entered into the Flash or EEPROM via a command line interface or similar function.

If the jumper is not present, then the listen procedure 1100 branches (via decision step 1104) to a listen step (step 1108) in which the receiver of the tag actively listens for a signal that may include a request with the Tag ID of the particular receiving tag. Upon receiving a signal, the procedure 1100 checks (decision step 1110) whether the signal is complete and FCS is passed. If not, the procedure continues listening (step 1108). If the signal is complete, then the procedure confirms that the message is from system hardware (decision step 1112). Again, if not, the procedure 1100 cycles back to the listen step 1108. The procedure next confirms that the message received is for its unique Tag ID. If not then the procedure cycles back to listen. Otherwise, the procedure has confirmed that the message is for the particular tag and the procedure 1100 reads the request type and creates the appropriate response packet therefor (step 1116). The response is transmitted in the proper format back to the requesting device (relay access point, etc.) in step 1118.

Figure 12:
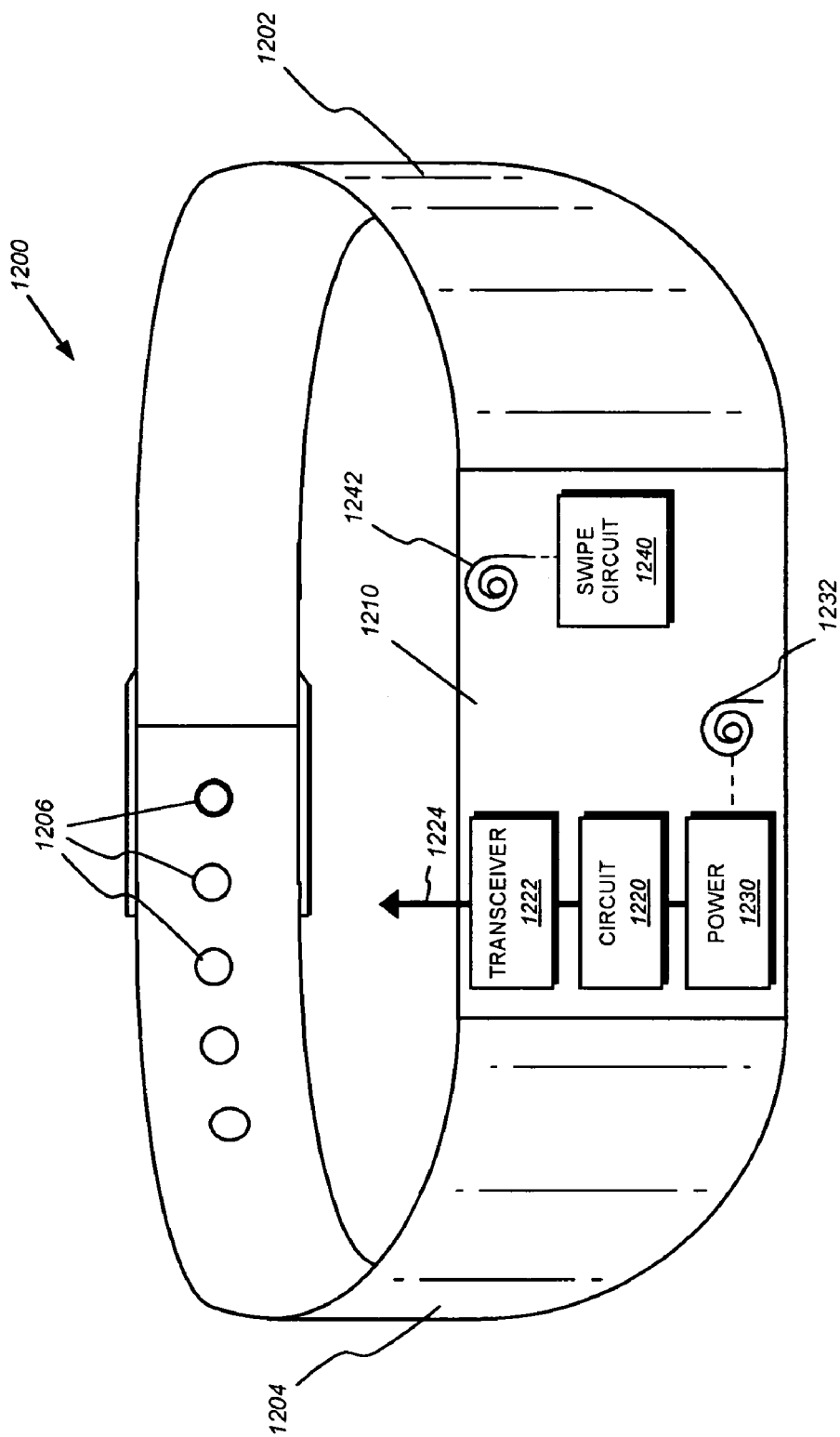
FIG. 12 is a schematic perspective view of an exemplary tag bracelet with RFID transceiver unit in accordance with an embodiment of this invention.

By way of example, FIG. 12 shows a generalized layout for a bracelet-worn tag 1200 in accordance with an embodiment of this invention. The tag 1200 is packaged on a plastic strap assembly 1202 and 1204 having an adjustable, multi-hole-and-pin clasp mechanism 1206 of conventional design. The straps 1202 and 1204 are sized and arranged to fit a wrist, ankle or other desired limb/appendage of the body (for example the neck in the case of animals). The straps 1202 and 1204 are joined to a mounting base 1210 that contains two separate RF devices in according to this embodiment. The first device is the Tag circuit (microcontroller and memory) and transceiver chips 1220 and 1222, respectively, described above. These chips 1220 and 1222 are operatively connected to an appropriate antenna 1224 for communicating with system components over channel F1 (and other channels where appropriate). A power source 1230 is provided for the chips 1220 and 1224. The power source can be a variety of compact structures such as a rechargeable/disposable battery, charging capacitor or micro fuel cell. In this example, the power source is a charging capacitor or rechargeable battery that is interconnected with an inductive coil antenna 1232. This antenna 1232 provides a small continual charge to the capacitor when in the presence of an appropriate RF field. A photovoltaic or other low-current charging source can be provided instead of the antenna in alternate embodiments.

This tag 1200 also includes a second RF circuit 1240 interconnected to an inductive antenna 1242. This arrangement is a conventional RF identification (RFID) to provide a predetermined identification code that is transmitted in the presence of an RF transmission produced by a swiping device, such as a wand. In the example of a hospital facility, this RFID device is swiped to verify the identification of the wearer and confirm contact before a dangerous drug is administered. A PDA or other device can be equipped with the appropriate swiper and can communicate with the location server (described below) via networked WIFI communication provided between a local access point and the PDA. The following is a hypothetical example of the bracelet's use. When a staff member (nurse) approaches the patient, the location server determines that the particular staff member's tag is now located near the patient's tag. The facility control application then determines that the staff member is assigned to the patient's care and transmits (or authorizes transmission of) the appropriate patient records to the PDA to prompt the staff-member to administer medication. The staff member is also prompted to swipe the bracelet to confirm the contact, and the data on the bracelet is downloaded to the location server and facility control application via the PDA's WIFI connection with an appropriate time stamp. This transaction provides an extra measure of confirmation that a drug was administered at a given time.

Having described the structure and function of exemplary relays and tags, a discussion of access points in accordance with an embodiment of this invention follows.

Access Points

Access points are fixed-base units that transmit and receive at increased power/range relative to relays and tags. They are usually set up in accordance with strict installation guidelines based upon the physical and RF profile of the facility. Access points are typically adapted for direct connection to an AC current source or another fixed source, such as power-over-Ethernet. Access points are generally connected by optical or wired network links to the location server, either directly, or via appropriate switches and hubs that are known to those skilled in the networking arts.

Figure 13:
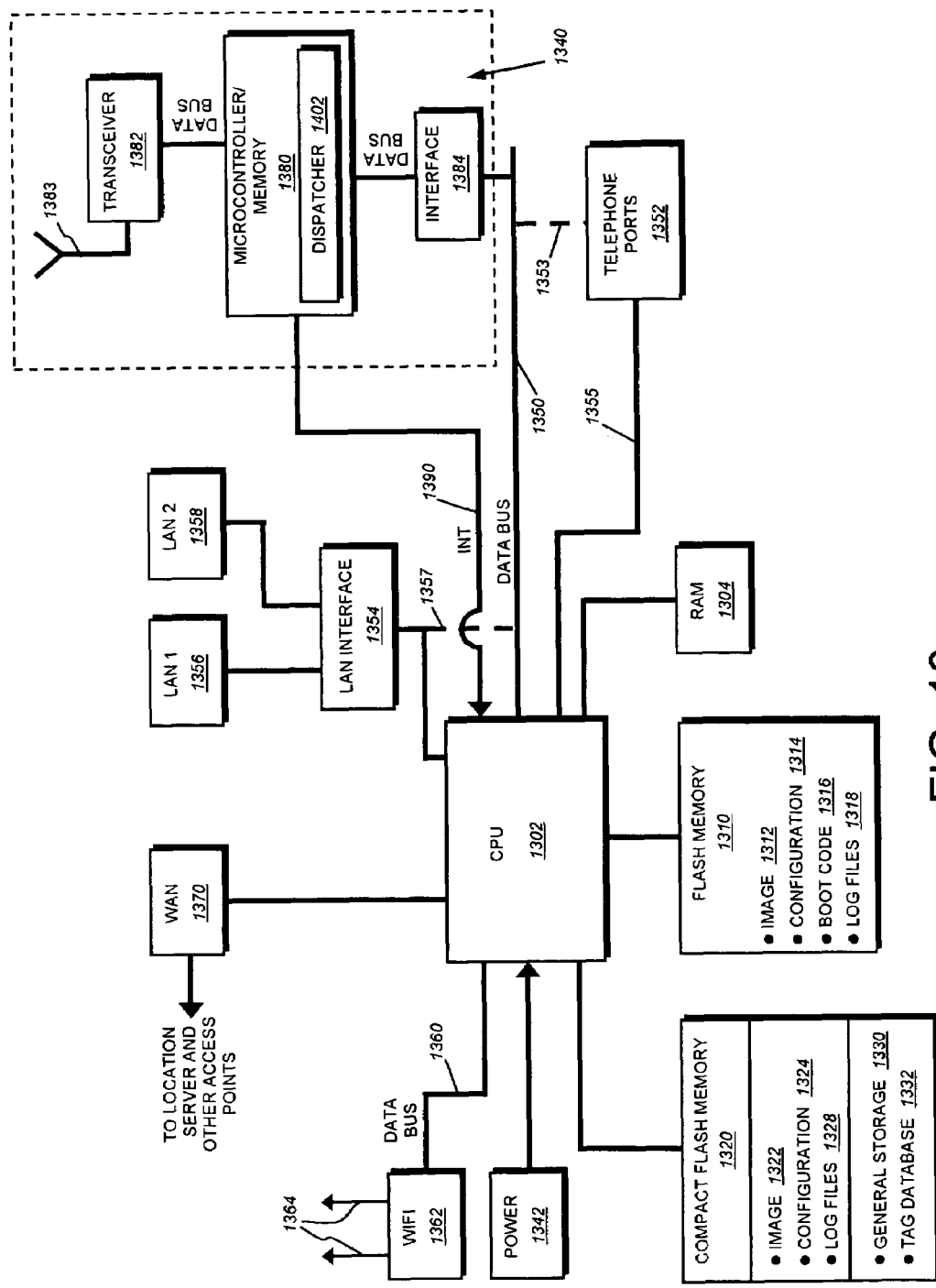
FIG. 13 is a block diagram of an access point for use in the system of FIG. 1.

FIG. 13 details the general layout of an access point 1300 according to an embodiment of this invention. The access point 1300 is based around a host central processing unit (CPU) 1302 that can be any acceptable microprocessor. In this example, the CPU is an IXP425 available from Intel Corp. of Santa Clara, Calif. Again, it is expressly contemplated that any acceptable microprocessor, microcontroller, state machine or other circuit that is generally capable of carrying out the functions described herein can be employed as the access point's "Host CPU" as termed herein. The host CPU 1302 is interconnected with a conventional RAM 1304 for storing applications and data used in executing required processes. A code-storage flash memory 1310 stores basic applications and other information used by the CPU 1302. These applications include the operating system image 1312, configuration parameters 1314 provided uniquely to the particular access point (e.g. IP addresses, etc.), boot code 1316 used at startup to allow the CPU to load its operating system into RAM 1304 and log files 1318 that store key events (failures, error messages, etc.) for subsequent playback if needed to diagnose a problem or symptom.

A compact flash memory 1320 is also interconnected with the CPU. This memory is adapted to receive and store a respective mirror copy 1322, 1324 and 1328 of the flash memory's (1310) image 1312, configuration 1314 and log files 1318. In this manner, in the event of a failure of the access point the compact flash 1320 can be removed and quickly reinstalled in a replacement access point with no loss of vital information. To this end, the compact flash 1320 also stores general information 1330 deemed to be important, such as recent transactions and requests. Moreover, the compact flash 1320 can optionally store a backup copy of the access point's current tag database 1332 (or a prior point-in-time snapshot of the tag database), which resides in the RAM 1304. As described further below, the access point's tag database is transferred regularly to the location server and is used by the server to establish the general location tables used to constantly track the location of all identified tags within the facility. In general, the location database includes information on all Tag ID tables transmitted from nearby relays and established locally at the access point from nearby tags themselves (using the access point's local transceiver 1340), as described further below. The compact flash 1320 is updated with new information according to any of a variety of techniques. In one example, the compact flash is overwritten with changed data (for example revised tag database information) based upon a periodic update interval (e.g. several seconds). In an alternate example, the compact flash 1320 is continually provided with incremental changes at the same time they are written to RAM.

Note that compact flash 1320 can also store certain information that is particularly important to certain Tag ID's. For example a patient with an allergy can be flagged on the compact flash so that the information is available at a console or WIFI device even if the overall network experiences failure.

The CPU 1302 receives power from a power supply 1342 that can be derived from AC current, a large battery or a network-cable-based power supply (e.g. Power-Over-Ethernet). Appropriate backup batteries can be interconnected to the fixed current source where appropriate to deal with power outages.

The CPU 1302 is interconnected to a variety of interfaces that facilitate several modes of data communication. For example, the access point CPU can support one or more telephone ports 1352 that allow basic wired and wireless telephone communication. Such communication can be based upon well-known voice-over-IP (VoIP) standards in one embodiment. Note that the Data Bus is shown linked via a dashed line 1353 to the telephone ports 1352. This separate connection exists for the purpose of configuration only, and online communication occurs via an appropriate link 1355.

The CPU 1302 also connects with a local area network (LAN) interface 1354 that allows interconnection with LAN ports 1356 and 1358 to which computing devices can be connected. While two ports are shown, the number of ports and the types of computing devices attached thereto are widely variable. In general, desktops, laptops, PDAs and network devices (printers, etc.) can all be connected to and communicate with the access point via the LAN. Such communication allows the access point to act as a computer network hub or port to the wider network (and Internet, etc.) and also enables administrators to access the CPU and program or diagnose it as needed. As described for the telephones 1352, the LAN port 1354 is interconnected with the Data Bus (dashed line 1357) for the purposes of configuration only.

The CPU also connects via an appropriate Data Bus 1360 to a WIFI interface 1362. This bus 1360 can employ the peripheral component interface (PCI) or another acceptable standard. The WiFi interface 1362 includes appropriate antennas 1364 to allow data communication in accordance with accepted standards such as 802.11 (a, b or g). Where a laptop computer, PDA or other device includes a WiFi transceiver, it can use the access point as a local communication port to a network. Likewise, wireless telephones may employ this port 1362 to carry on VoIP-based communication.

The CPU interconnects to a wide area network (WAN) interface 1370 that allows data from the various communication modalities to travel over the network to other access points or to the location server (and other interconnected servers, routers and switches). The WAN, in essence, connects the access point 1300 to the broader network of devices within the system.

Note that the LAN ports 1356, 1358, WAN 1370 and WiFi interface 1362 are all bridged by software to present a common IP address. Thus communication by a device with the access point can be accomplished via any (or all) of the various network assets provided.

As noted above, the Data Bus 1350 interconnects to an RF transceiver circuit 1340 that is similar in function and structure to a relay, such as that shown and described in FIGS. 4-6. In other words, the transceiver circuit 1340 contains a microcontroller and memory 1380 that interconnects via an internal Data Bus to an RF211 transceiver chip 1382 having an appropriate antenna 1383 for communicating over channels F1 and F2. Thus, the access point, in essence, contains an onboard relay that gathers tag ID data from tags that are within appropriate reception range. This information is transmitted between the microcontroller and CPU via so called "interprocessor communication" which is described in further detail below. An interface 1384 to the bus 1350 is provided. This interface allows transmission of received Tag ID data to the CPU 1302, since the access point does not perform wireless communication with its onboard relay as it does with remote relays, instead using interprocessor communication as described below.

Figure 14:
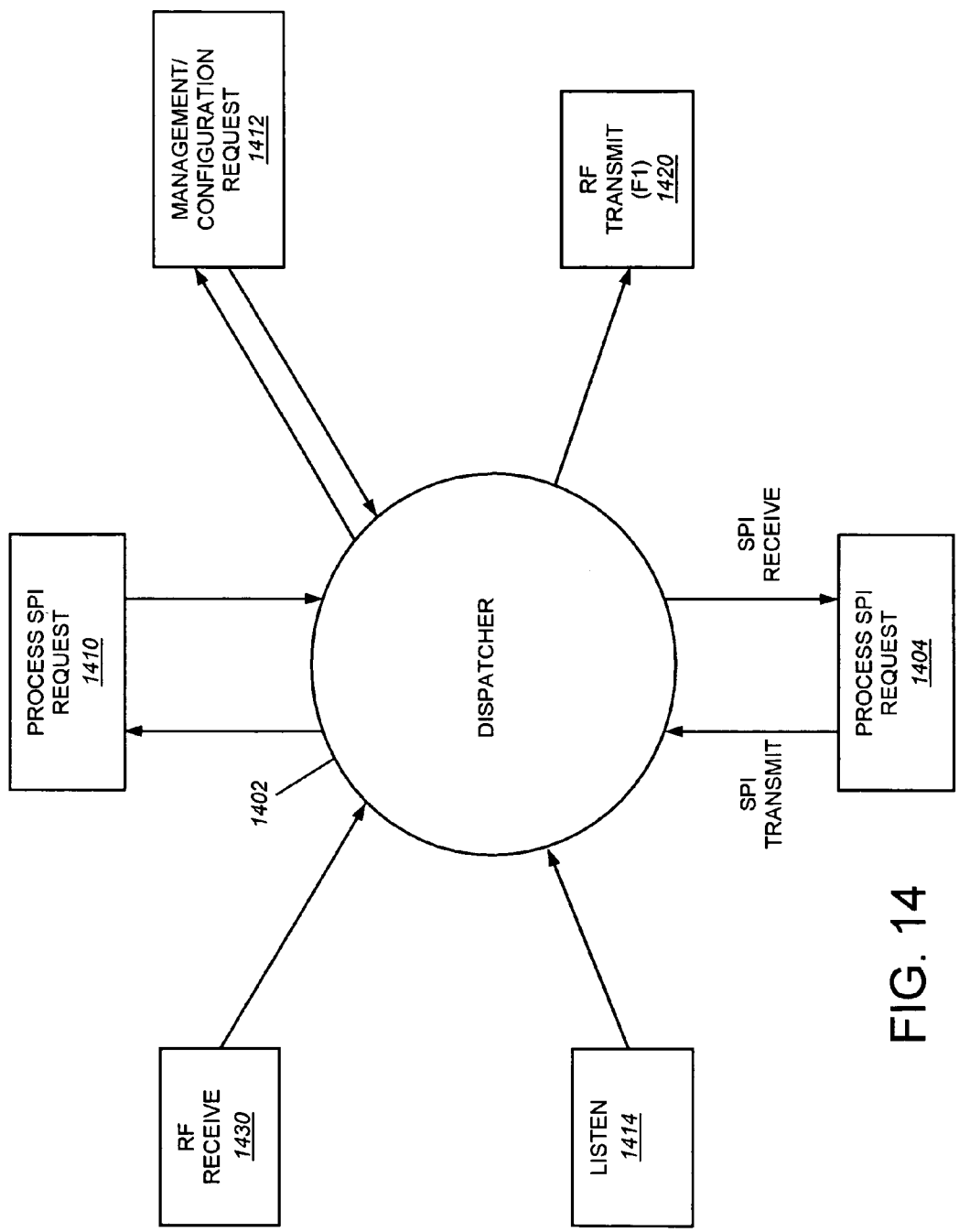
FIG. 14 is a schematic diagram of the basic functions of a dispatcher provided to the onboard RF transceiver microcontroller to handle interprocessor communication with the host CPU of the access point of FIG. 13.

Having described the general structure of the access point 1300, the function of the CPU to handle Tag ID information and other internal functions is described in further detail. Reference is, thus, made to FIG. 14 that shows a dispatcher application 1402 employed by the RF transceiver circuit's microcontroller 1380 for interprocessor communication, particularly to route information over the Data Bus between the access point's on-board RF transceiver microcontroller 1380 and the host CPU 1302.

Figure 15:
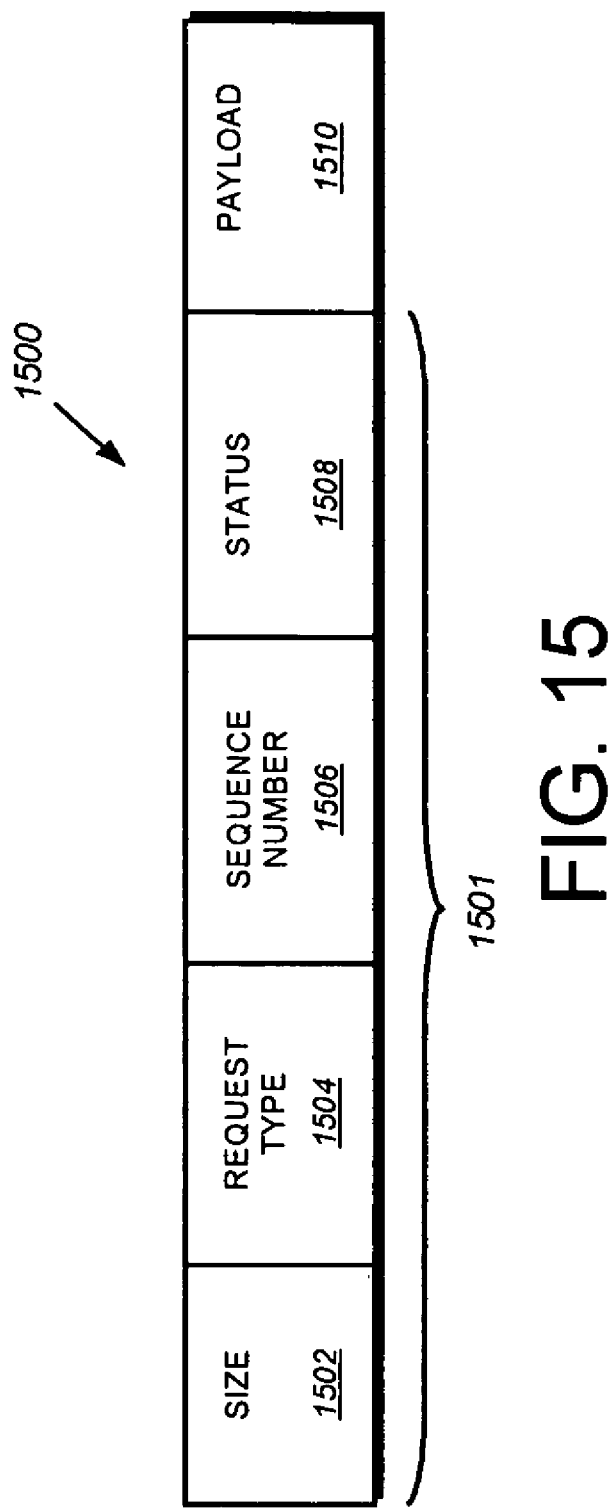
FIG. 15 is a block diagram of a generalized message packet format for use in interprocessor communication between the host CPU and RF transceiver microcontroller of the access point of FIG. 13.

The dispatcher communicates with a SPI bus driver 1404 that schedules the transmission and receipt of data over the SPI bus in a conventional SPI-compatible format. This format is shown in FIG. 15, described below. The dispatcher 1402 takes any messages received on the SPI bus (requests, management, etc.) and performs the appropriate process. For example, where the CPU issues a SPI-based request (provide table entries, provide relay Tag ID tables, SSI, etc.), the dispatcher processes the request (block 1410) and issues the appropriate response (entries, Tag ID table, SSI response, etc.) for transmission back to the host under control of the driver 1404. The dispatcher also processes management and configuration requests directed from the CPU to the microcontroller (block 1412).

The CPU may request that the microcontroller enter a listen mode (on channel F1) for Tag IDs (block 1414). As such, the microcontroller functions as a relay and collects chirps and other Tag-based messages and forwards them on to the host. In this example, the onboard relay simply shifts received listen-mode data from tags and relays on to the host CPU, rather than building a local Tag ID table.

Since the RF microcontroller/transceiver circuit is also the vehicle by which the access point communicates with adjacent relays in a master-slave mode, the dispatcher 1402 acts on the host CPU's instructions to transmit (on channel F1), messages to relays and tags (block 1420). These messages instruct the relays to, themselves, request pings, Tag IDs and SSI responses from adjacent tags. Likewise, the "relay" functionality in the access point's microcontroller also sends these requests directly to adjacent tags, in addition to acting as a master to other relays. In general, the dispatcher uses the RF transmit mode (block 1420) to request Tag ID tables from relays, ping relays and request relay SSI information.

Typically, after entering RF transmit mode, the dispatcher is instructed to enter an RF receive mode (block 1430) in either channel F1 or channel F2 to listen for tags, receive requested Tag ID tables from relays and receive ping replies from relays and tags. In summary, the access point's host CPU uses the dispatcher to instruct the access point's onboard microcontroller/transceiver to act as a relay, forwarding on received Tag IDs, and to operate as the access point's dedicated transceiver to handle communication with other relays within the area.

It should be noted that each access point is aware of the particular relays with which it is supposed to communicate. This relay list is generally stored in the location server and provided to the access point upon startup. It is contemplated that other techniques for establishing communication between the access point and associated relays can be implemented including a polling approach where each access point searches for adjacent relays with sufficient signal strength.

As noted above, interprocessor communication within the access point occurs over the SPI bus using a predetermined message format. While this format contains some of the same information as the RF-transmitted messages between remote relays and tags, it is particularly adapted to bus-based communication between the host CPU and RF transceiver microcontroller where corrupted packets are less problematic. FIG. 15 shows the formatted message packet 1500 for interprocessor communication according to an embodiment of this invention. In this exemplary embodiment, the packet 1500 is a maximum length of 64 bytes. Other lengths are expressly contemplated, however. The header 1501 of the packet includes a 1-byte packet "size" field 1502. This field contains a value relating to the total number of bytes in the packet. The header 1501 also includes a 1-byte "request type" field 1504 that follows the size field 1502. This field specifies the kind of request being made to the receiving processor. A list of requests, including ping, SSI, Tag ID table entries, Tag ID table, etc., are available to each processor and provided as a predetermined code. The header 1501 also includes a 1-byte sequence number field 1506. This field provides an order value where a bulk payload (greater than the maximum 64 bytes) is transmitted. Each packet in a bulk payload is ordered by providing it with a numerically distinct and succeeding sequence number. Note that discrete requests are each handled in non-sequenced packets wherever possible. Finally, the header 1501 contains a 1-byte status field 1508 that provides various status indications relative to the transmitting processor that are recognized by the receiver. One example is where the host CPU requests an update from a particular relay and the relay is unavailable. After attempting to receive an updated table from the relay, the microcontroller eventually times out and returns a message (via the dispatcher) indicating a "relay-unavailable" status to the host CPU.

Following the header 1501 in the packet 1500 there is a variable-length payload section 1510 that carries the information associated with the request—for example, the actual data of an updated Tag ID table from a particular relay as requested by the host.

Figure 16:
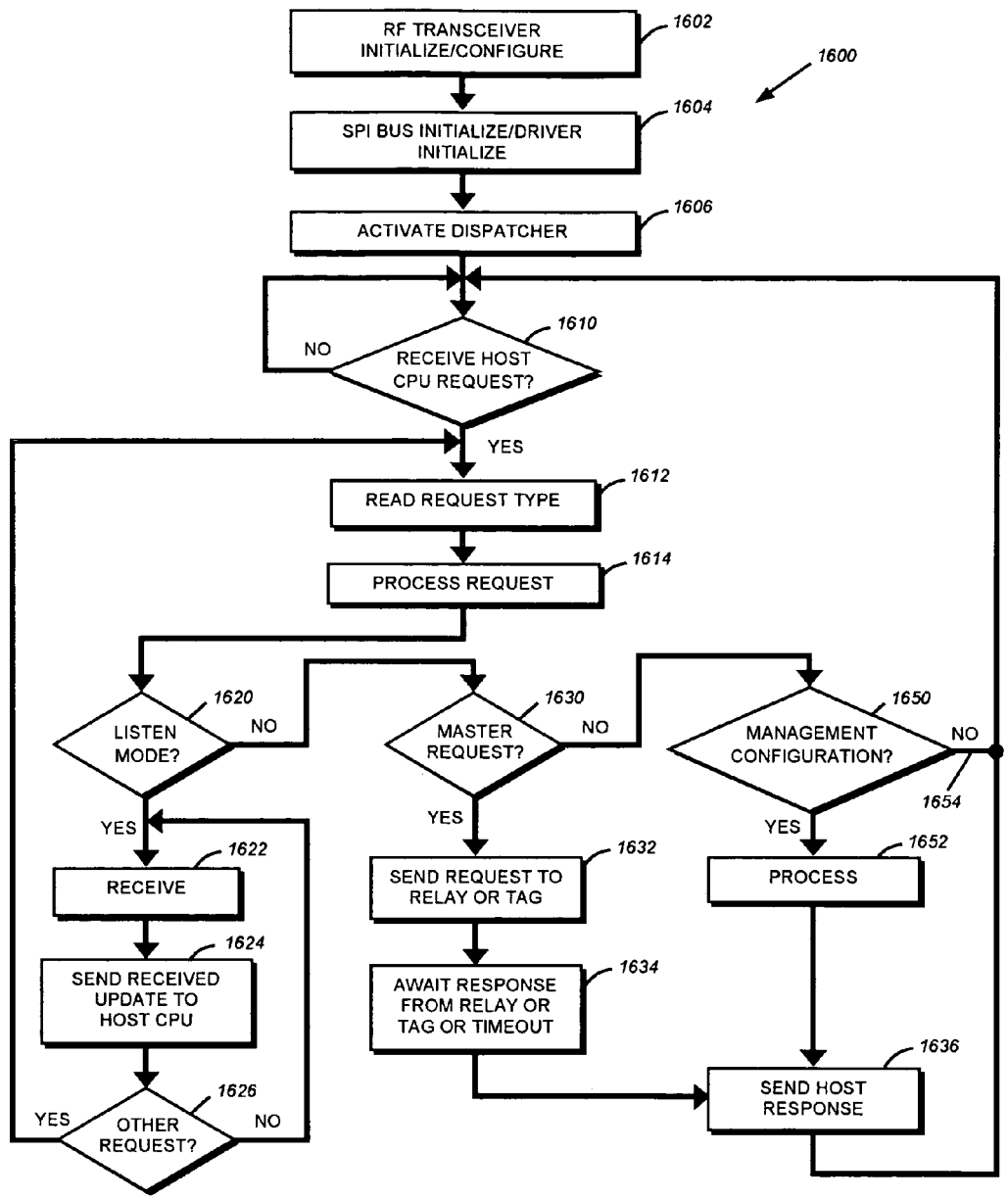
FIG. 16 is a simplified flow diagram of the procedure employed by the dispatcher of FIG. 14 to handle various requests issued by the host CPU for the access point of FIG. 13.

Referring briefly to FIG. 16, a generalized procedure 1600 employed by the dispatcher is shown. The procedure 1600 begins at access point power-up or reset, where the RF transceiver microcontroller circuit is initialized and configured (step 1602). The SPI bus and bus driver are also initialized (step 1604). The dispatcher application is then activated (step 1606). The dispatcher now awaits a request from the host CPU (decision step 1610). When a request is received, the microcontroller reads the request type (step 1612) from the header information and processes the request (step 1614). If the request is to enter listen mode (decision step 1620) then the transceiver enters a receive cycle (step 1622), awaiting a signal from a relay or tag. When received, the update information in the signal is forwarded on the SPI bus by the dispatcher to the host CPU in the message packet format described above. The procedure 1600 remains in listen mode until a new request is received (decision step 1626). The procedure 1600 then reads the new request (step 1612) and processes the request (step 1614).

If the request is not for listen mode, decision step 1620 branches to decision step 1630 and determines whether the request is a "master" request. If the request is a master request, then the request is transmitted through the RF transceiver to the designated relay (step 1632). For example, such a master request can be for SSI, ping, or Tag ID table response. In this instance, the transceiver sends out a request in RF form under control of the master. In master mode, the microcontroller awaits a response from the designated relay (step 1634). That response can be a return of Tag ID table data or another requested relay response. If a response is not received from the designated relay, then the microcontroller times-out. When the response is received or timeout occurs, the information is converted to the SPI format and returned to the host CPU (step 1636). The procedure 1600 now branches back to receive the next request (decision step 1610).

Note that the flow diagram procedure 1600 references (in steps 1632 and 1634) that master mode may implicate a tag, rather than a relay. In an alternate embodiment, tags may also be contacted by the access point and return a response, such as the tag's own Tag ID and SSI.

Finally, if the host CPU request is not a master request (via decision step 1630), then the step branches to a management or configuration-type request. This request is processed by the microcontroller as appropriate (step 1652), and the procedure branches to step 1636 to forward a confirmation and await the next request to the dispatcher. If the request does not fall into any recognized category, then the procedure either ignores it (branch 1654), or returns an appropriate message (not shown).

Figure 17:
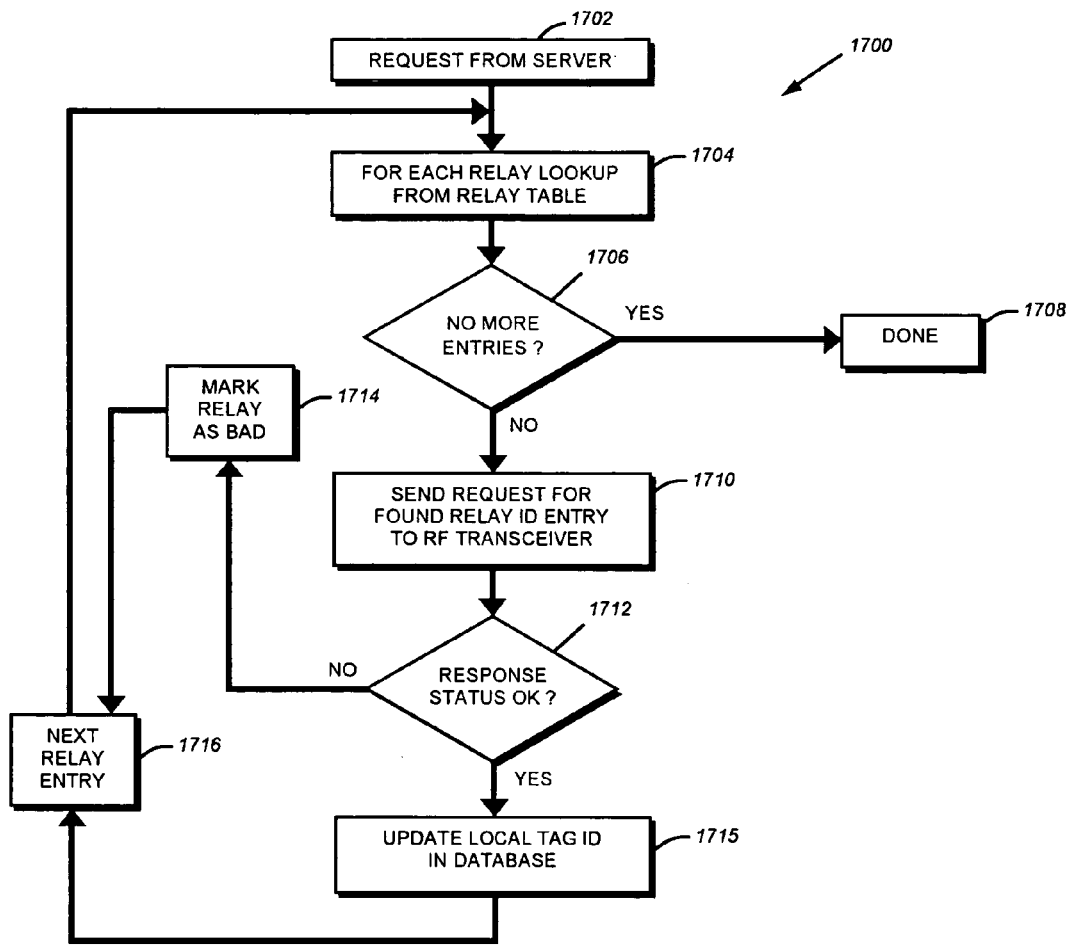
FIG. 17 is a flow diagram of a procedure for updating the local Tag ID database employed by the host CPU of the access point of FIG. 13.

A key function of each access point is to continually update its listing of Tag IDs in relation to the relays with which it communicates (including both remote relays and its onboard RF transceiver). FIG. 17 details a flow diagram of a procedure 1700 by the access point's host CPU to update its listing of Tag IDs for each relay with which it communicates. First, the location server issues a request to the access point to receive an update (step 1702) via the WAN. This request can alternately be issued via the console using the LAN to a command line interface of the CPU for diagnostic and other purposes. The CPU then consults its internal relay table (step 1704) for each relay therein. The relay table 1800 is shown in FIG. 18. It includes a listing of entries 1802, 1804 and 1806 of Relay IDs. These can be the 32-bit Tag ID assigned to all devices in the system. The number of relay IDs in the list (1-N) is fixed and set by the server as a result of an installation procedure in which relays that reliably receive within the desired area of the facility are assigned to the particular access point. In other words, the administrator and/or installer of the system designates which relays communicate with a given access point. This can be based upon range, location (e.g. all relays in the same room with the access point) and/or other criteria.

The procedure loops through each Relay ID in the table 1800. If the procedure has completed the last entry then decision step 1706 branches to a completed state 1708. Otherwise, the present Relay ID is packaged in a request issued by the CPU to the microcontroller and the RF transceiver sends a Tag ID table update request to the identified relay (step 1710). If the response is not received (timeout) or it is corrupted (decision step 1712), then the relay is marked as bad (step 1714), the procedure loops back to look up the next relay (step 1716) in the table 1800, and an appropriate alert is sent up to the server regarding the bad relay. A local alarm at the access point may also be issued. If the response is good, then it contains a readout of the relay's current Tag ID table, and this is used to update the CPUs local Tag ID database (step 1715). The procedure 1700 then loops back to receive updates from the next relay (step 1716) in the table (if any).

Figure 19:
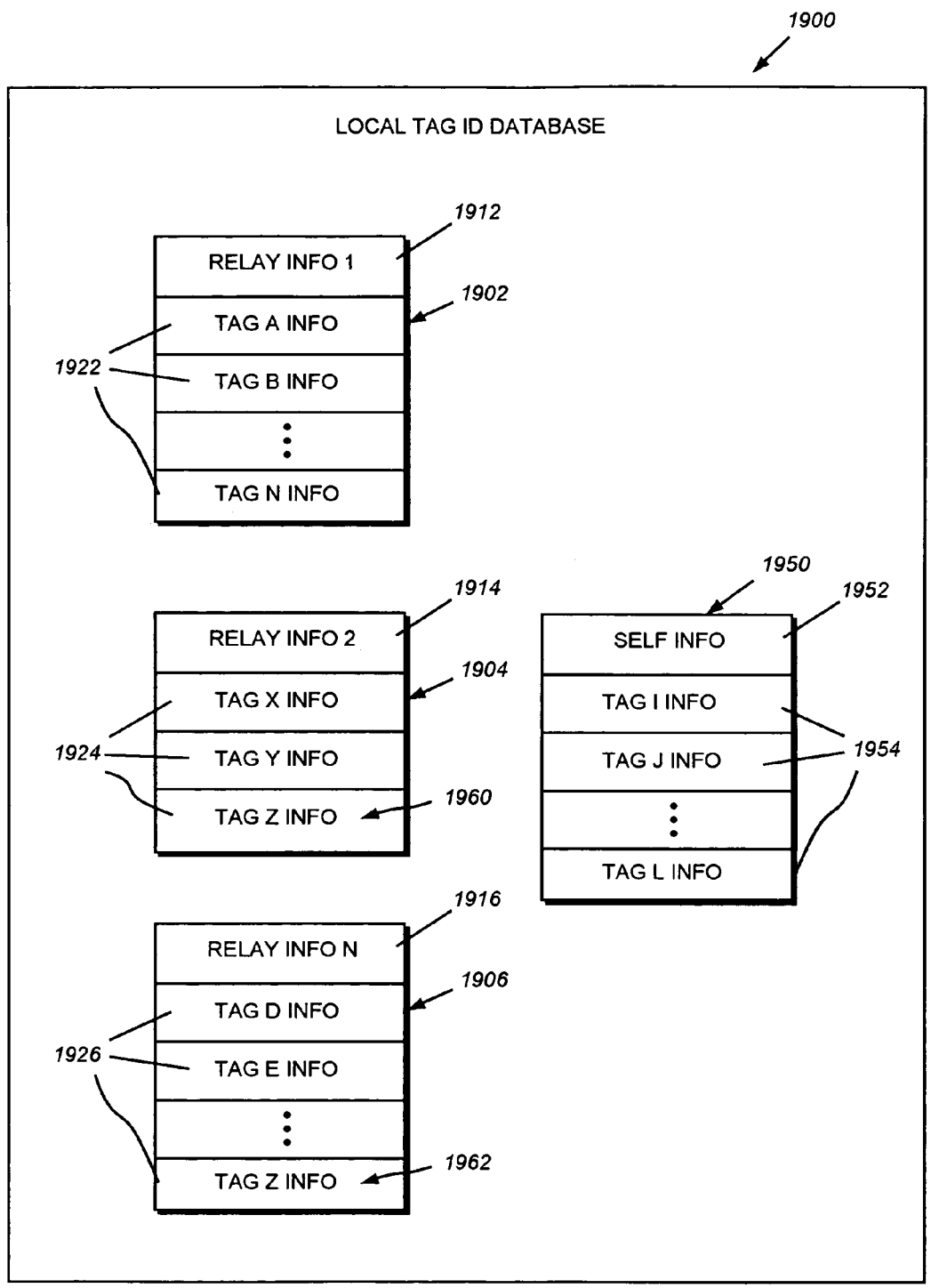
FIG. 19 is an exemplary table representing a local Tag ID database contained on the access point of FIG. 13.

FIG. 19 shows an exemplary local Tag Id database 1900, which is stored by the access point and updated by requests for Tag ID tables from various relays in the Relay ID table listing. Each entry 1902, 1904 and 1906 in the database 1900 is respectively identified by a particular set of relay information (RELAY INFO 1-N) 1912, 1214 and 1916. This information includes the Relay's Relay ID (aka Tag ID) and other desired information, such as relay or device type, signal strength, etc. Associated with each Relay information/ID entry is a respective list of Tag IDs 1922, 1924 and 1926. Each Tag ID in the entry is part of the overall table that is transmitted from the relay following the update request. These are the Tag IDs that the relay has most recently identified through tag chirps or another process (for example, the procedure FIG. 11). In any case, the entry represents the most recent report on tags in proximity to that relay. Each Tag ID entry contains particular information. With brief reference to FIG. 20 (showing the information fields for the TAG ID entry), that information includes, the Tag ID itself 2002, the tag or device type 2004 and the signal strength (SSI) 2006 of the tag read by the relay named in the entry. Note that these fields 2002, 2004 and 2006 comport with those in the relay-based Tag ID table shown in FIG. 6.

Referring further to the local Tag ID database 1900 in the database also contains a "self" entry 1950 for its onboard transceiver (operating as a relay in channel F1 listen mode to receive tag chirps). In one embodiment, the self entry 1950 is continually updated with entries 1954 as Tag IDs are received while in listen mode. As noted above, the Tag IDs are transferred over the SPI bus to the CPU as received by the RF transceiver. The self entry 1950 can include appropriate "self" information 1952 in its identifier, including the access points own Tag ID.

Figure 21:
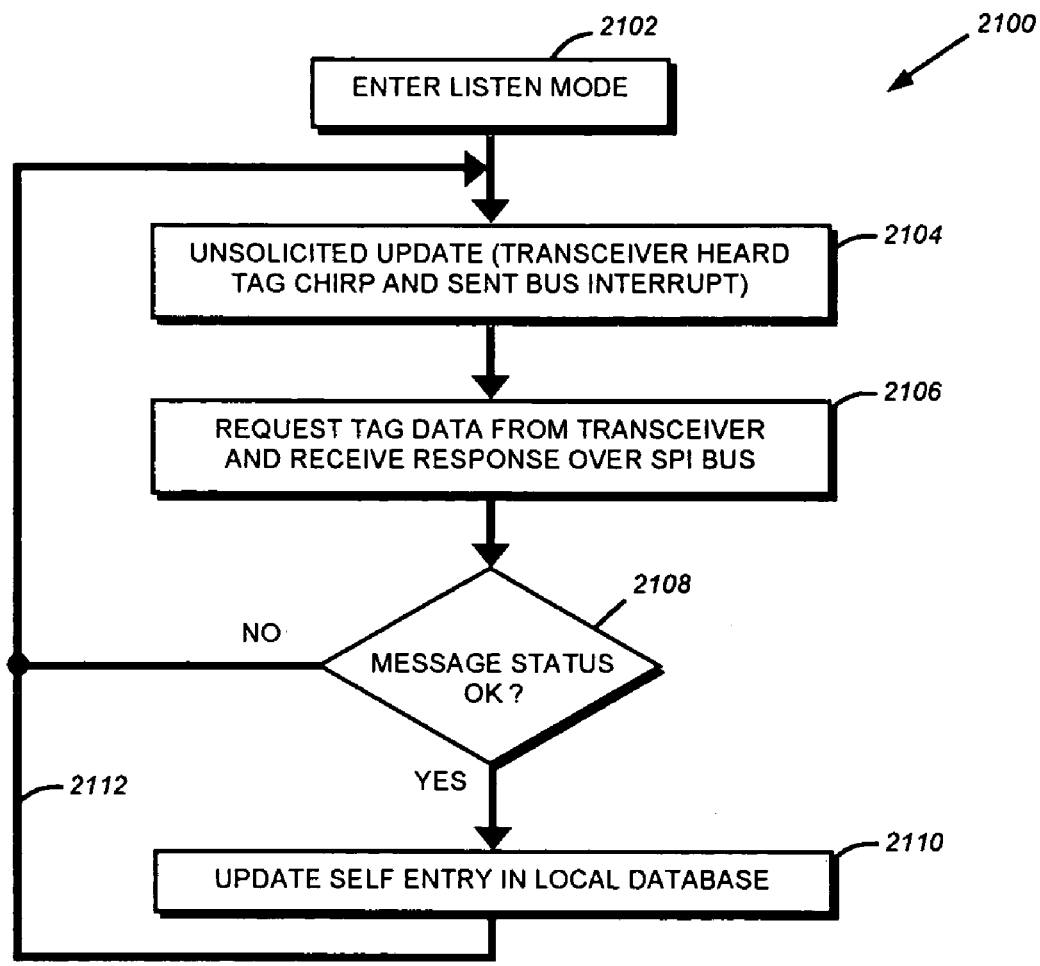
FIG. 21 is a flow diagram of the listen mode employed for updating the local Tag ID database of FIG. 19.

As shown in FIG. 21, the listen mode acts upon unsolicited updates received from tags by the access point's RF transceiver. The listen mode procedure 2100 for building the "self" entry 1950 is implemented by the host CPU based upon unsolicited updates from nearby Tags. After the host processor directs entry into listen mode (step 2102), the RF transceiver circuit (RF microcontroller) eventually hears a tag "chirp" including Tag ID (step 2104). The signal strength of the chirp is automatically read by the microcontroller. Since the host CPU controls the SPI bus, it can only learn about the unsolicited update via a message outside the bus (the bus is clocked by the CPU). Thus, a special interrupt line (see INT line 1390 in FIG. 13) between the transceiver microcontroller and host CPU issues an interrupt when a chirp is received. In the meantime, the received tag data is buffered by the transceiver circuit. Based upon the interrupt, the host CPU issues a request to read the unsolicited tag data over the SPI bus for storage in the "self" entry and the tag data is transferred over the SPI bus to the host CPU (step 2106). If the response from the transceiver microcontroller with the tag data is corrupted, it is discarded (decision step 2108). Otherwise, the "self" entry is updated by the host CPU to include the new tag data (step 2110). If a previous entry for the particular tag already exists in the self entry, it is overwritten or otherwise replaced with the new, updated entry. The listen mode procedure continues (branch 2112) awaiting further interrupts for unsolicited updates/chirps from tags. As described in the procedure of FIG. 21, the host CPU controls certain activities and the microcontroller controls other activities within the overall procedure.

While the procedure 2100 and other procedures described herein ascribe certain responsibilities to certain components (for example microcontroller reads SSI and host CPU clocks the SPI), is expressly contemplated that any of the processes and procedures herein can be controlled in whole, or in part, by any of the various system components (e.g. tags, relays, access points and the location server) acting in, for example an appropriate master-slave mode. Thus, the functional hierarchy described in this illustrative embodiment is only one example of a number of hierarchies that can be employed to carry out the overall functionality of the system.

In the example of FIG. 19, note that database entries 1904 and 1906 both contain an entry for Tag Z. It is not uncommon that several relays in a database may contain overlapping entries. This occurs because relays are typically located to have overlapping fields of coverage so that a Tag is received by a plurality of relays. While the Tag ID for Tag Z will be the same in both entries (1904 and 1904), the information 1960 and 1962 in respective entries 1904 and 1906 for Tag Z will vary because the read signal strength for each relay will be different. This difference in signal strength results from the fact that Tag Z is physically located closer to one relay than the other, or otherwise presents a stronger signal to one than the other. The receipt of a tag by a plurality of relays and differential in signal strength at each relay form the basis for location of a tag by the location server as will be described in detail below.

Having updated the local Tag ID database based upon the request of the location server, the procedure by which the database is transferred to the location server from the access point over the network will now be described in detail.

Communication Between Access Points and Location Server

Figure 22:
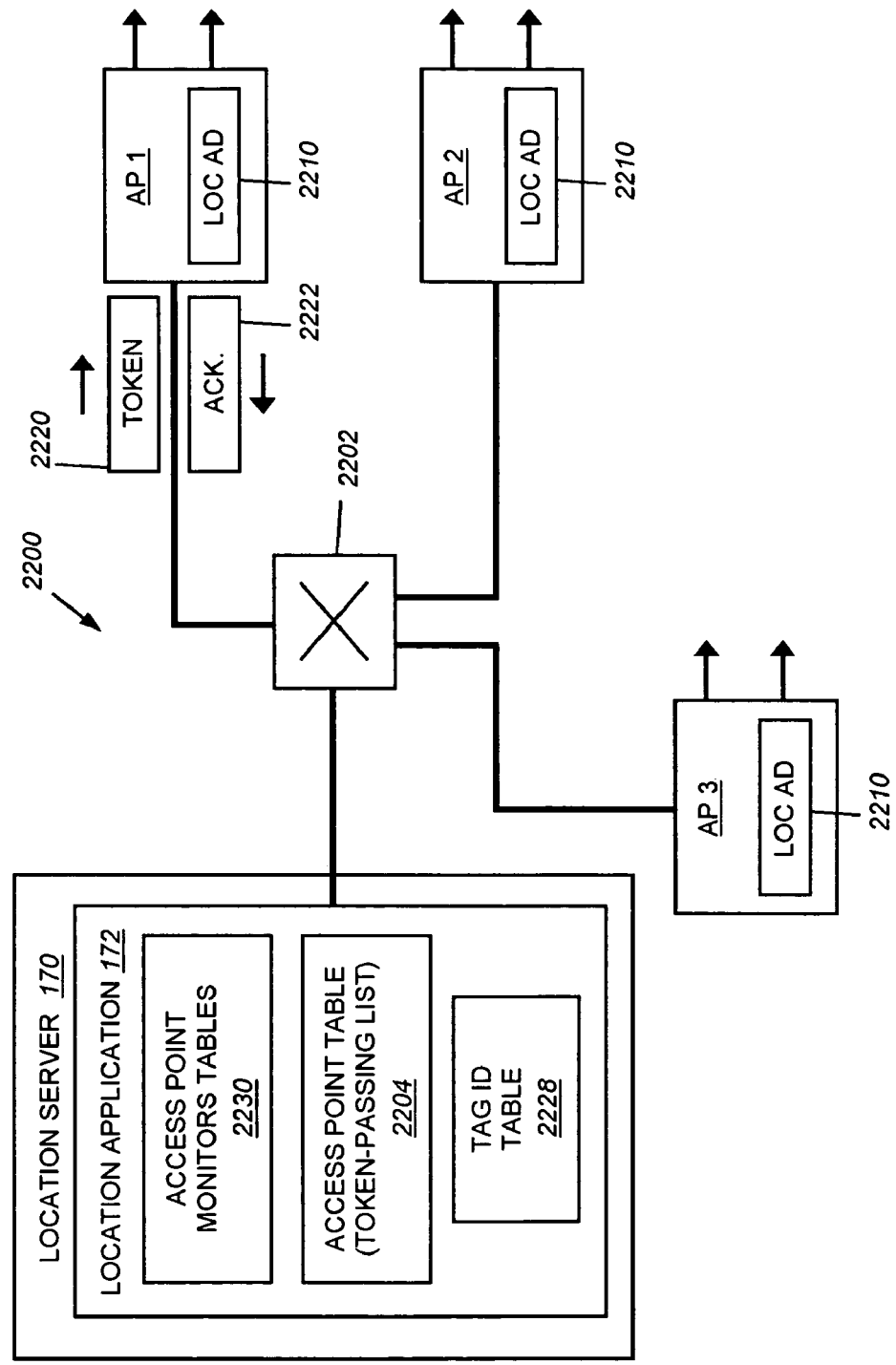
FIG. 22 is a schematic diagram of an exemplary network consisting of the location server and access points exchanging information with the server.

FIG. 22 shows an exemplary system 2200 in which the location server is connected by a network switch 2202 to three access points AP1, AP2 and AP3. The server 170 stores a table or list 2204 of every access point in its network. The table contains the unique IP address of each listed access point on the network. Likewise, each access point AP1, AP2, AP3 is provided with the IP address 2210 of the server 170. This information is loaded at configuration, or may be provided to each access point at system initialization using well-known connection-establishment techniques. One such connection establishment procedure, involving the transmission of TCP/IP-based "HELLO" messages from each access point to the server 170, is described in FIG. 25 below. Since each access point is contacted by the server 170 to control its communication with relays and provide updated local Tag ID database information, there should be a technique for ordering the communication between access points and the server. A particular concern is that the F2 channel should not be employed by competing access points simultaneously.

Thus, each access point is contacted in seriatim, so that only one access point communicates over F2 at any given time.

To accomplish this ordering, the location server 170 conducts communication with each access point according to its table 2204. As each entry is read, the server transmits a "TOKEN" message 2220 to the listed access point (see AP1). For this purpose, the table 2204 functions as a "token-passing list." The server 170 waits a predetermined time for an acknowledgement (ACK) message 2222 to be returned from the access point. If the ACK message is returned within the specified time limit, then the server awaits the response. The access point then enters the above-described master mode and obtains the desired information over F2 from its relays. The requested information is eventually returned to the location server as a response, thereby satisfying its request.

If the ACK message 2222 is not received within a specified time limit, then the location server marks the access point as unresponsive (i.e. "timed-out") and moves to the next access point in its list, repeating the above token and ACK procedure. All access points in the network/table are contacted in turn, and the process repeats. If a given access point continues to be unresponsive for more than a few cycles (three token-passing cycles in one example), then an alert is sounded and/or provided to an administrator through the location server console or the facility control server/console. The access point is then removed from the token passing list as being unavailable. The removed access point will be again added back into the token-passing list 2204 upon receipt by the server 170 of the below-described HELLO message from the now-removed access point. As described below, HELLO messages are sent by each online access point at startup and at predetermined time intervals thereafter.

Figure 23:
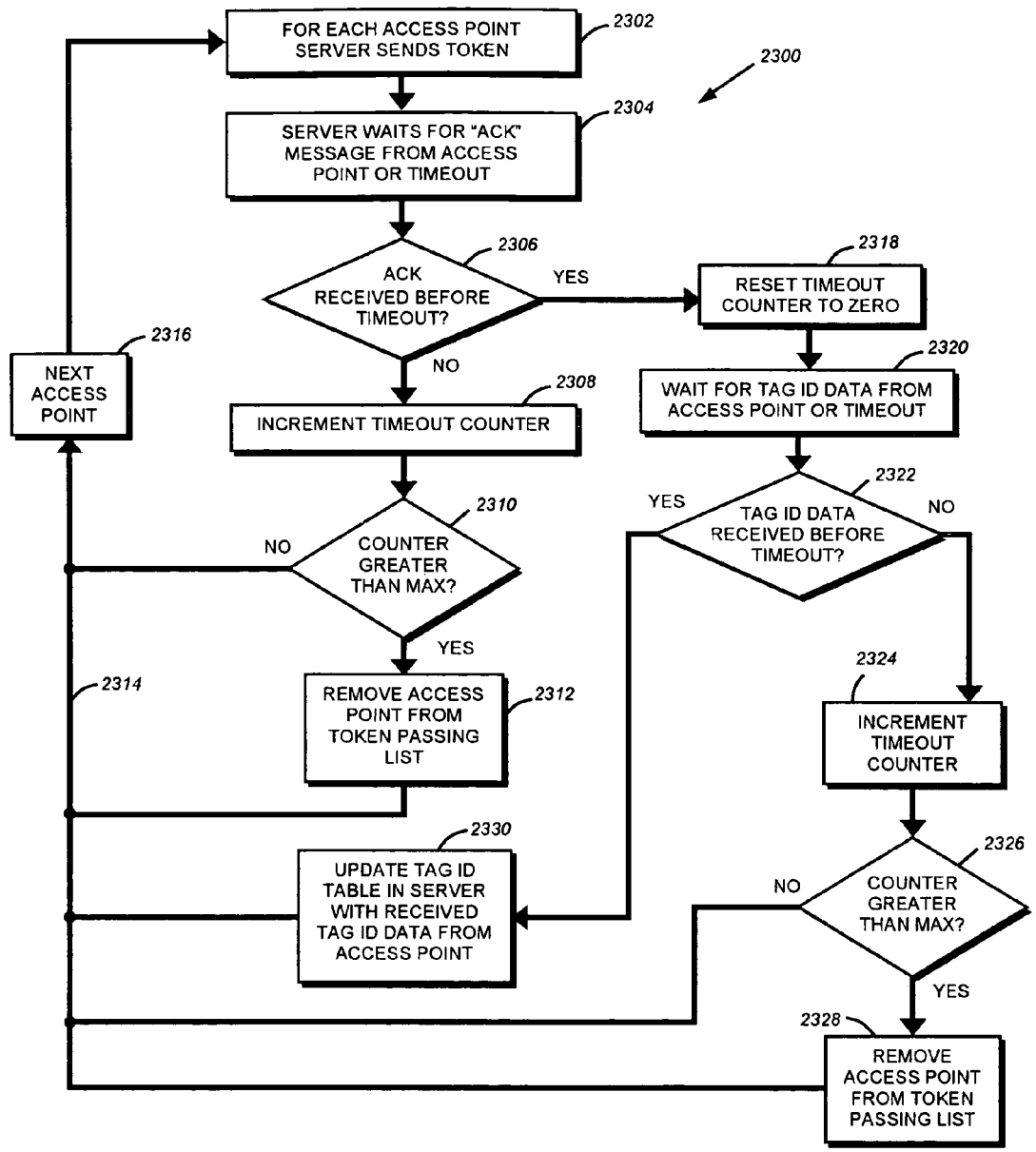
FIG. 23 is a flow diagram of a steady-state token-passing procedure by which the location server communicates with each access point in the network of FIG. 22.

FIG. 23 details a flow diagram of a steady-state token-passing procedure 2300 for each active access point. As described above, the location server 170 sends a TOKEN message to each of the access points in turn, reading from the Access Point Table (the token passing-list in this mode) 2204 (step 2302). After sending the TOKEN to the selected access point, the location server 170 awaits an ACK message from that selected access point (step 2304). A maximum time limit is set for receiving the ACK as noted above. If the time limit is exceeded (decision step 2306), then the connection times-out and a timeout counter is incremented (step 2308). If the timeout counter is greater than a maximum count (MAX) (decision step 2310), then the entry for the particular access point is removed from the token-passing list 2204 (though the access point may be retained in a master access point list for future reference) (step 2312), and the procedure 2300 repeats for the next access point (step 2316 and branch 2314). In this example MAX is three attempts, but MAX can be any reasonable number. Conversely, if decision step 2310 determines that the timeout count is less than MAX, then the next access point on the list 2204 is contacted (step 2316) and the timed-out access point is again contacted during the next cycle (e.g. after all other access points have been contacted) of the overall token passing procedure 2300.

If the ACK message is received before timeout (decision step 2306), then the timeout counter is reset to zero (step 2318) and the location server 170 awaits receipt of the local Tag ID data from the selected access point (step 2320). Again, the server waits a specified time limit to receive the data, and if not received by the time limit (decision step 2322), then the server increments a timeout counter (step 2324). If the timeout counter is less than MAX (decision step 2326), then the procedure resets the time out counter (step 2325) and attempts to access the next access point on the list (step 2316). The timed-out access point is again contacted after a complete token-passing cycle (through all access points on the list). If, however, MAX is attained (decision step 2326), then the access point is removed from the token-passing list 2204 (step 2328), and the next relay is contacted (step 2316).

If both an ACK is timely received (decision step 2306) and the requested Tag ID data is received (decision step 2322) by the location server 170 in a timely manner after the TOKEN is issued, then the location server updates its server-based Tag ID Table (2228 in FIG. 22) (step 2330) and the next access point is passed the token to provide its Tag ID data (step 2316).

Briefly, FIG. 24 shows the Tag ID Table 2228 (see FIG. 22) in further detail. This table is generally a temporary table that exists for each cycle of token-passing, and is then used to create higher level location data as described below. The table 2228 includes entries for each Tag ID that is read throughout the entire system. In this example, each reader (e.g. a relay or RF component of an access point) is listed as a 32-bit ID (its Tag ID) 2402. Each read Tag ID (32-bit) associated with that reader is listed in a column 2404. The corresponding signal strength indicator (1-byte) is provided in another column 2406 and a time (time stamp) in which the Tag ID data is received is provided in a column 2408. Timestamp is useful for ensuring that the associated Tag ID entry is relatively contemporaneous in comparison to other data for use in location determination.

Figure 25:
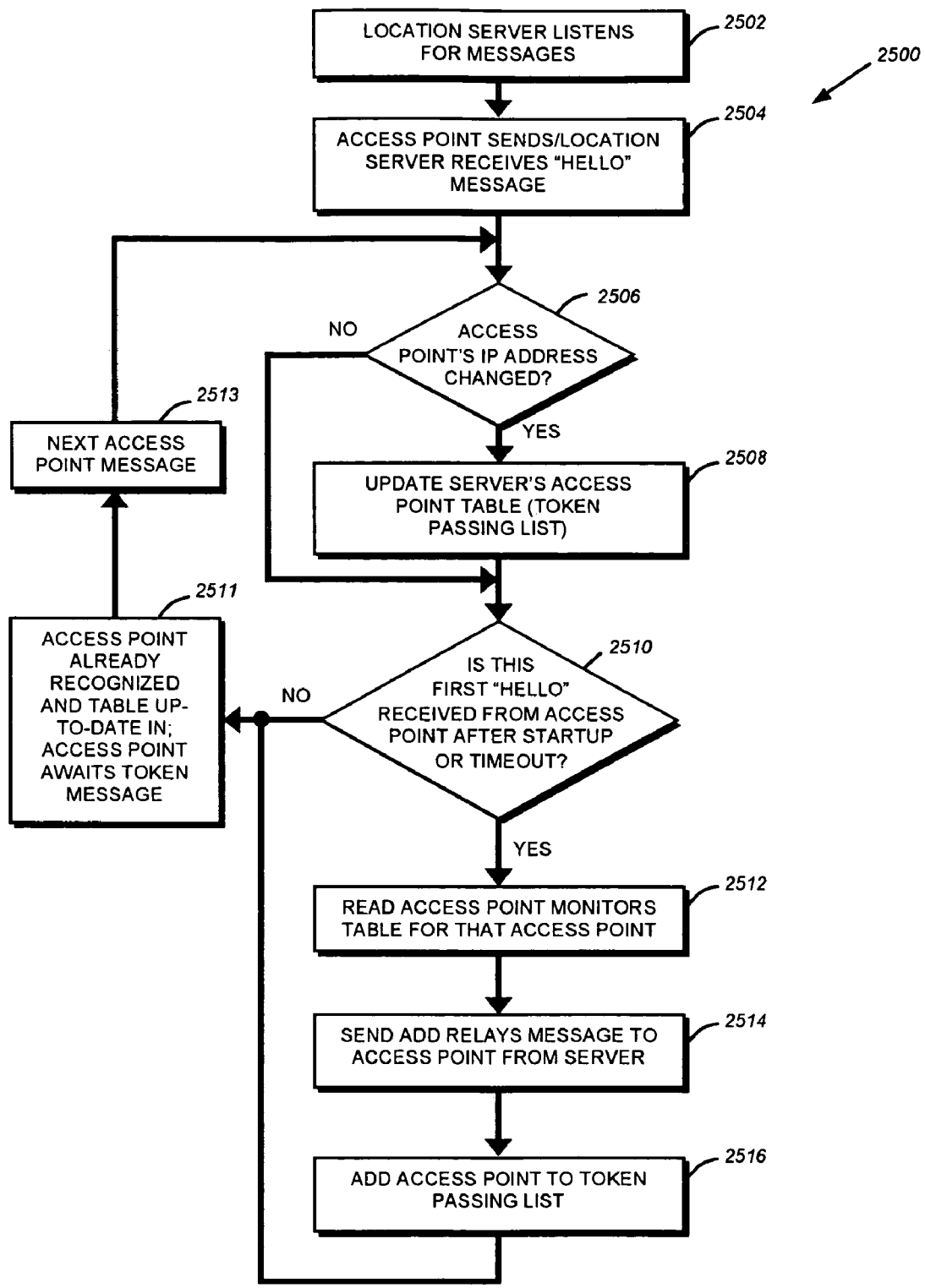
FIG. 25 is a flow diagram of a procedure for adding and/or updating location server information related to access points.

As described above, the location server 170 internally maintains the access point table 2204, which also serves as the token-passing list for the system. FIG. 25 shows a procedure 2500 by which access point entries are initially added to the server's table 2204, and thereafter maintained on the table over time. After power-up, each access point (AP1, AP2, AP3, etc.) sends a "HELLO" message (noted above) to the location server 170 transmitted over the network (step 2502). The server eventually receives each HELLO message (step 2504). The HELLO message can include certain data related to the particular access point, such as it's current IP address. If the access point is already on the table 2204 (typically after startup), the list-building procedure 2500 determines (decision step 2506) whether the access point's stored IP address has changed. If so, then the location server 170 updates the table/token-passing list 2204 with any new IP address (step 2508) returned from the access point in the HELLO message. Then, the server determines if this is the first HELLO message after startup or a timeout (in either case, the access point being off the table/list 2204) in decision step 2510. If it is not the first HELLO message after startup or timeout, then the access point is already properly recognized by the system (step 2511). The recognized access point now awaits TOKEN messages from the location server 170 in connection with the steady-state TOKEN/ACK procedure 2300 of FIG. 23 (step 2511). The procedure 2500 now processes the next access point HELLO message (step 2513, branching back to decision step 2506).

If the procedure's decision step 2510 determines that this is the first HELLO message issued by the particular access point-of-interest, then this indicates that the access point is new to the network or has previously timed-out, and was removed from the table/list 2204. As such, the server 170 reads the entry associated with the access point in the server's "Access Point Monitors" table (see table 2230 in FIG. 22) (step 2512). This table contains the relay information (Relay Tag ID, etc.) for each relay assigned to be monitored by the particular access point. The Access Point Monitors table 2230 is initially established by the system administrator and is updated by the administrator as relays are installed or relocated. Each relay is assigned to at least one access point, and this is reflected in the table 2230. The server then sends an "ADD RELAYS" message to the new access point to provide the access point with its list of assigned relays (step 2514). The access point is now ready for steady-state communication with the server and is added to the token-passing list 2204. The newly listed access point then listens for TOKEN messages in the steady-state, token-passing procedure 2300 (step 2511).

Location Server Processes

Figure 26:
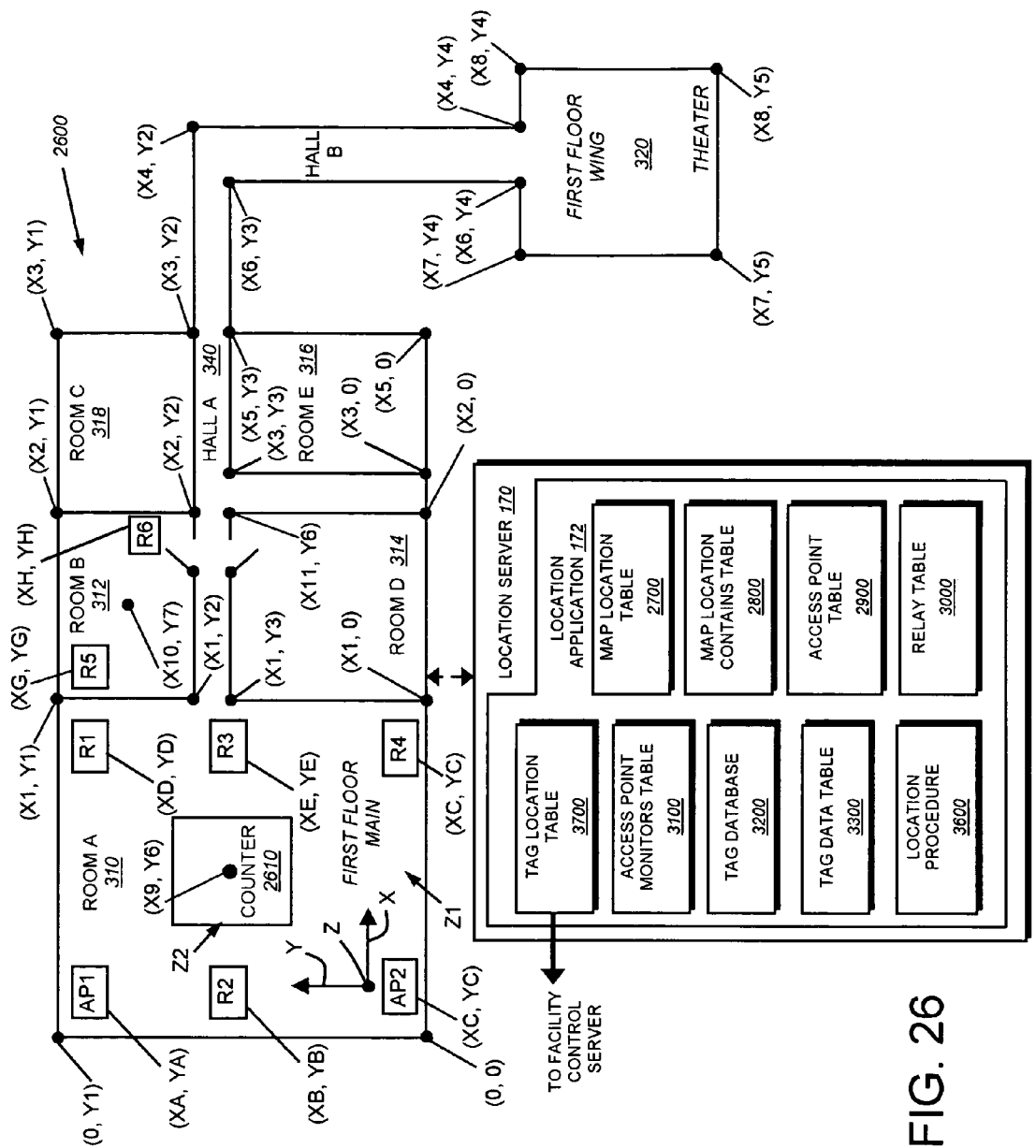
FIG. 26 is a schematic diagram of the exemplary floor plan of FIG. 3 showing coordinate boundaries for each designated area in the floor plan.

The location server 170 uses the constantly updating data of the Tag ID Table 2228 to derive locations for particular Tags in the overall system. This involves the use of Timestamps, Receiver IDs and SSIs in the table to determine the approximate position of a given tag with respect to known physical locations. FIG. 26 shows the map 2600 of an exemplary facility floor plan as originally shown and described with reference to FIG. 3 (thus, the same reference numbers for rooms and halls are used). As shown, each corner has been assigned a coordinate value in an orthogonal x-y coordinate system. One corner is optionally defined as the origin (0, 0), and extending therefrom each corner is assigned an appropriate x-axis value (X1-X8) and y-value (Y1-Y7). Each x and y value can be quantified in terms of a percentage of 1, an integer or binary value within a range of values or an actual measurement unit value (meters, feet, etc.).

The floor plan mapping data is stored in a Map Location Table 2700, as shown in FIG. 27. The table 2700 contains entries for every boundary within the floor plan. Each distinct area is listed by name or code in a name column 2702. Exemplary entries for the First Floor Main area 2704, Room A 2706 and Room B 2708 are shown. The table 2700 also includes the boundary corner coordinates 2710 for each entry 2704, 2706, 2708. These define the polygonal corners of the area's shape. Note, for curved boundaries, a series of segment corners are used to define an approximate shape. The table 2700 also includes the centroid x and y dimensions 2712. The centroid for each entry is calculated either automatically or manually, based upon the boundary coordinates, and assigned to each entry in column 2712. For the first floor main, the centroid is (X11, Y6); for Room A it is (X9, Y6); and for Room B it is (X10, Y7) as shown in the map 2600 of FIG. 26. It is contemplated that a floor may define multiple elevations that, in some embodiments may be resolved into one or more height values along the z-axis (perpendicular to the page of FIG. 26). A height (or "z") column 2714 is provided in the table. In this example, all locations are at a conventional height Z1. However, the central counter 2610 defines a different height Z2, which may be reflected by an entry (not shown) in the table 2700.

The table 2700 further contains a column 2716 for a subdivision flag. This flag (yes/no) indicates whether the named area contains any identified subdivisions therein. As shown, the exemplary First Floor Main entry contains several subdivisions (Room A, Room B, Room C, etc.). Conversely the entries for Room A and Room B list no subdivisions. Referring also to FIG. 28, the subdivision flag 2716 is a hook into the Map Location Contains Table 2800. This table includes an entry for each area (Location column 2802) having subdivisions or other items of interest, such as counters, desks, etc. A listing of associated subdivisions (and the like) for each entry 2804, 2806, 2808 is provided in the Location Contains column 2810. An added feature of the location server application is the ability to prevent inadvertent deletion of an entry in the Map Location Table 2700 without deleting that entry and any subdivision thereof from the Map Location Contains Table. Further, as discussed below, the parent area filed (2720) on the table 2700 can be automatically populated via lookup on the Map Location Contains Table 2800.

In addition, each entry in the table 2700 includes a level field 2718. This is needed where the system is deployed in a multi-level or multi-story structure. Since each of the exemplary areas is on the same level, they are assigned the arbitrary level number 1. In general, relays and access points are adapted to track a tag within a discrete level of a facility. This can be a natural result of shielding between floors or attenuation of signals in the z-axis direction. Multi-level tracking may exist in (for example) stairwells, mezzanines and balconies. These spaces may be served by a plurality of devices on different levels so that the device with the stronger signal indicates the actual level on which a tag is located. Likewise, where a relay is located in a stairwell, for example, comparing the signal strength of a tag in the stairwell, to other more-remote devices on a given level near the stair may resolve which part of the stair the tag is currently located.

Finally, the table 2700 includes a parent area field 2720. This defines one or more larger areas that the particular named entry resides in. In essence, this field is a complement to the subdivision flag. Note that the First Floor entry 2704 has no parent, while the entries for Room A 2706 and Room B 2708 each name the First Floor as a parent in column 2720. This field may be useful for expediting access to a given location by the location server or facility control server.

Note that a set of rooms or areas can also be arbitrarily assigned an entry in the table with appropriate fields. For example, exterior coordinate boundaries and subdivision/parent relationships can be assigned to the entry for the group of areas consisting of Rooms A, B and C can be entered together as a "pediatric ward." The listed coordinate boundaries of this exemplary grouping would be:

(0, 0), (0, Y1), (X3, Y1), (X3, Y2), (X1, Y2), (X1, Y3), (X1, 0).

Note that the table's overall list of coordinates (column 2710) is derived by measuring the actual locations on site or via a blueprint of the facility and these measured coordinates are accurately entered into the appropriate software application to generate the mapping data. This process can be streamlined by using automated equipment and procedures, such as in an (x, y, z) table used by a portable Global Positioning System (GPS)-based receiver that could automatically capture and store the data for each coordinate-of-interest.

In one embodiment, the coordinates in the map can be more-finely resolved into sub-locations, such as counters, desks, stations, pieces of equipment, etc. by entering the appropriate coordinate data and related fields to the table. Ultimately, a complete table (2700) describing the underlying facility can be quite long and detailed.

Figure 29:
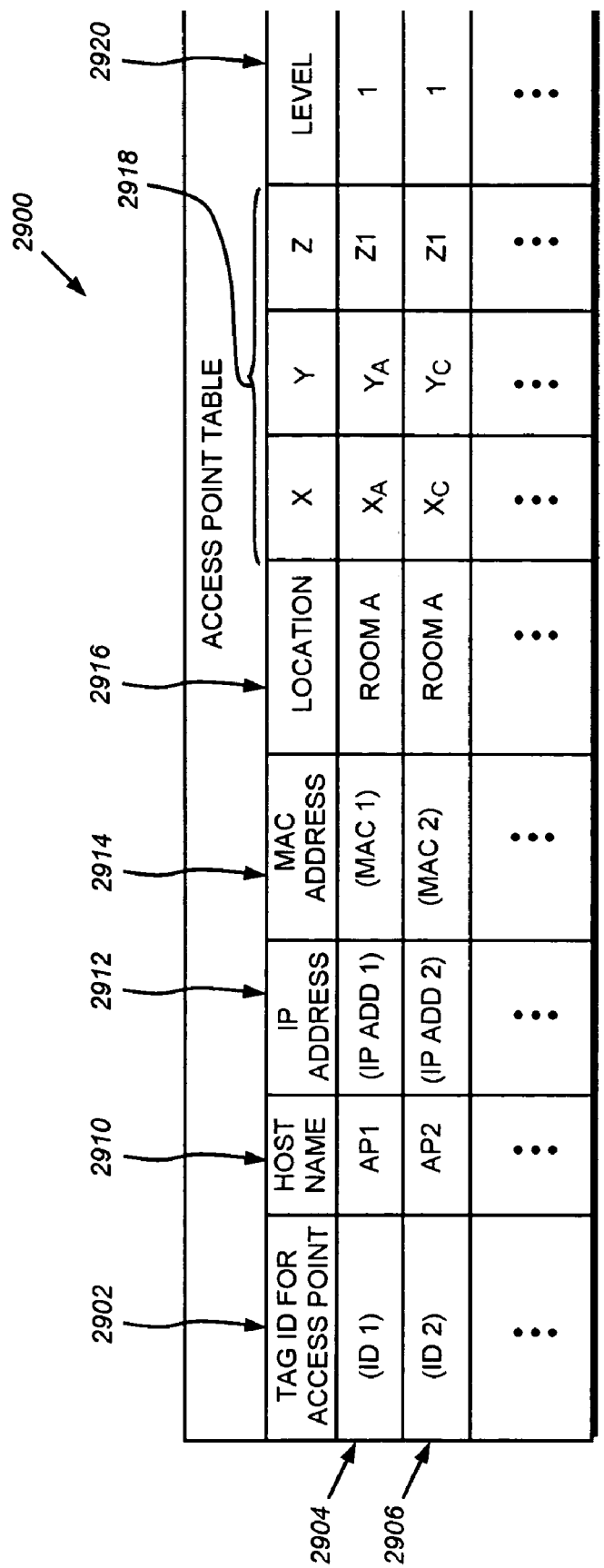
FIG. 29 is a diagram of an Access Point Table for storing coordinate data relative to access points in the system with respect to the floor plan of FIG. 26.
Figure 30:
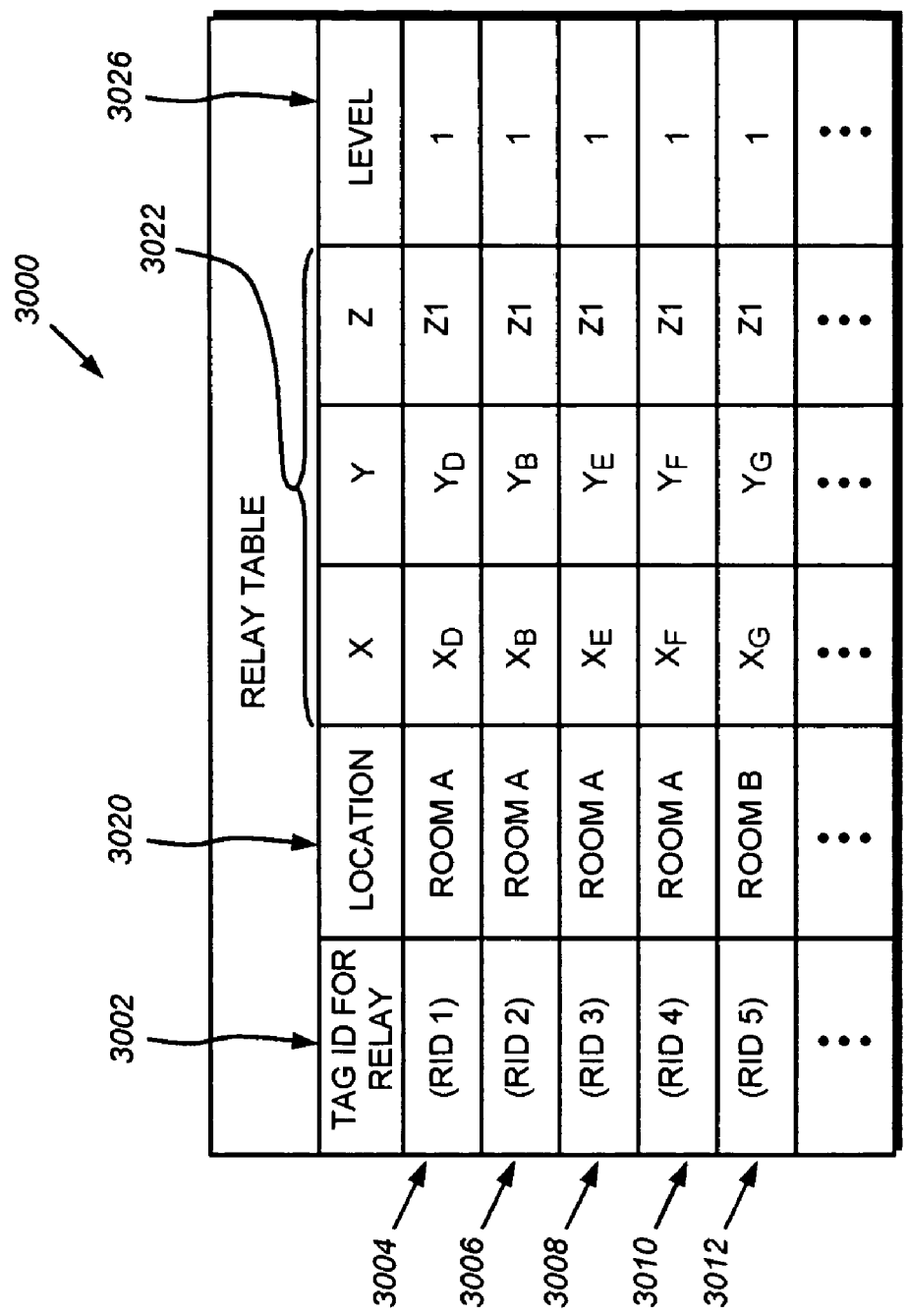
FIG. 30 is a diagram of a Relay Table for storing coordinate data relative to access points in the system with respect to the floor plan of FIG. 26.

As part of the overall map-building process the identity and location of each access point and associated relay is entered into a respective Access Point Table 2900 (FIG. 29) and Relay Table 3000 (FIG. 30). These tables 2900, 3000 are used generally by the location server application 172 in the above-described access point token passing procedure (FIGS. 22-23) and in the update and initialization of access points, including the loading of monitored relays in each access point. As noted above, the tables are created by the location server's administrator in conjunction with the installation of access points and relays, and these tables typically remain static until changed by the administrator and/or system overseers.

Reference is made first to the Access Point Table 2900 in FIG. 29. The table includes a column 2902 of entries 2904, 2906 of access point Tag IDs. As described above, each access point includes an RF-based Tag ID, typically attributed to its RF transceiver section. The Tag IDs are the standard 32-bit codes that discretely identify each RF component in the overall system. Each entry is further defined by an associated Host Name 2910. In this example, the host name AP1, AP2, etc. is employed. The host name can be any acceptable character string that is used as an "alias" for the access point. The server can include an appropriate (Domain Name Service) DNS server with which the host name can be resolved into an IP address (column 2912) for the access point. The IP address is the access point's distinct address on the premise network. Each access point entry also has an associated medium access control (MAC) address 2914 the use of which is well-known in the networking art. Notably, each access point entry references a Location 2916 (e.g. Room A, Room B, etc.) in the facility. These locations correspond to those in the tables of FIGS. 27 and 28 above. Each access point entry also specifies an x-y-z coordinate set at which the access point resides in the facility 2918. The table 2900 also has a column for the level 2920 at which the access point resides in the facility. Columns containing other useful information, such as a listing of monitored relays can be provided in the table as an option (not shown).

The Relay Table 3000, corresponding to the Access Point Table 2900 is now described with reference to FIG. 30. Like the Access Point Table 2900, each relay in the system is listed as an entry 3004, 3006, 3008, 3010 and 3012 in the Tag ID column 3002 using its 32-bit unique RF-based Tag ID. Each entry is associated with a Location 3020. Similarly, the entry is associated with its x-y-z coordinates 3022 in the facility. In addition, the level 3026 in the facility at which the particular relay resides is listed for each entry.

Each entry 3004, 3006, 3008, 3010, 3012 in the table 3000 (FIG. 30) can be associated with the server's overall Access Point Monitors table 3100 in FIG. 31. Each entry includes the name/identifier of a particular access point (AP1, AP2, etc.) (column 3110) and an associated relay Tag ID (RID 1, RID 2, etc.) that is assigned to that access point, and which that particular access point monitors. The overall list allows the location server to efficiently localize a particular relay to a given access point within the facility. This table 3100 can also be used to load the particular access point's Access Monitors Table as described above in FIG. 22. Note that the table is referenced as table 2230 in FIG. 22, denoting the fact that it can be imported (in pertinent part) to each access point to provide that access point with its list of monitored relays.

The location server also stores the master list of Tag IDs that are currently known to the system in a Tag Database 3200 (FIG. 32). This list consists of entries for every known (32-bit) Tag ID in the system (column 3210) and the associated Tag Type. Such types include the locatable tags for persons, equipment, supplies, staff, clients, etc., and also the Tag IDs ascribed to various system location-determination components, such as access points and relays. The table is initially built at installation, entering all initial Tag IDs to be used in the system, either directly through a console/reader connected to the location server or via a data entry application on the networked facility control server 180 (FIG. 1). Tag IDs can be entered into the database 3200 manually (via a GUI) and/or using a reader (such as networked reader 188) that retrieves the Tag ID and other pertinent data from each Tag as it is entered into the system. Discarded or destroyed Tag IDs can be removed from the database 3200 using manual or automatic purge functions using either the location server interface, or that of the facility control server. New Tag IDs can be subsequently added to the database after initial installation as needed by manually entering the data, reading the Tag IDs as they (i.e. their underlying Tags and/or devices) come on-line or loading a batch of data through a network interface, removable media (CD ROM) or other data source that accompanies a batch of new Tag IDs. Note that further associations (other than tag type), such as the name of a staff member carrying the tag or a model of equipment piece having the tag attached thereto are generally stored upstream in the facility control server 180 in this embodiment. These further associations can be entered when the tag is brought online or at a time thereafter and are described in detail below.

Finally, the location server 170 stores and continually updates a Tag Data Table 3300 (FIG. 33). This table is built and updated using the transmitted Tag ID Data Tables provided by each access point to the server 170 as part of the token-passing procedure (FIGS. 22 and 23) described above. The table 3300 is updated after each token passing cycle in this embodiment, although other update sequences are expressly contemplated. This table 3300 is a master list of all data contained in the individual uploaded tables, namely the readers' Tag ID (column 3310), the associated Tag ID read by that reader (column 3320), the signal strength (SSI) of the Tag's signal at the reader (column 3330) and the timestamp at which the reading was taken (column 3340). Note that time in the system can be appended at the server, at each access point or each relay. Appropriate and well-known techniques for synchronizing the time in various system components can be employed to ensure consistent timestamps. These techniques may employ a master clock (not shown) within the location server 170 or elsewhere. Timestamps allow the system to determine whether a particular entry is "stale" due to its age (and should, thus, be disregarded by the location server 170), and/or whether a newer entry has been loaded, allowing the older entry to be removed from the table 3300. In this implementation, the table 3300 may include repeated entries for any of the readers (3310) and any of the tags (3320), but each combined entry of a discrete reader and discrete tag should occur only once in the table.

Given the data in the above tables 2700, 2800, 2900, 3000, 3100, 3200 and 3300, the location of each and every component in the system with respect to the overall floor plan of the facility is known to the location server 170. By correlating the signals received from tags by predetermined system components (relays and access points), the relative position of each of the tags can be determined quickly, and with reasonable accuracy, without resorting to calculation-intensive triangulation procedures. To this end, relays and access points are placed throughout a facility so that a tag signal will be received by a plurality of localized system components simultaneously. Read signal strength (SSI) at each component determines which components the relay is in closest proximity to (as a general property of the Inverse-Square Law), and thus, location can be specified in terms of proximity, rather than an absolute coordinate value. Because the location of a given component or group of components can be quickly resolved by consulting the tables, the relative location of a proximate tag can also be resolved. Thus, the general location of a tag within the facility can be derived by the location server, and also the tag's particular proximity to system components. Further, where two or more tags are proximate to a given system component or set of components, the two or more tags can be correlated to each other via their mutual proximity to the system component(s). Hence, encounters between tags (and the underlying equipment and/or personnel carrying them) can be quickly ascertained by the location server 170.

Figure 34:
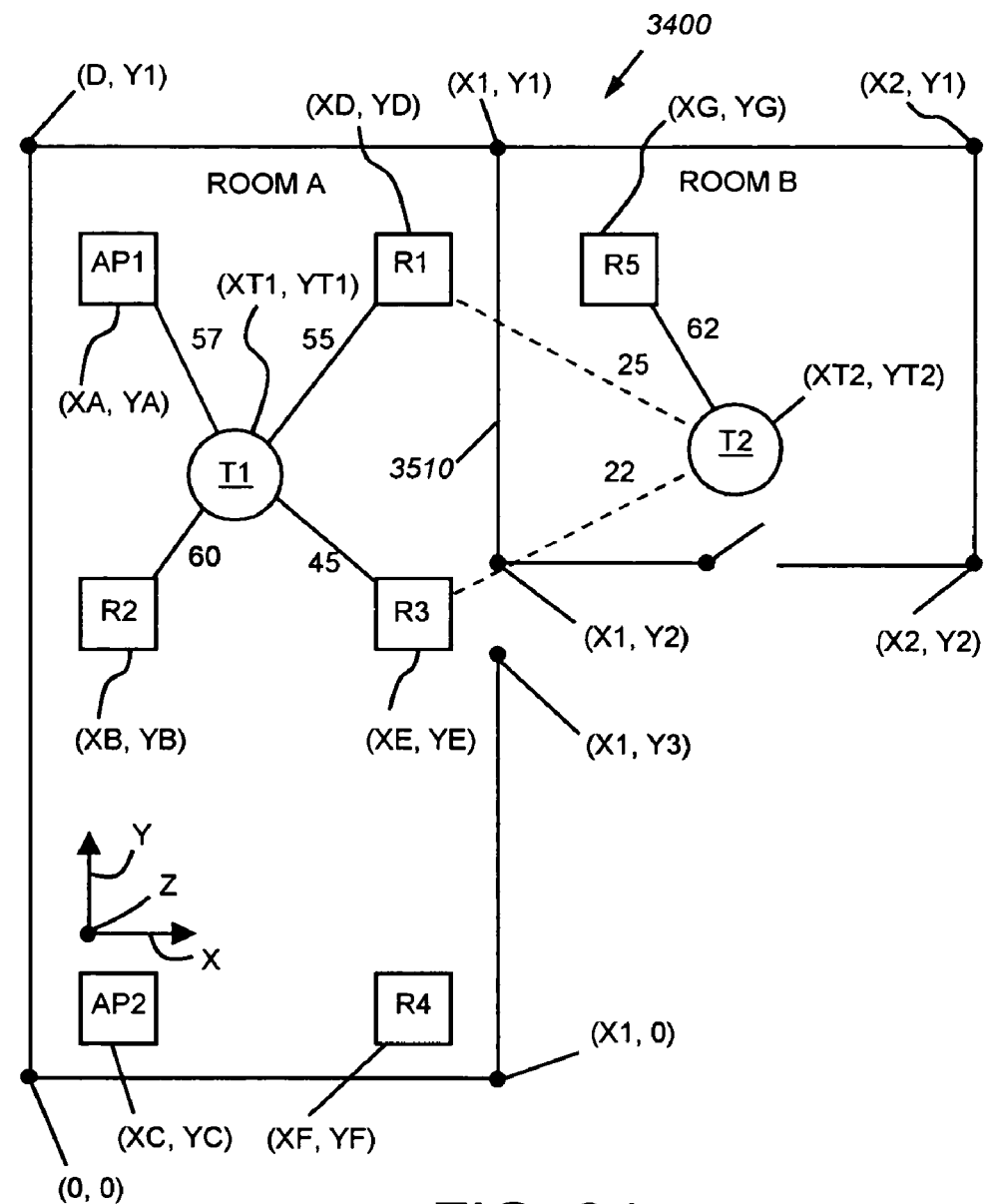
FIG. 34 is a fragmentary view of the exemplary floor plan map of FIG. 27 showing the interaction of two exemplary tags with proximate relays and access points of the system.

FIG. 34 shows a fragmentary view 3400 of the exemplary map 2600 of FIG. 26, detailing exemplary tags T1 and T2 within Room A and Room B, respectively. In this example, the chirp (or master-slave) signal of tag T1 is received by the relay function of access point AP1, and relays R1, R2 and R3. These relays may be monitored by access point AP1 or another access point (such as AP3). In any case, all received tag data from each relay is eventually downloaded to the location server 170 and built into the exemplary instantiation of the Tag Data Table 3500 (FIG. 35). This table 3500 shows a fragment of the overall table (which contains entries for all located tag and relay combinations in a given token-passing cycle) containing entries for readings of tags T1 and T2. Note that these entries may not necessarily occur in the continuous sequence as shown, but may be interspersed within the table with the entries of readings from other tags and/or relays.

Referring to the map fragment 3400 and table 3500, tag T1 is shown with respective signal strength entries as follows: AP1:57; R1:55; R2:60; and R3:45. It is assumed that R4 is too distant to receive a meaningful signal as a result of range segmentation. Thus, it does not report a reading. Likewise, tag T2 is shown with reported signal strength entries of R5:62; R1:25; and R3:22. It is assumed that R1 and R3 report weak signals due to intervening wall 3510. On the map, these links are shown as dashed lines. In practice, signals below a certain reported strength would be ignored by the server 170 (as symbolized by the X-marks through their entries 3520 and 3522) in the table 3500, or the relays would include programming to omit such signals before they were transmitted to the access point/server. In an embodiment of this system, signals that are weak, but above a certain threshold may be transferred, and used if appropriate (for example, if not enough strong signals are present to locate a given tag). In this example, the signals are transmitted but subsequently ignored by the server.

To derive the location (XT1, YT1) for tag T1, a basic formula simply retrieves all signals above a certain level and resolves the coordinates (XT1 and YT1) at an average between them. In other words, all x values for reporting readers are summed and divided by 4 (or the number of readers reporting) and all y values for reporting readers are summed and divided by 4 (or the number of readers). This would be a good approximation of the actual location of T1 so long as room size and spacing between relays was relatively small. A more complex formula would employ a weighted average of each relay's coordinate location based upon the underlying signal strength from that relay. In most cases, this would derive a good estimation of actual location of T1.

In the (unlikely) example of T2, only one relay R5 receives a strong signal. The strength of this signal, however confirms close proximity to that relay and thus, at a minimum, the room location (e.g. Room B) of the tag T2 can be derived. In addition, the weak signals from R1 and R3 may be called upon in this instance to verify the presence of the tag T2 in Room B, and perhaps nearness to the wall 3510.

In another embodiment, the map locations of relays R1 and R3, when compared with that of R5 can be used to apply a weighting component to R1 and R3, in order to account for the attenuation of the wall. In that example, R1 and R3 can be used to compute the average location (XT2 and YT2) of the tag T2. Conversely, by consulting the location string in table 3000 (FIG. 30) reporting relays not in the same room or sub-location can be ignored. In this case, relays R1 and R3 would indicate Room A and be ignored relative to the strong signal of Room B's relay R5.

Figure 36:
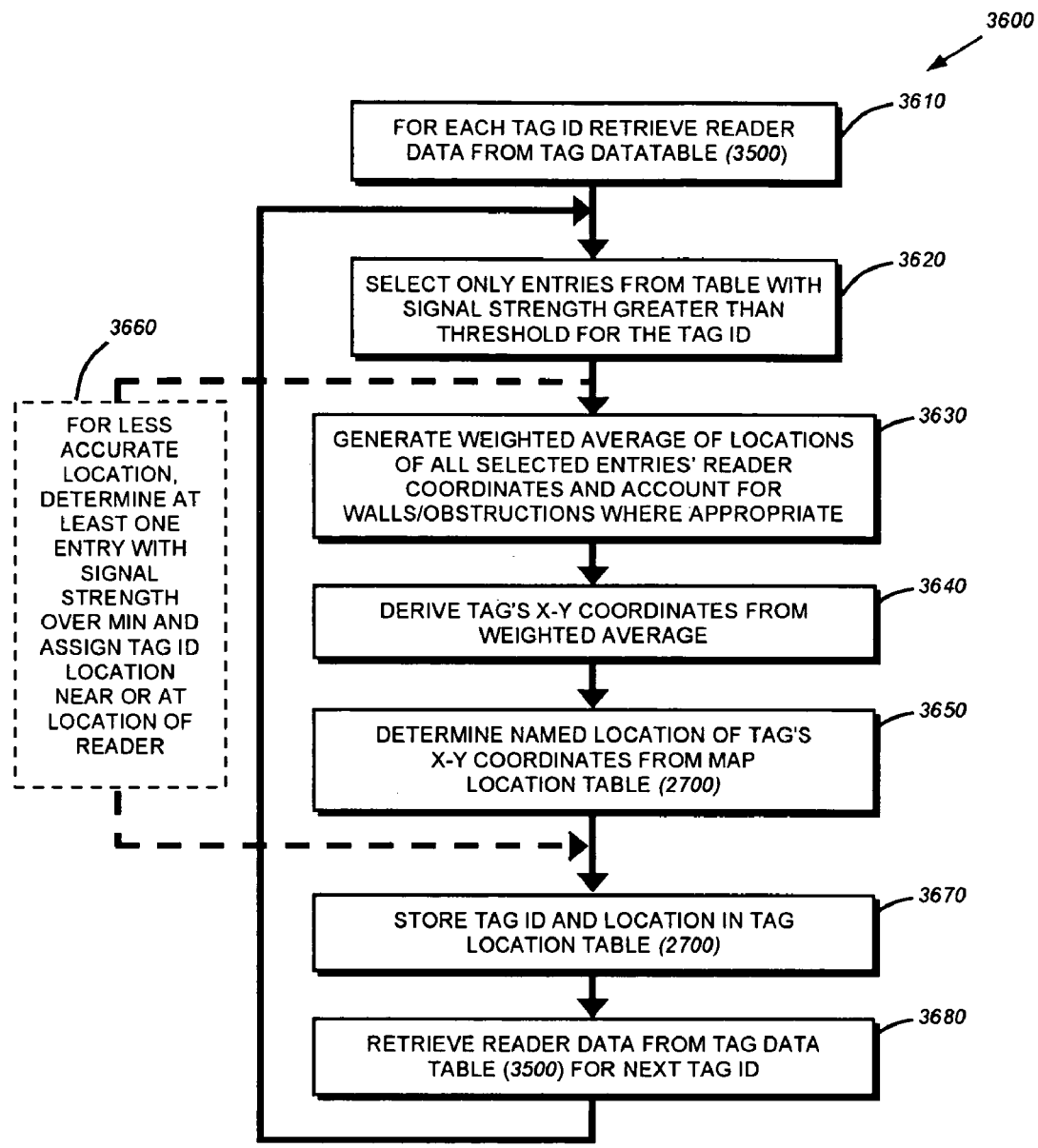
FIG. 36 is a flow diagram of the tag location-determination procedure according to an illustrative embodiment of this system and method.

The above-described technique for tag location-determination can be further described with reference to the procedure 3600 shown in FIG. 36. Each Tag ID in the mostrecent instantiation of the Tag Data Table 3500 (FIG. 35) having a locatable tag type (e.g. not a Tag ID for a fixed location-determination component, such as a relay or access point) is selected in turn, and all entries in the table for that Tag ID are retrieved (step 3610). Next, in step 3620, entries for that Tag ID with a signal strength greater than a predetermined threshold. The threshold is set at a level that is considered meaningful for is the accurate location of the tag (the threshold level being determined by formula, experimental data, etc.). As noted above, in some embodiments, all signals below a given threshold can be omitted by the access points or relays, and never entered into the table 3500. Next, in step 3630, the procedure 3600 generates a weighted average of all selected entries for the reader's x, y and (where appropriate) z-coordinates. The weighting can include scaling the particular reader's coordinates in view of its signal strength and also based upon whether a reader is located on the other side of a wall or obstruction (determined, for example, from the floor plan map). The procedure then derives the tag's x, y and (where appropriate) z-coordinates using the weighted average (step 3640).

Figure 34A:
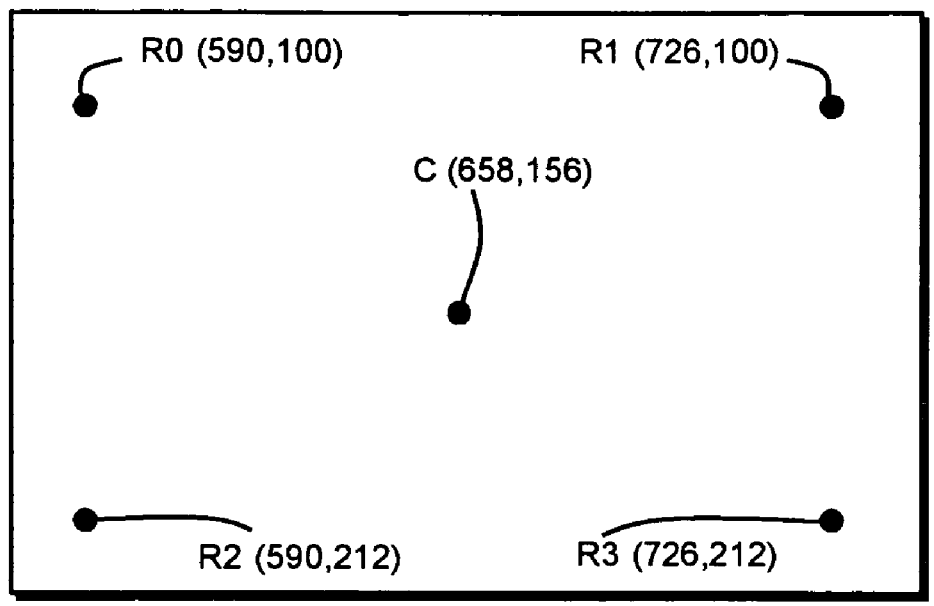
FIG. 34A is a diagram of the determination of a unweighted centroid with respect to the RF readers (access point and relays) shown in FIG. 34 in accordance with a tag location-determination procedure according to an illustrative embodiment of this system and method.
Figure 34B:
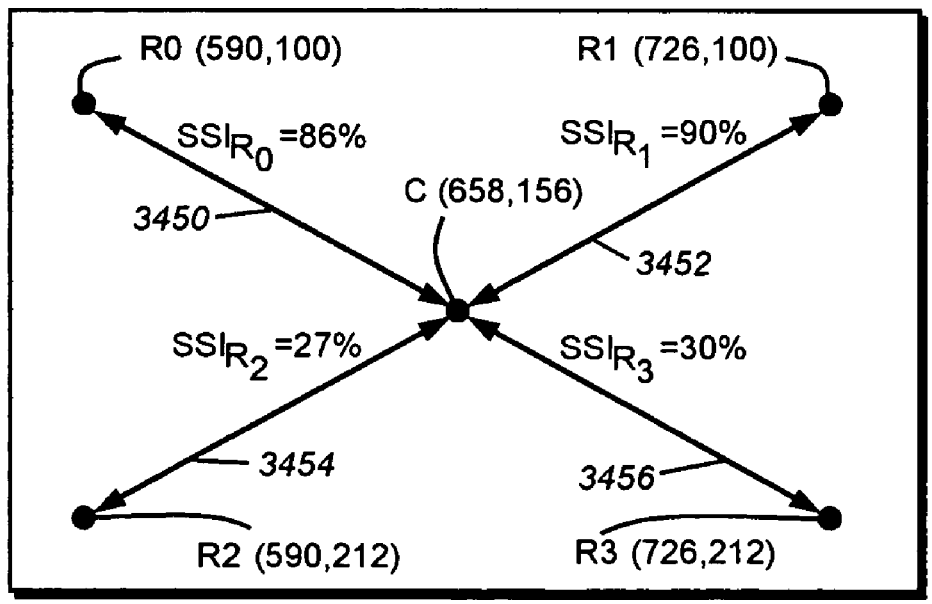
FIG. 34B is a diagram of the determination of segment lines between the unweighted centroid and RF readers of FIG. 34A in accordance with the tag location-determination procedure according to an illustrative embodiment of this system and method.
Figure 34C:
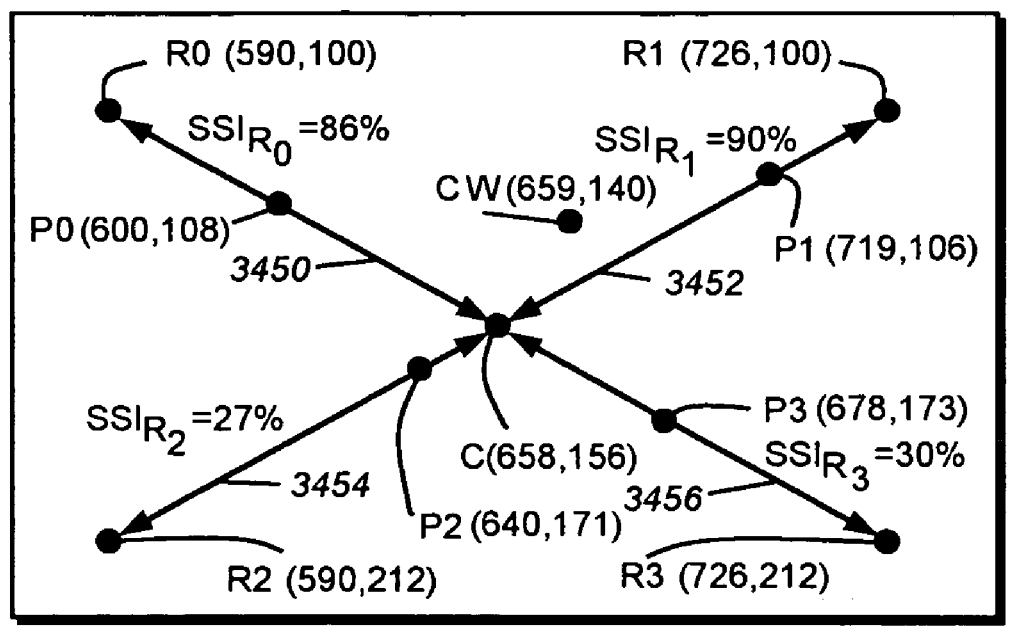
FIG. 34C is a diagram of the determination of signal-strength-weighted points along each of the segment lines of FIG. 34B and computation of a weighted centroid between the points in accordance with the tag location-determination procedure according to an illustrative embodiment of this system and method.

With reference now to FIGS. 34A, 34B and 34C, an exemplary calculation of a weighted average-based location is shown and described. This example reflects the arrangement described in FIG. 4 above in which four readers receive a signal from a tag. These readers are Access Point AP1 (termed R0 herein for simplicity) and Relays R1, R2 and R3. In this example, the respective signal strength SSI heard at each reader is as follows: $SSI_{R0(AP1)}=86\%$; $SSI_{R1}=90\%$; $SSI_{R2}=27\%$; and $SSI_{R3}=30\%$. The respective exemplary positions of the four readers R0 (AP1), R1, r2 and R3 within the x-y coordinate system of the facility map are shown arbitrarily in FIG. 34 as: (590, 100); (726, 100); (590, 212); and (726,212). As shown, the physical centroid C between these readers is calculated by adding all the x coordinate values and dividing by 4 (the number of readers), and adding all the y-coordinate values and dividing by 4 (the number of readers). The following generalized equation applies, where Cx/y is the x and y-coordinate values for the centroid, Rnx/y is the x-and y coordinate value for each reader (n=0, 1, 2, 3, etc.) and N is the total number of receiving readers:

$$Cx = \left(\sum_{n=0}^{N-1} Rnx\right)/N; \text{ and}$$

$$Cy = \left(\sum_{n=0}^{N-1} Rny\right)/N.$$

The resulting coordinate value for C is (658, 156). This value (C=(658, 156)) would be the simplified position of the tag with respect to the four receiving readers and may be sufficient for certain applications.

However, as discussed generally above, a simple centroid does not reflect the fact that R0 and R1 are receiving a stronger signal from the tag than that received by r2 and R3. Accordingly two additional steps are employed after calculating the basic centroid C to obtain a more accurate position for the tag.

First, as shown in FIG. 34B, a line segment 3450, 3452, 3454 and 3456 is established between each respective reader R0, R1, R2 and R3 and the centroid C. The relative signal strength ($SSI_{R0}$=86%; $SSI_{R1}$=90%; $SSI_{R2}$=27%; and $SSI_{R3}$=30%) along each line is then determined. For example, R0 heard the tag at 86% signal strength, so the point along line 3450 that is 86% of the distance from C to R0 is determined. The following equation applies, where Px/y is the x and y coordinate value of the point along the line, Cx/y is the x and y coordinate value of the centroid SSI % is the received percentage of maximum signal strength and Rx/y is the x and y coordinate value of the reader:

$$Px=Cx+(SSI\%*(Rx-Cx));\text{ and}$$

$$Py=Cy+(SSI\%*(Ry-Cy)).$$

Based upon this equation, $$P0x=658+(0.86*(590-658))=600;\text{ and}$$

$$P0y=156+(0.86*(100-156))=108.$$

Likewise, applying the same equation to solve for points P1, P2 and P3 along lines 3452, 3554 and 3546, respectively, the following coordinate values are obtained $$P1x=719;\ P1y=106;\ P2x=678;\ P2y=173;\ P3x=678;$$
$$\text{and } P3y=171.$$

The locations of points P1, P2, P3 and P4 are shown in FIG. 34C.

Once the coordinate values for P1, P2, P3 and P4 are computed, all the Px coordinates are added and divided by 4 (the number of readers), and all the Py coordinates are added and divided by 4 (the number of readers). The following generalized equation applies, where Cx/y is the x and y-coordinate values for the centroid, Pnx/y is the x-and y coordinate value for each point along a respective line segment (n=0, 1, 2, 3, etc.) and N is the total number of receiving readers:

$$CWx = \left(\sum_{n=0}^{N-1} Pnx\right)/N;\text{ and}$$

$$CWy = \left(\sum_{n=0}^{N-1} Pny\right)/N.$$

In this example, the resulting weighted centroid CW has coordinate values:

$$CWx=659;\text{ and}$$

$$CWy=140,\text{ as shown in FIG. 34C}.$$

This weighted centroid value represents a closer approximation to the actual position of the tag with respect to the receiving readers. Of course, while the positions and weightings four readers are averaged to determine centroid and weighted centroid in this example, the divisor (N) of the averaging equation and number of line segments/points P corresponds directly to the number of receiving readers. Hence, where three readers receive the signal, the centroid is determined by dividing the sum of all x-coordinates by N=3 and all y-coordinates by N=3, and so on. Note that the above-described averaging technique can be easily extended to the z-coordinate (e.g. Cz and CWz) by applying appropriate z-coordinate values to each equation.

Having derived the x, y (and z) coordinates of the tag (based upon its Tag ID), the procedure 3600 consults the Map Location Table 2700 (FIG. 27) to determine which set of boundaries and sub-boundaries include the coordinates of the tag (step 3650).

The location process can be expedited and/or simplified by determining the location of one or more of the closest readers (e.g. relays/access points) and simply stating that a tag is located in that proximity. In this case, steps 3630, 3640 and 3650 can be substituted with the single step 3660 as shown in phantom. In this step, the procedure determines at least one reader with a signal strength greater than a predetermined minimum value. The tag is assigned a location that is at, or in close proximity to the reader (or readers). More simply, the tag may be given the basic room location (or sub-location) of the reader(s) after the procedure consults the Access Point Table 2900 (FIG. 29) and/or Relay Table 3000 (FIG. 30) for the room location of the reader. A simplified location process may be useful where only one reader reports a good signal for the tag or the tag is of a type that does not necessitate continuous, accurate tracking, such as a fixed piece of equipment, certain support staff, or the like.

Based upon the location-determination results in either of step 3650 or step 3660, the procedure 3600, in step 3670, stores the tag's Room (or other named-space) location (and any applicable x, y, z coordinates) in the Tag Location Table 3700 (FIG. 37 described below). The next tag in the Tag Data Table is now identified, and all entries therefore are read as the procedure returns to step 3620 (step 3680).

The end result of the location-determination procedure 3600 is the continually updated Tag Location Table 3700. As noted above, the table 3700 contains one entry for each tag ID (column 3710), the level (column 3720) that the tag readers reported—and where applicable that the procedure determined to be the correct level where two or more readers were on different levels (such as in a stairwell). Further, the x, y and z coordinates (column 3730) determined either by the above-described weighted average technique (steps 3630, 3640 and 3650) or the proximity-to-a-reader approach (step 3660). The derived facility location name is also provided in the table at column 3740. Finally, the latest, earliest, or average, timestamp for the reporting readers is provided in column 3750. The Tag Location Table 3700 is, thus, the most-current and complete listing of all active tags in the facility. This list is used by any internal functions in the location server 170 and management functions in the facility control server 180 that rely upon location data to make decisions about data transfer, authorization, deauthorization, localizing and tracking.

It should be clear that the format and content of the Tag Location table can be modified from that shown where other data may be important. For example, an average or maximum signal strength column can be provided for each Tag ID entry. Tags can be listed in numerical sequence, time of entry/location, or in clusters (for example, with each facility location (Room, etc.) having all tags located therein listed together). Additional tables, with specific data organizational structures (for example, a table with all located staff tags or client tags) can be derived from the table 3700 where desired. The derivation of location information for the main table 3700 can be performed within the location server by its application or by the facility control server 180 to be described in further detail below.

Facility Control and Management Server

Figure 38:
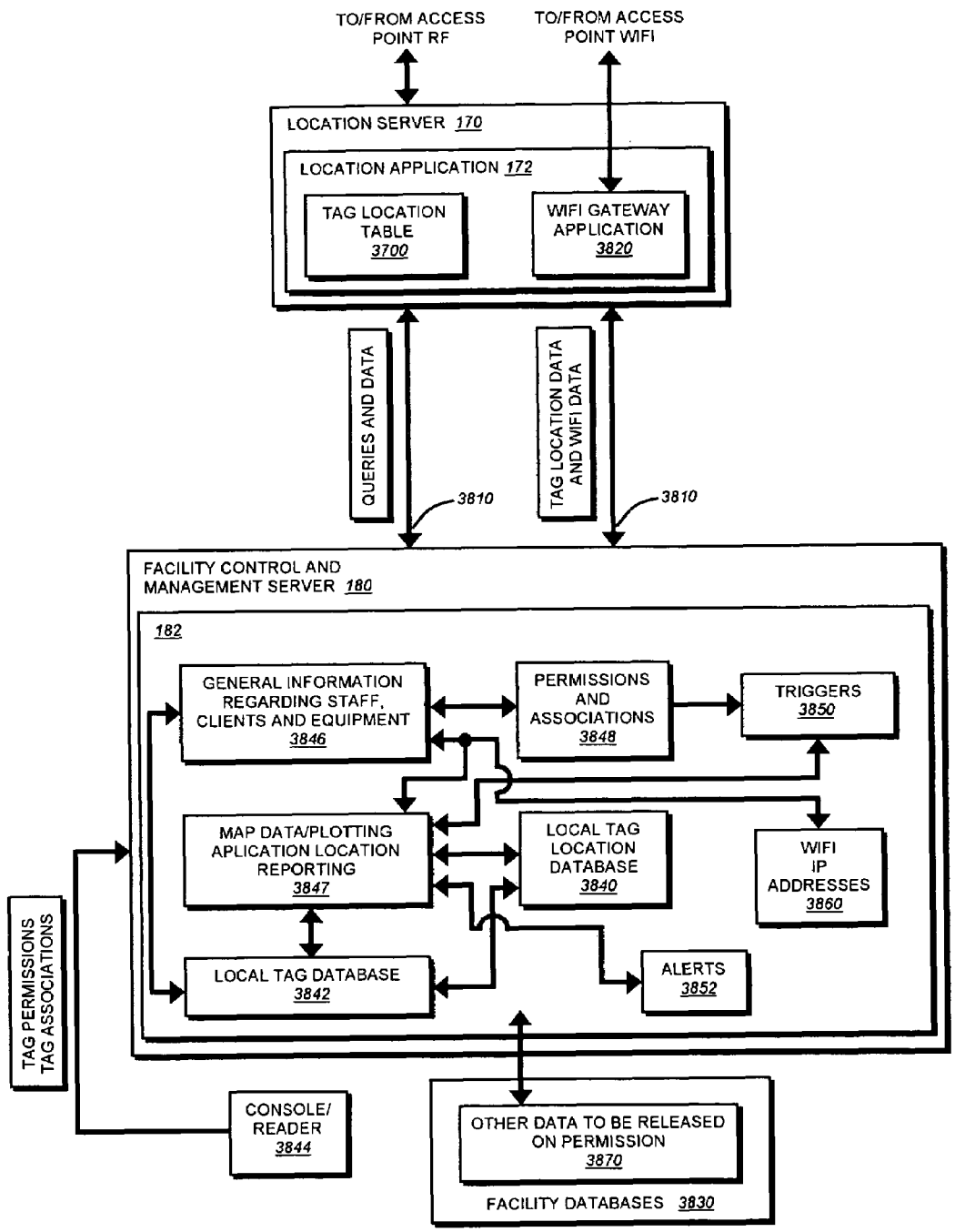
FIG. 38 is a block diagram of the facility control management server for utilizing location data on tags interfaced with the location server according to an embodiment of this system and method.

FIG. 38 shows the interconnection between the location server 170 and the facility control and management server 180 according to an embodiment of this invention. A network link of conventional design employing, for example, a TCP/IP-based communication protocol is provided between appropriate network interfaces (not shown) on each server 170 and 180. Note that various switching fabrics, backup devices and other conventional data storage and networking arrangements can be provided.

The basic location information on tags derived by the location server 170 according to the above-described procedures for location determination is employed by the facility management application 182 to derive meaningful data for use by the facility's management and staff. The facility management application 182 resides on one or more host computers that will be collectively referred to as the depicted Facility Control and Management Server 180. For simplicity, the location application 172 described above references two functional blocks, namely, the Tag Location Table, 3700, described above, and a WiFi or WLAN gateway application 3820. This gateway application 3820 can be a basic interface that allows data to travel over the network to access points for distribution over the wireless (WiFi in this example) network scheme to various portable and handheld devices within the facility. The gateway application 3820 may also include certain functions that allow data to be blocked and/or permitted to pass through to various devices based upon conditions identified by the facility control. Conversely, the gateway may simply transmit whatever data is provided to the WiFi network based upon the final decision of the facility control application 182. Note that WiFi, as used in this context refers to any resource on the network connected to the location server including those connected by the access point's LAN and WAN connections. Each resource typically has a unique IP address that is indexed by the facility control server so that exclusive communication with that resource can be performed.

The link 3810 transmits a variety of conventional network data that maintains a connection between servers 170 and 180. Notably, the link 3810 also carries WiFi data from the facility control server to the location server for distribution over the WiFi network. It also carries data received from various devices (and the location server itself) on facility activities and channeled through the location server to the facility control server. The data may be used directly by various databases residing on the facility control server 180, or may be passed on to other facility databases that are dedicated to storing and handling the particular data from the handheld devices. Likewise, data from these databases 3930 and/or the facility control server 180 may be released to particular WiFi/networked devices based upon their unique IP addresses.

In addition, the link 3810 between servers 170, 180 also carries queries on the Tag Location Table (or particular Tags, locations, or tag types). These queries may be used to prompt download of certain identified tag data from the location server or download from the location server of the entire table 3700. In this example, the facility control server maintains a mirror copy of the Tag Location Table in a Tag Location Database 3840. As updates are received from the location server, they are built into this database 3840. The control server 180 may also include its own Tag Database 3842, containing all tags in the system. This database 3842 is provided to the location server either automatically or at the command of an administrator via the server's console 3844. This console can also be used to monitor locations, enter queries on particular tags, update the information on tags (e.g. associations with persons and equipment, special permissions, etc.) in the system and enter Tag IDs and types for new tags (among other functions).

The control application 182 also contains general data or information (or interfaces to databases with such data) 3846 on all persons, and items having a tag assigned thereto. Each entry in the general information database 3846 can be a plurality of conventional fields including name, identification or model number, age, weight, rank, special notes, etc. along with a field that includes a Tag ID.

The management application 182 includes map data on the facility and a mapping/locating application 3847 that may be displayed on the console 3844. The data allows tracking and location of people and things that queries are entered on. In addition, certain key people and things may be continually monitored. The mapping application relies on the tag location database 3840 in conjunction with the general information 3846 to derive meaningful tracking and location data on persons and things. In particular, it is assumed that Tag IDs are "translated" into recognizable names (personal and equipment names/models) and that any queries are, in fact made in the usual name of the person or thing. Likewise reports of location by the application 3847 are made in the usual name, rather than the Tag ID.

For each entry in the general information database 3846, there will be certain permissions and/or associations 3848. These may be organized into a variety of fields that are unique to the type of facility being managed. For example, in a hospital environment, permissions to certain cabinets or rooms may be included, permissions to access, or denial of permission to access certain patients or medications may be included. Also permissions to access certain data, based upon sensitivity, association with certain patients, etc. can be included. Basically, anything within the facility that depends upon location, or proximity to other tag-holders (people or equipment) can be governed by permissions 3848. A field that is closely related to permissions is Triggers 3850. Given certain permissions or denials of permission, certain activities will be triggered. For example, where a tag is located in an unpermitted room or a thing is no longer in a permitted space, then a Trigger is programmed to indicate an Alert 3852. Depending upon the gravity of the situation, the trigger may be a simple flash on the console, to a full facility-wide shutdown (via appropriate interfaces with the control server 180). One form of trigger is the release and/or transfer of data from (for example) external databases 3830 to a particular IP address 3860 on the WiFi network. The address is associated with a given person or thing that has generated a trigger. Such a trigger could be proximity between an authorized nurse (via permissions 3848) with a given patient, thereby allowing permitted data 3870 to be released to the IP address of the nurse's handheld device.

It should be clear that the actual organization of the facility control server 180, and its interaction with the location server, can be widely varied. This is meant to be only one of many possible illustrative embodiments of a facility control server and interconnected location server contemplated according to this invention. In one alternate embodiment, certain permissions, alerts and other "automatic" functions may be provided at the location server level to ensure greater reliability. For example, all tags of a particular type may be given a certain permission or denied a permission. If a location condition exists that would trigger an event, that event may be identified and acted upon by an application provided directly to the location server, without resort to communication with the facility control server.

Further Examples of System Operation

Having described the basic functioning of a system, some further examples of the operation of the system according to various embodiments of this invention will now be described. These examples are based upon the above-referenced hospital environment and upon other types of facility environments, but it should be clear that any or all system components and functions may be applied broadly to any of a variety of facility types.

Example 1

A warehouse has 30 employees and 50 types of equipment to perform its work. Not all employees have been trained and licensed to operate all the equipment. Employees each have assigned to them a PDA for the shift. A customer truck has arrived two hours ahead of schedule and needs to be loaded from the warehouse. While the warehouse has the authority to simply ask the truck driver to wait for his scheduled loading, with the system installed, it believes it can load the truck without delaying other customer schedules.

Instructions are sent over the WiFi LAN to PDA #8 to retrieve Pallet #73 (which is located by its asset tag location to be in Bay 56 of the warehouse). The system does not receive a response back from PDA #8, by WiFi LAN, confirming action taken to retrieve the pallet. A trigger event of non-response causes the system to look up which employee has been assigned PDA #8 for the day. It finds that employee K has been assigned the PDA. The employee is located, by his RF (Tag) badge, in the supervisor's office, away from his PDA.

A message is sent by a trigger to the closest LAN device—the supervisor's desktop computer (attached to relay #14) that employee K needs to keep his PDA with him. Employee K approaches PDA #8, a trigger rule causes it to power-up automatically, and it displays the instructions to retrieve Pallet #73. Employee K keeps his PDA with him and approaches a forklift labeled with Asset Tag #126. He mounts the forklift and tries to start the machine. The system verifies that Employee K is licensed to drive forklift # 126 (or that general type of forklift), and the engine starts allowing the truck to be loaded with Pallet #73. Employee K uses the short range reader card in his PDA to scan all the merchandise tags on the pallet, and this information is sent by WiFi LAN to the bill-of-lading printer and the central warehouse inventory tracker. Employee K dismounts the forklift for a moment to secure a donut from the snack truck that is making its rounds.

The truck driver tries to move the forklift so that he can close his truck and leave. However, the forklift will not start because a licensed operator tag is not near the machine. Employee M who is also licensed to operate forklift #126 helps the truck driver by starting the forklift and driving it out of the path of the customer's truck, and at the same time, gives him the printed bill-of-lading for the shipment.

The truck driver happily departs from the warehouse, two hours ahead of schedule, with the pallet of supplies that he needs.

Example 2

A large company with several thousand salespeople divides the U.S. into 50 regions, each with a small administrative support office. The regional support office is used mostly for training, but also has 15 cubicles for salespeople to employ when they find it productive to do so. The salespeople come and go at will, and are supported by two administrative secretaries, permanently assigned to the facility. As a salesperson arrives, their RF (Tag) badge is automatically recognized by the system and method of this invention, which is installed in the regional office and linked via office LAN, telephone and Internet communication to at least one location server and a management server/application. A salesperson can occupy any empty cubicle he or she wishes, and if none are available, a salesperson may use the meeting room space. The WiFi system will recognize their laptop IP address (already associated with them in the company records and management server), and permit LAN access, as long as they are near to their laptop. If they walk away from their laptop, the WiFi gateway could be instructed to deny wireless traffic to their IP address. This denial prevents unauthorized access to company network resources and sensitive information.

A hard-wired telephone call comes into the regional office, and the secretary can forward the call to the salesperson because she can see on her computer screen which cubicle to forward the call to. The ordinary analog telephone in the cubicle may be attached to a system access point which allows VoIP connection to others in the facility if conferencing is necessary.

A visitor comes to the regional office for a meeting with a salesperson. The visitor is given a temporary bracelet or badge, and asked to wait until the salesperson finishes a phone call. The phone call goes longer than expected, and the visitor decides to tour the facility on his own. An alert is sent to the secretary that the visitor is not being escorted by his host because the two badges are not in close proximity. The secretary recovers the visitor and takes him to the host for their meeting.

The foregoing has been a detailed description of illustrative embodiments of the invention. Various modifications and additions can be made without departing from the spirit and scope thereof. For example, the types of facilities in which the system is deployed (secure government, correctional, industrial, medical or military, for example) may dictate additional functionalities within relays, access points and other units (i.e. tamper devices, on-board alarms, remote, wireless cameras). As discussed above, the various processes and procedures described herein can be performed by any of the system components. In an alternate embodiment, for example, the access points and relays can be entirely slaved to the directions of the master and all functions (signal strength measurement, tag ID collection, etc.) can be the sole function of the server, taking raw RF data from relays and access points. Alternatively, for example, access points can perform most of the tag location functions, and thus report each tags actual physical location (e.g. room or sub-location) back to the location server. Naturally, a wide range of automated facility functions can be coupled through the location server, access points and/or facility control server as appropriate including, operating lights, opening, closing and locking doors, adjusting climate control and ventilation, all triggered by individual tags or clusters of tags located in given parts of the facility, where the individuals and things possessing such tags are authorized to be in or prohibited from. All of the processes and procedures herein can be performed by hardware, software that consists of machine-readable instructions executing on a computer, or a combination of hardware and software.

Accordingly, this description is meant to be taken only by way of example, and not to otherwise limit the scope of this invention.

What is claimed is:

1. A system for locating, tracking and communicating with persons and equipment within a facility comprising:
   a plurality of access points each interconnected by a network to a location server having a location-determination procedure thereon, the access points including a wireless network interface for wireless communication of data with network-based devices and a radio frequency (RF) location transceiver that communicates with RF tags so as to resolve relative location of the RF tags with respect to the access points; and
   a plurality of relays that each include a relay RF location transceiver that communicates with the RF tags so as to resolve relative location of the RF tags with respect to the relays and that are constructed and arranged to communicate with at least one access point of the plurality of access points through the RF location transceiver on the access point to report location information related to the RF tags to the access point.

2. The system as set forth in claim 1 wherein the relays are fixed base, stationary relays deployed at fixed locations throughout the facility.

3. The system as set forth in claim 1 wherein the access point has a first range, and the relay RF location transceiver has a second range used to listen for transmissions from the RF tags, and wherein the first range is greater than the second range.

4. The system as set forth in claim 3 the wireless communication of data occurs approximately within the first range.

5. The system as set forth in claim 3 wherein the first range is an indoor maximum of approximately 100 feet, the second range is an indoor maximum of approximately 15 feet.

6. The system as set forth in claim 1 wherein the tags communicate with the relays and the access points using a first RF channel and relays report the location information using a second RF channel.

7. The system as set forth in claim 6 wherein access points contact relays using the first RF channel and thereby direct relays to communicate using the second RF channel.

8. The system as set forth in claim 1 wherein the network-based devices include wireless, handheld data processing devices.

9. The system as set forth in claim 1 wherein at least one of the wireless handheld data processing devices includes a reader for reading a close-range identifier and reporting the identifier over the wireless network.

10. The system as set forth in claim 9 further comprising a facility control management server that receives information on (1) the location or close proximity of the RF tags and (2) data from the close-range identifier and is adapted to provide predetermined data based upon one or more rules related to (1) the location or close proximity of the RF tags and (2) the data from close-range identifier to a user of the reader.

11. The system as set forth in claim 10 wherein the data based upon the one or more rules includes permission to act or denial of permission to act in a predetermined manner.

12. The system as set forth in claim 1 further comprising a facility control management server that receives information on the location of the RF tags and that is adapted to provide authorization or deauthorization of actions based upon location of at least one of the tags in the facility.

13. The system as set forth in claim 12 wherein the provision of authorization and deauthorization are each based upon the presence of two or more RF tags clustered within a predetermined locus.

14. The system as set forth in claim 12 wherein the provision of authorization or deauthorization is based upon proximity of one of the RF tags to another of the RF tags.

15. The system as set forth in claim 1 wherein at least one of the relays is mounted on a moving platform and is adapted to store data on RF tags from which receives transmissions at least until the data is transmitted to one of the access points.

16. The system as set forth in claim 1 wherein the relays are mobile relays capable of traveling throughout the facility.

17. The system as set forth in claim 1 wherein the access points are WiFi-enabled.

18. A system for locating, tracking, authorizing and deauthorizing actions by holders of RF tags in a facility comprising:
   a first plurality of RF access points that have a predetermined first communication range,
   a second plurality, greater than the first plurality, of relays that communicate with access points and have a second communication range less than the first communication range for communicating with RF tags, and
   a location server, interconnected with the access points, that determined locations of the RF tags with respect to the relays based upon relative proximity of each of the RF tags to one or more of the relays within the second range;
   wherein the access points include transceivers for communicating with the tags and with the relays to obtain location information.

19. A system for locating, tracking, authorizing and deauthorizing actions by holders of RF tags in a facility comprising:
   an array of intercommunicating relays deployed throughout a facility in which at least two or more relays are provided in each predetermined locus of the facility so as to redundantly listen to transmissions from RF tags located in proximity to the locus;
   a location server interconnected with and receiving reports on listened-to tags from the relays, the location server associating each of the listened-to RF tags with a name of the locus assigned to the relays that report on the listened-to RF tags; and
   an array of access points each having a transceiver that communicates with RF tags and the relays to report location information.

20. A method for authorizing and deauthorizing actions in a facility comprising the steps of:
   sensing, with an array of relays, the relative proximity of each person and asset having a uniquely identified tag;
   associating each of the relays with a particular locus within the facility and assigning each uniquely identified tag to the particular locus;
   determining whether the person or asset having the uniquely identified tag is allowed in the locus; and
   applying an appropriate authorization or deauthorization action to the locus, wherein the step of applying includes transmitting a data stream over a wireless data communication network associated with access points that are tied to the array of relays.

21. A method for locating persons and items each having a uniquely identified RF tag comprising the steps of:
- sensing the proximity of each uniquely identified RF tag with respect to one or more relays, a plurality of the relays being provided to each discrete locus in the facility;
- associating each uniquely identified tag to the locus based upon the known locus of relays sensing the uniquely identified RF tag;
- gathering data from each of the relays on each uniquely identified RF tag sensed thereby, the data including a sensed signal strength and a tag identifier; and
- transmitting the data to at least one of a plurality of access points by RF communication.

22. The method as set forth in claim 21 further comprising forwarding the data to a location server that carries out the step of associating.

23. The method as set forth in claim 22 further comprising corresponding each uniquely identified RF tag with one of the persons or items and determining whether permissions to act in a predetermined manner within the locus are present.

24. The method as set forth in claim 23 wherein the step of determining includes determining permissions to act in the predetermined manner based upon the presence or absence of other persons or items in the locus.

* * * * *